US010523125B2

(12) United States Patent
Kitamoto

(10) Patent No.: US 10,523,125 B2
(45) Date of Patent: Dec. 31, 2019

(54) POWER SUPPLY DEVICE, MACHINE, AND CONTROL METHOD FOR PERFORMING POWER CONVERSION USING A MULTIPHASE CONVERTER

(71) Applicant: HONDA MOTOR CO., LTD., Tokyo (JP)

(72) Inventor: Ryota Kitamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/078,363

(22) PCT Filed: Feb. 24, 2016

(86) PCT No.: PCT/JP2016/055508
§ 371 (c)(1),
(2) Date: Aug. 21, 2018

(87) PCT Pub. No.: WO2017/145306
PCT Pub. Date: Aug. 31, 2017

(65) Prior Publication Data
US 2019/0052171 A1  Feb. 14, 2019

(51) Int. Cl.
*H02M 3/158* (2006.01)

(52) U.S. Cl.
CPC .. *H02M 3/1584* (2013.01); *H02M 2003/1586* (2013.01)

(58) Field of Classification Search
CPC .. H02M 3/1584; H02M 3/285; H02M 3/3372; H02M 3/3378; H02M 3/3384;
(Continued)

(56) References Cited

U.S. PATENT DOCUMENTS

| 6,031,747 A | 2/2000 | Ilic et al. |
| 6,281,666 B1 | 8/2001 | Tressler et al. |

(Continued)

FOREIGN PATENT DOCUMENTS

| DE | 10 2011 052 922 A1 | 3/2012 |
| JP | 2009-296775 A | 12/2009 |

(Continued)

OTHER PUBLICATIONS

May 24, 2016, International Search Report issued for related PCT application No. PCT/JP2016/055508.

(Continued)

*Primary Examiner* — Jue Zhang
*Assistant Examiner* — Peter M Novak
(74) *Attorney, Agent, or Firm* — Paratus Law Group, PLLC

(57) ABSTRACT

A power supply device includes: a power supply; a conversion module including a plurality of conversion units configured to perform voltage conversion of power supplied by the power supply; a change unit that an operation number, which is the number of the conversion units performing the voltage conversion; and a control unit that supplies a control signal having a predetermined duty ratio to the conversion unit and controls the conversion module. When the change unit changes the operation number, the control unit gradually increases a first duty ratio, which is a duty ratio of the control signal supplied to a conversion unit for starting or stopping the voltage conversion to a second duty ratio, which is a duty ratio of the control signal supplied to a conversion unit for continuously performing the voltage conversion, at a predetermined change rate, or gradually decreases the first duty ratio to zero.

9 Claims, 39 Drawing Sheets

(58) Field of Classification Search
CPC ...... H02M 3/3388; H02M 7/08; H02M 7/153;
H02M 7/17; H02M 7/23; H02M
2007/4822; H02M 7/493; H02M 7/53806;
H02M 7/5381; H02M 7/77; H02M 7/81;
H02M 2003/1586; H02J 1/10
See application file for complete search history.

(56) References Cited

U.S. PATENT DOCUMENTS

| | | | | |
|---|---|---|---|---|
| 2007/0013350 | A1* | 1/2007 | Tang | H02M 3/1584 |
| | | | | 323/237 |
| 2007/0262756 | A1* | 11/2007 | Valley | H02J 3/48 |
| | | | | 323/234 |
| 2010/0013307 | A1 | 1/2010 | Heineman et al. | |
| 2011/0316503 | A1 | 12/2011 | Huang | |
| 2012/0086418 | A1* | 4/2012 | Lee | H02M 1/36 |
| | | | | 323/272 |
| 2012/0176114 | A1 | 7/2012 | Yamadaya | |
| 2016/0322898 | A1* | 11/2016 | Bianco | H02M 1/4225 |
| 2017/0214318 | A1* | 7/2017 | Takenaka | H02M 3/1584 |

FOREIGN PATENT DOCUMENTS

| | | |
|---|---|---|
| JP | 2012-060796 A | 3/2012 |
| JP | 2013-504986 A | 2/2013 |
| JP | 2013-094058 A | 5/2013 |
| JP | 2015-136202 A | 7/2015 |
| WO | WO 2015/037204 A1 | 3/2015 |

OTHER PUBLICATIONS

May 24, 2016, International Search Opinion issued for related PCT application No. PCT/JP2016/055508.
Qiu et al., Power Loss Analyses for Dynamic Phase Number Control in Multiphase Voltage Regulators, 2009 Twenty-Fourth Annual IEEE Applied Power Electronics Conference and Exposition, Feb. 15-19, 2009, pp. 102-108, IEEE.

* cited by examiner

FIG.9

|  | NUMBER OF OPERATING PHASES | | |
|---|---|---|---|
|  | ONE PHASE | TWO PHASES | FOUR PHASES |
| DRIVING PATTERN 1 | PHASE 1 | PHASE 1, PHASE 2 | PHASE 1, PHASE 2, PHASE 3, PHASE 4 |
| DRIVING PATTERN 2 | PHASE 2 | | |
| DRIVING PATTERN 3 | PHASE 3 | PHASE 3, PHASE 4 | |
| DRIVING PATTERN 4 | PHASE 4 | | |

|  | NUMBER OF OPERATING PHASES | | |
|---|---|---|---|
|  | ONE PHASE | TWO PHASES | FOUR PHASES |
| DRIVING PATTERN 1 | PHASE 2 | PHASE 1, PHASE 2 | PHASE 1, PHASE 2, PHASE 3, PHASE 4 |
| DRIVING PATTERN 2 | PHASE 3 | PHASE 3, PHASE 4 | |

|  | NUMBER OF OPERATING PHASES | | | |
|---|---|---|---|---|
|  | ONE PHASE | TWO PHASES | THREE PHASES | FOUR PHASES |
| DRIVING PATTERN 1 | PHASE 1 | PHASE 1, PHASE 2 | | PHASE 1, PHASE 2, PHASE 3, PHASE 4 |
| DRIVING PATTERN 2 | PHASE 2 | | | |
| DRIVING PATTERN 3 | PHASE 3 | PHASE 3, PHASE 4 | | |
| DRIVING PATTERN 4 | PHASE 4 | | | |

FIG.34

| SENSOR STATE | ELECTRIC CURRENT VALUE FOR DETERMINING NUMBER OF OPERATING PHASES | CURRENT VALUE FOR PHASE CURRENT BALANCE CONTROL | WHETHER POWER SAVING CONTROL IS PERFORMED |
|---|---|---|---|
| ALL OF CURRENT SENSOR 105 AND PHASE CURRENT SENSORS 1051 TO 1054 ARE IN NORMAL STATE | INPUT CURRENT IFC | PHASE CURRENTS IL1 TO IL4 | NO |
| CURRENT SENSOR 105 IS IN NORMAL STATE BUT AT LEAST ONE OF PHASE CURRENT SENSORS 1051 TO 1054 FAILS | INPUT CURRENT IFC | - (TURN OFF PHASE CURRENT BALANCE CONTROL) | YES |
| ALL OF PHASE CURRENT SENSORS 1051 TO 1054 ARE IN NORMAL STATE BUT CURRENT SENSOR 105 FAILS | SUM OF PHASE CURRENTS IL1 TO IL4 | PHASE CURRENTS IL1 TO IL4 | YES |

POWER SUPPLY DEVICE, MACHINE, AND CONTROL METHOD FOR PERFORMING POWER CONVERSION USING A MULTIPHASE CONVERTER

CROSS REFERENCE TO PRIOR APPLICATION

This application is a National Stage Patent Application of PCT International Patent Application No. PCT/JP2016/055508 (filed on Feb. 24, 2016) under 35 U.S.C. § 371, which is hereby incorporated by reference in its entirety.

TECHNICAL FIELD

The present invention relates to a power supply device, an apparatus, and a control method.

BACKGROUND ART

A multiphase converter has a plurality of parallel connected conversion units. The number of conversion units that operate changes according to predetermined conditions in order to maximize efficiency. Patent Document 1 describes a power supply system that includes a plurality of power supplies connected in parallel and an operating number controller that controls the number of the power supplies in operation. The operating number controller determines the number of the power supplies operating based on efficiency relative to the load current. The technique described in Patent Document 1 is also described in Non-Patent Document 1. The technique described in Patent Document 3 is also described in Patent Documents 2 and 8. The technique described in Patent Document 4 is also described in Patent Documents 5 and 6.

PRIOR ART DOCUMENT

Patent Document

Patent Document 1: JP-T-2013-504986
Patent Document 2: U.S. Pat. No. 6,281,666
Patent Document 3: U.S. Pat. No. 6,031,747
Patent Document 4: U.S. Patent Application Publication No. 2007/0013350
Patent Document 5: U.S. Patent Application Publication No. 2007/0262756
Patent Document 6: U.S. Patent Application Publication No. 2011/0316503
Patent Document 7: JP-A-2009-296775
Patent Document 8: German Patent Application Publication No. 10 2011 052 922

Non-Patent Document

Non-Patent Document 1: Weihong Qiu, Chun Cheung, Shangyang Xiao, Greg Miller 'Power Loss Analyses for Dynamic Phase Number Control in Multiphase Voltage Regulators', Applied Power Electronics Conference and Exposition, 2009. APEC 2009. Twenty-Fourth Annual IEEE, February 2009, pages 102-108

SUMMARY OF THE INVENTION

Problem that the Invention is to Solve

A multiphase converter has a plurality of conversion units capable of performing voltage conversion are connected in parallel. When switching control on the conversion unit is stopped or, the currents flowing in and out of these conversion units and the other conversion units also fluctuate sharply. These changing current accelerate deterioration of the multiphase converter. It is a more serious problem that the ripple value of the current flowing in and out of the multiphase converter increases and stability of control is impaired. In Patent Documents 1 to 8 and Non-Patent Document 1, a point for changing the number of conversion units performing voltage conversion is described, but it is not considered on control for preventing fluctuation of currents when changing the number of conversion units performing voltage conversion, whereby the above-described problem cannot be solved.

An object of the present invention is to provide a power supply device, an apparatus, and a control method which, when changing the number of conversion units operating, prevents fluctuation of currents flowing in and out of a conversion module, thereby maintaining control stability.

Means for Solving the Problem

The present invention is to provide the following aspects.
A first aspect defines a power supply device including:
a power supply (e.g., a fuel cell 101 in embodiment);
a conversion module (e.g., an FC-VCU 103 or 203 in embodiment) including a plurality of conversion units configured to perform voltage conversion of power supplied by the power supply, the plurality of conversion units being electrically connected in parallel to each other;
a change unit (e.g., an ECU 113 in embodiment) that an operation number, which is the number of the conversion units performing the voltage conversion; and
a control unit (e.g., the ECU 113 in embodiment) that supplies a control signal having a predetermined duty ratio to the conversion unit performing the voltage conversion and controls the conversion module, wherein
when the change unit changes the operation number, the control unit gradually increases a first duty ratio, which is a duty ratio of the control signal supplied to a conversion unit for starting or stopping the voltage conversion to a second duty ratio, which is a duty ratio of the control signal supplied to a conversion unit for continuously performing the voltage conversion, at a predetermined change rate, or gradually decreases the first duty ratio to zero.

The change unit and the control unit may be shared by the same ECU 113 having a plurality of functions represented in embodiments to be described below.

A second aspect defines, based on the first aspect, the power supply device, wherein a change rate of the second duty ratio with the change of the operation number is 0.

A third aspect defines, based on the first or second aspect, the power supply device, wherein
a change rate of the first duty ratio with the decrease in the operation number is smaller than a change rate of the first duty ratio with the increase in the operation number.

A fourth aspect defines, based on any one of the first to third aspects, the power supply device, wherein
the change rate of the first duty ratio with the change in the operation number is based on at least one of an amount of change in a current flowing through the conversion unit for continuously performing the voltage conversion before and after the change in the operation number and an amount of change in a current flowing through the conversion unit for start or stopping the voltage conversion during the change in the operation number.

A fifth aspect defines, based on the fourth aspect, the power supply device, wherein the change rate of the first duty ratio with the change in the operation number becomes smaller as the amount of change in the current flowing through the conversion unit for continuously performing the voltage conversion before and after the change in the operation number or the amount of change in the current flowing through the conversion unit for start or stopping the voltage conversion during the change in the operation number is large.

A sixth aspect defines, based on any one of the first to third aspects, the power supply device, wherein the change rate of the first duty ratio with the change in the operation number is based on continuity of the operation number before and after the change in the operation number.

A seventh aspect defines, based on the sixth aspect, the power supply device, wherein the change rate of the first duty ratio with the change in the operation number is small in a case where the operation number is discontinuous rather than in a case where the operation number is continuous.

An eighth aspect defines an apparatus including the power supply device according to any one of the first to seventh aspects.

A ninth aspect defines a control method performed by a power supply device, the power supply device including:

a power supply (e.g., a fuel cell 101 in embodiment);

a conversion module (e.g., an FC-VCU 103 or 203 in embodiment) including a plurality of conversion units configured to perform voltage conversion of power supplied by the power supply, the plurality of conversion units being electrically connected in parallel to each other;

a change unit (e.g., an ECU 113 in embodiment) that an operation number, which is the number of the conversion units performing the voltage conversion; and a control unit (e.g., the ECU 113 in embodiment) that supplies a control signal having a predetermined duty ratio to the conversion unit performing the voltage conversion and controls the conversion module, wherein when the change unit changes the operation number, the control unit gradually increases a first duty ratio, which is a duty ratio of the control signal supplied to a conversion unit for starting or stopping the voltage conversion to a second duty ratio, which is a duty ratio of the control signal supplied to a conversion unit for continuously performing the voltage conversion, at a predetermined change rate, or gradually decreases the first duty ratio to zero.

The change unit and the control unit may be shared by the same ECU 113 having a plurality of functions represented in embodiments to be described below.

Advantage of the Invention

According to the first, eighth, and ninth aspects, when changing the operation number of the conversion units performing the voltage conversion, the first duty ratio of the control signal supplied to the conversion unit for starting the voltage conversion is gradually increased to the second duty ratio of the control signal supplied to the conversion unit continuously performing the voltage conversion, or the first duty ratio of the control signal supplied to the conversion unit for starting the voltage conversion is decreased to 0. Accordingly, when changing the numbers of operating phases, since the current flowing through the conversion unit continuously performing the voltage conversion and the current flowing through the conversion unit for starting or stopping the voltage conversion are gradually changed, the fluctuation of the current flowing through the conversion module during the switching of the operation number can be prevented. As a result, the control stability of the conversion module is improved.

According to the second aspect, since the second duty ratio of the control signal supplied to the conversion unit continuously performing the voltage conversion is not varied with the change of the operation number, the control stability of the conversion module during the change of the operation number is improved.

In the case of increasing the operation numbers, since the load applied to one of the conversion units for performing the voltage conversion is decreased, the control stability of the conversion module is improved, and the decreased load contributes to increased durability and longer life of the conversion module. On the other hand, in the case of decreasing the operation numbers, since the load applied to one of the conversion units for performing the voltage conversion is increased, the control stability of the conversion module decreases, and the increased load hinders the conversion module from being more durable and having longer life. However, according to the third aspect, in the case of decreasing the operation numbers, since the change rate of the first duty ratio of the control signal supplied to the conversion unit for stopping the voltage conversion is made smaller than in the case of increasing the operation numbers, the load on the conversion module is slowly increased, whereby the control stability is improved and the higher durability and longer life of the conversion module can be realized.

According to the fourth aspect, since the change rate of the first duty ratio is changed based on the amount of the current before and after the change of the operation number and thus the change rate according to the magnitude of the influence on the current flowing through the conversion module is set by the change of the number of operating phases, the fluctuation of the current flowing through the conversion module during the switching of the operation number can be prevented.

According to the fifth aspect, the influence of the change of the operation number on the current flowing through the conversion module increases as the amount of change in the current before and after the change of the operation number increases, and the change rate of the first duty ratio is set to be smaller as the change rate of the current becomes larger. For this reason, the fluctuation of the current flowing through the conversion module during the switching of the operation number can be prevented.

According to the sixth aspect, since the change rate of the first duty ratio is changed based on the continuity of the operation number before and after the change of the operation number and thus the change rate according to the magnitude of the influence on the current flowing through the conversion module is set by the change of the operation number, the fluctuation of the current flowing through the conversion module during the switching of the operation number can be prevented.

According to the seventh aspect, since the amount of change in the current before and after the change of the operation number is large in the case where operation number is discontinuous before and after the change rather than in the case where the operation number is continuous, the influence of the change of the operation number on the current flowing through the conversion module is large. Accordingly, the fluctuation of the current flowing through the conversion module during the switching of the operation number can be prevented.

BRIEF DESCRIPTION OF DRAWINGS

FIG. 9 is a diagram of a first example illustrating, for different numbers of operating phases, phases that are driven in accordance with each driving pattern in the FC-VCU.

FIG. 15 is a diagram of loss maps illustrating losses in the FC-VCU in a case where the number of operating phases is one, two, and four.

FIG. 17 is a diagram of a combined loss map obtained by extracting minimum loss values in hatched cells in the three loss maps illustrated in FIG. 15.

FIG. 34 is a diagram of an eighth example illustrating, for different states of a current sensor and phase current sensors, current values for determining the number of operating phases, current values for performing phase current balance control, and whether the power saving control is performed or not.

MODES FOR CARRYING OUT THE INVENTION

Embodiments will now be described with reference to the accompanying drawings.

Figure 1:
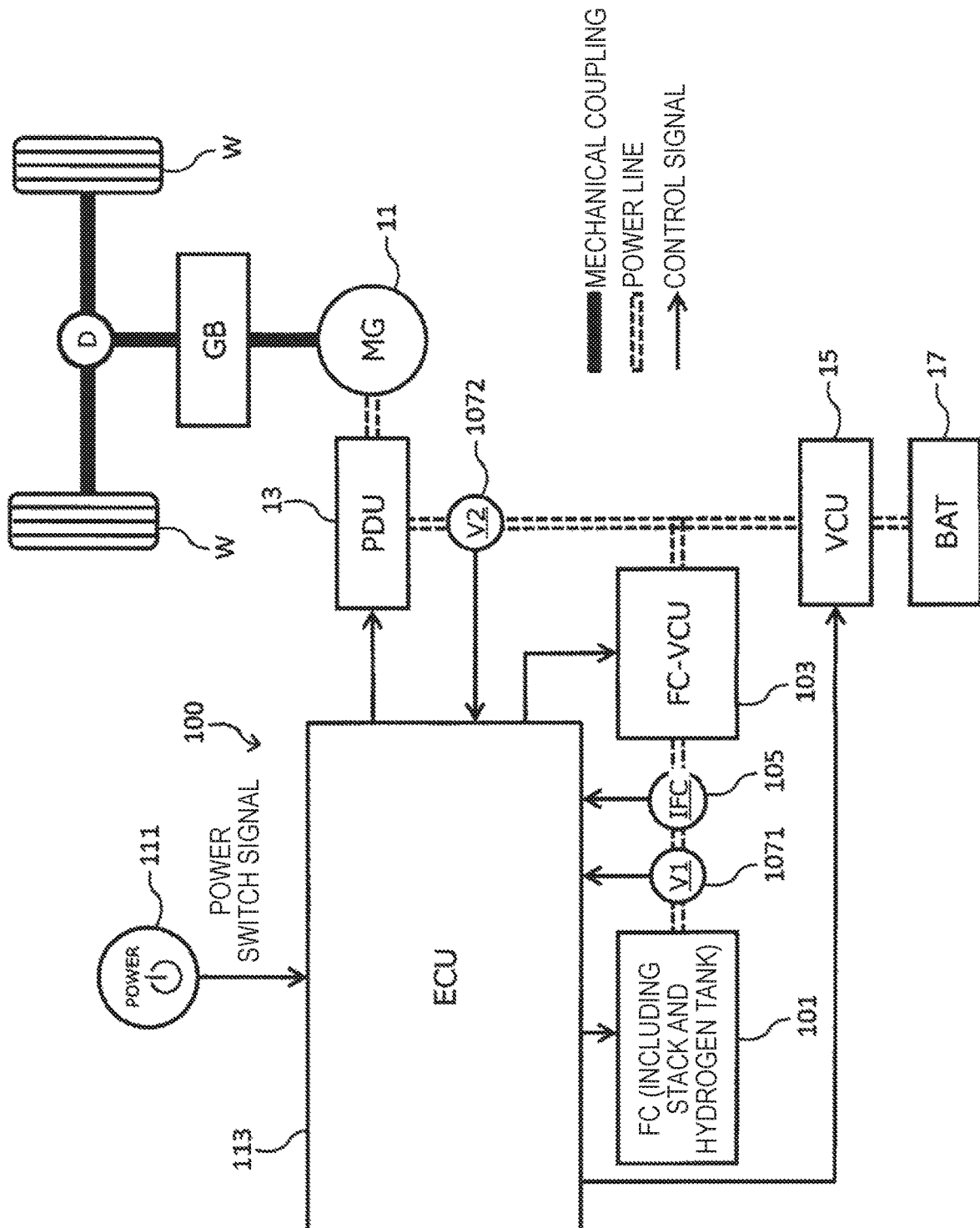
FIG. 1 is a block diagram illustrating an overall configuration of a motor-driven vehicle in which a power supply device according to an embodiment of the present disclosure is mounted.

FIG. 1 is a block diagram illustrating an overall configuration of a motor-driven vehicle in which a power supply device according to an embodiment of the present disclosure is mounted. In FIG. 1, the thick solid lines represent mechanical couplings, the double dotted lines represent power lines, and the thin solid arrows represent control signals. The motor-driven vehicle of single-motor type illustrated in FIG. 1 includes a motor/generator (MG) 11, a power drive unit (PDU) 13, a voltage control unit (VCU) 15, a battery 17, and a power supply device 100 according to an embodiment. Hereinafter, each component included in the motor-driven vehicle is described.

The motor/generator 11 is driven by power supplied from at least one of the battery 17 and the power supply device 100 and generates motive power used by the motor-driven vehicle to travel. Torque generated by the motor/generator 11 is transmitted to driving wheels W through a gearbox GB that includes variable-ratio gears or fixed-ratio gears and through a differential gear D. The motor/generator 11 operates as a power generator when the motor-driven vehicle slows down to output braking force for the motor-driven vehicle. Regenerative power generated by the motor/generator 11 operating as a power generator is stored in the battery 17.

The PDU 13 converts a DC voltage into a three-phase AC voltage and applies the resulting voltage to the motor/generator 11. The PDU 13 converts an AC voltage that is input when the motor/generator 11 performs a regeneration operation into a DC voltage.

The VCU 15 boosts the output voltage of the battery 17, which is a DC voltage, without conversion into an AC voltage. The VCU 15 decreases the voltage of power that is generated by the motor/generator 11 when the motor-driven vehicle slows down and that is converted into DC power. Further, the VCU 15 decreases the output voltage of the power supply device 100, which is a DC voltage, without conversion into an AC voltage. The power for which the voltage has been decreased by the VCU 15 is stored in the battery 17.

The battery 17 includes a plurality of energy storage cells, such as lithium-ion batteries or nickel-hydrogen batteries, and supplies high-voltage power to the motor/generator 11 through the VCU 15. Note that the battery 17 is not limited to a secondary battery, such as a lithium-ion battery or a nickel-hydrogen battery. For example, a capacitor that has a small energy storage capacity but is capable of storing and feeding a large amount of power in a short time period may be used as the battery 17.

The power supply device 100 includes a fuel cell (FC) 101, a fuel cell voltage control unit (FC-VCU) 103, a current sensor 105, phase current sensors 1051 to 1054 (see FIG. 2), voltage sensors 1071 and 1072, temperature sensors 1091 to 1094 (see FIG. 2), a power switch 111, and an electronic control unit (ECU) 113, as illustrated in FIG. 1.

The fuel cell 101 includes a hydrogen tank, a hydrogen pump, and a fuel cell (FC) stack. The hydrogen tank stores hydrogen, which is a fuel used by the motor-driven vehicle to travel. The hydrogen pump is used to adjust the amount of hydrogen supplied from the hydrogen tank to the FC stack. The hydrogen pump can be used to adjust the amount of humidified hydrogen by supplying dry hydrogen stored in the hydrogen tank to the FC stack through a water storage tank in the hydrogen pump. The hydrogen supplied through the hydrogen pump and oxygen in air are taken into the FC stack to generate electric energy through a chemical reaction. The electric energy generated in the FC stack is supplied to the motor/generator 11 or to the battery 17.

As the fuel cell 101, various type of fuel cells, such as a polymer electrolyte fuel cell (PEFC), a phosphoric acid fuel cell (PAFC), a molten carbonate fuel cell (MCFC), and a solid oxide fuel cell (SOFC), can be used.

The closed-circuit voltage of the fuel cell 101 varies in accordance with the amount of discharge (an amount of electric power). The characteristics of the fuel cell 101 are different from those of the battery 17. The fuel cell 101 can continuously feed a high current as long as hydrogen and oxygen, which are fuels, are supplied. However, in theory, the fuel cell 101 generates electricity by an electrochemical reaction of the supplied fuel gas, and therefore, it is difficult to discontinuously change the output of the fuel cell 101 in a short time period. By taking into consideration the above-described characteristics, the fuel cell 101 is considered to have the characteristics of a high-capacity power supply. Meanwhile, in theory, the battery 17 generates electricity by an electrochemical reaction of an internal active material, and therefore, it is difficult for the battery 17 to continuously feed a high current but it is not difficult to discontinuously change the output of the battery 17 in a short time period. By taking into the above-described characteristics, the battery 17 is considered to have the characteristics of a high-output power supply.

Figure 2:
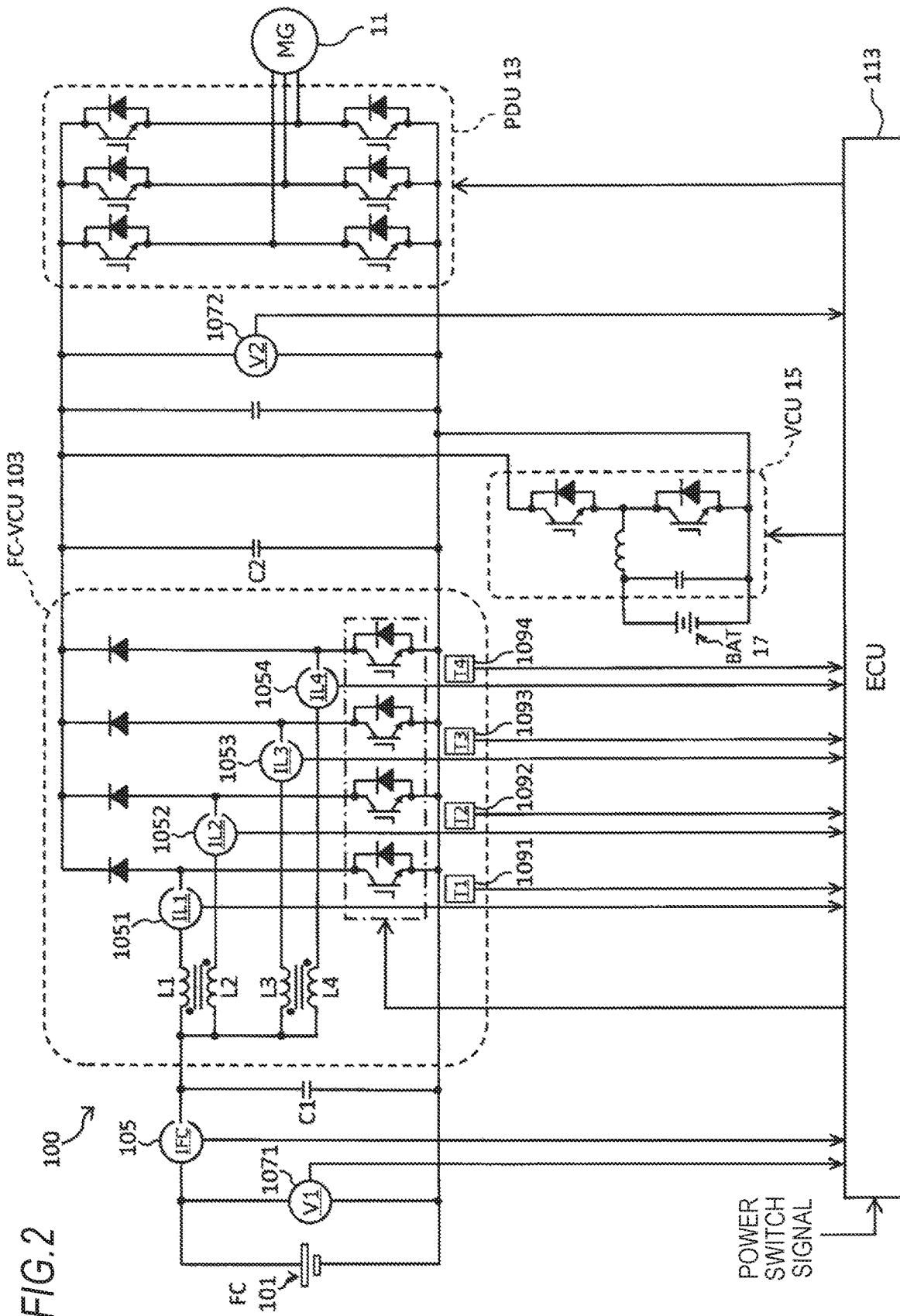
FIG. 2 is an electric circuit diagram illustrating relationships among the power supply device, a battery, a VCU, a PDU, and a motor/generator according to an embodiment.

The FC-VCU 103 includes four conversion units (voltage converters) capable of performing voltage conversion on power (electric energy) output from the fuel cell 101, and the four conversion units are connected in parallel and share a common output node and a common input node. That is, the FC-VCU 103 is a multiphase converter. FIG. 2 is an electric circuit diagram illustrating relationships among the power supply device 100, the battery 17, the VCU 15, the PDU 13, and the motor/generator 11. As illustrated in FIG. 2, each conversion unit included in the FC-VCU 103 has a circuit configuration of a boosting chopper circuit and includes a reactor, a diode connected in series to the reactor, and a switching element connected between the reactor and the diode. On the input side of the FC-VCU 103, a smoothing capacitor C1 is provided in parallel to the four conversion units. On the output side of the FC-VCU 103, a smoothing capacitor C2 is provided in parallel to the VCU 15.

The four conversion units included in the FC-VCU 103 are electrically connected in parallel. When an on/off switch operation is performed on the switching element of at least one of the four conversion units at a desired timing, the voltage of the fuel cell 101, which is a DC voltage, is boosted and output without conversion into an AC voltage. The on/off switch operation on the switching elements of the conversion units are controlled in accordance with pulse-like switching signals having a predetermined duty ratio provided from the ECU 113 to the FC-VCU 103.

Figure 3:
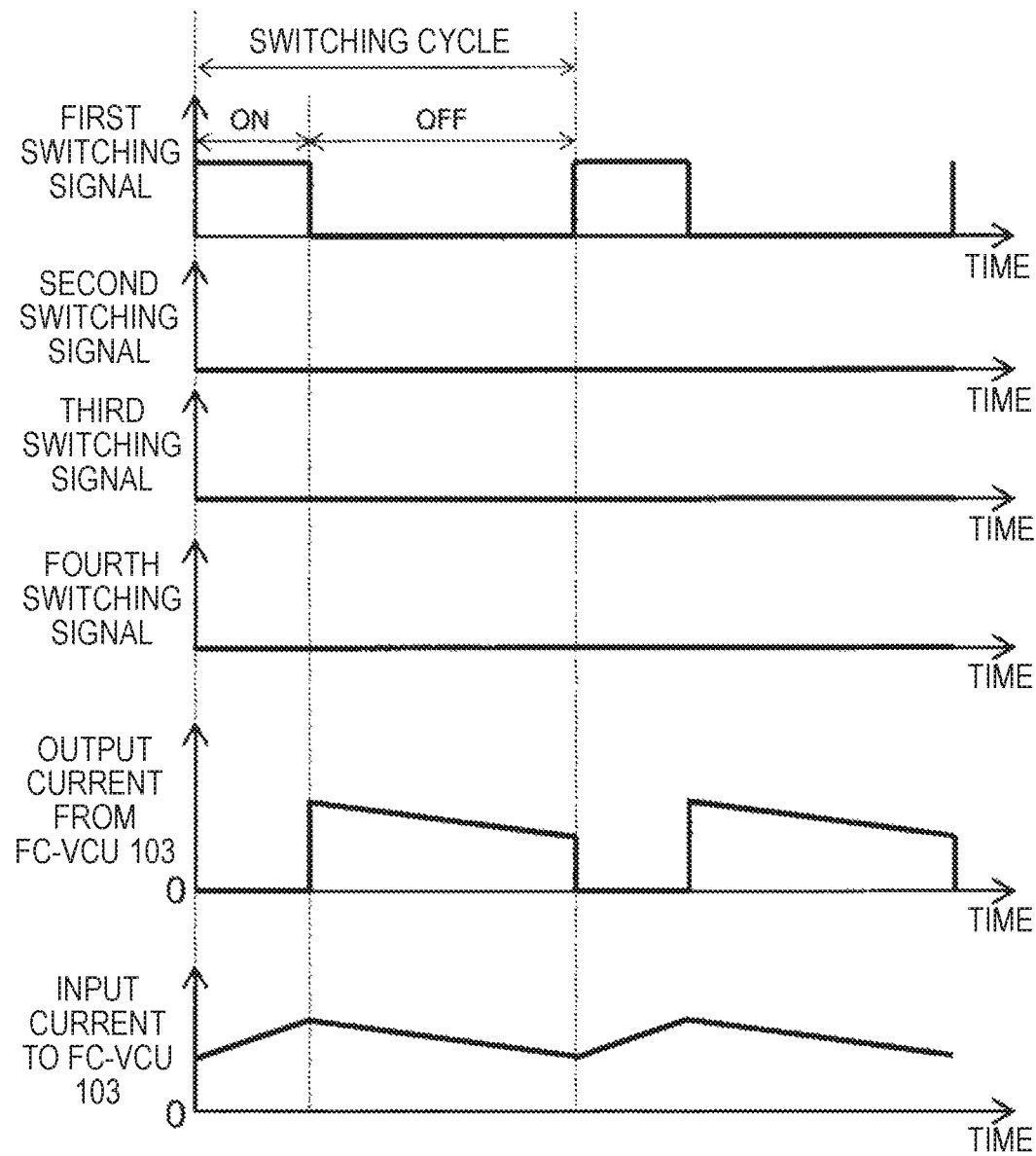
FIG. 3 is a diagram illustrating changes in switching signals over time and changes in the input/output currents of a fuel cell voltage control unit (FC-VCU) over time in a case of driving only one of the four conversion units (phases) included in the FC-VCU.
Figure 4:
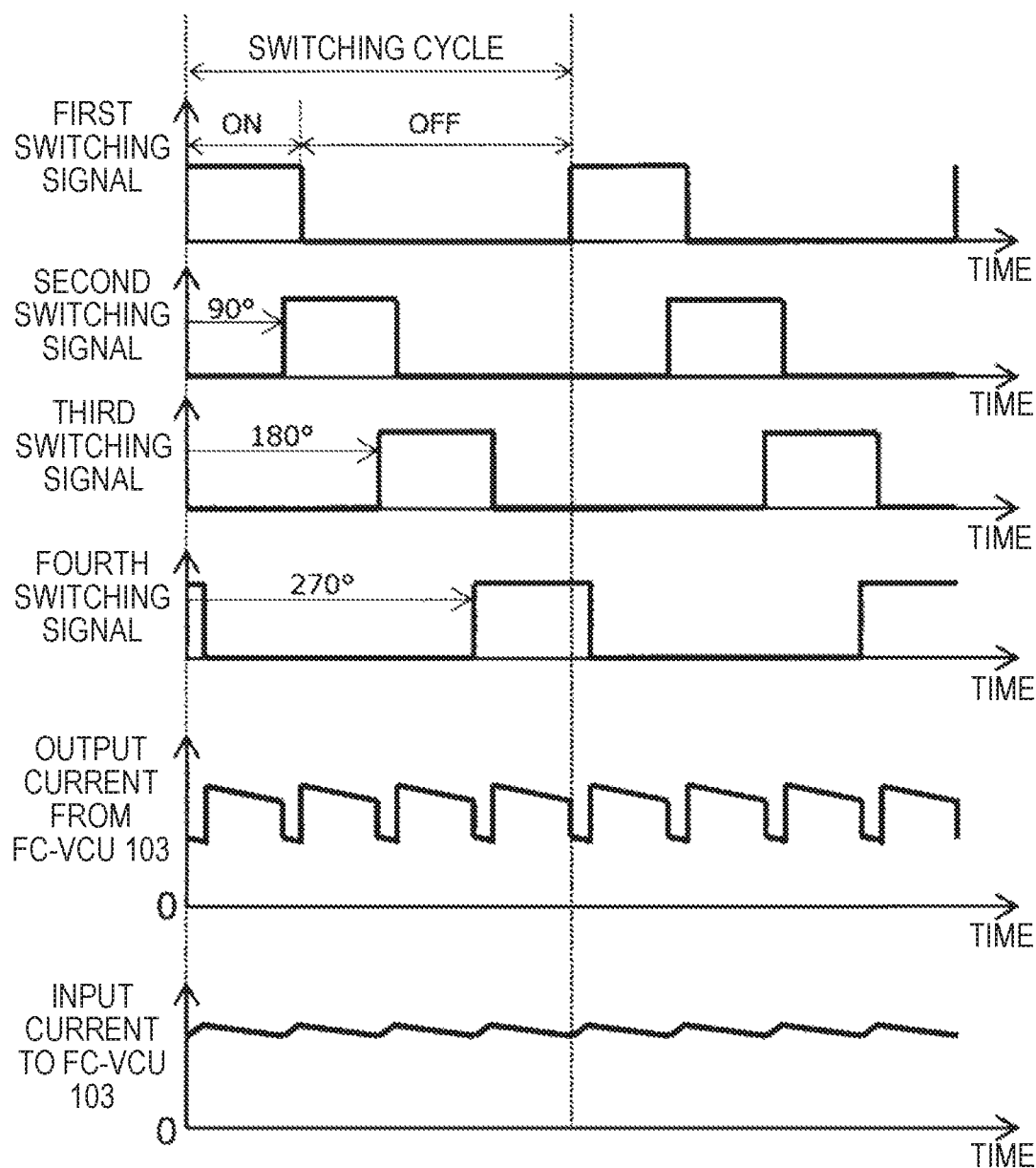
FIG. 4 is a diagram illustrating changes in the switching signals over time and changes in the input/output currents of the FC-VCU over time in a case of driving all of the four conversion units (phases) included in the FC-VCU.

The number of conversion units that are driven in accordance with control performed by the ECU 113 affects the ripple of the output current from the FC-VCU 103. When on/off switching control is performed on the switching element of one of the conversion units, the input current to the FC-VCU 103 flows into the switching element and energy is stored in the reactor while the switching element is turned on, and the input current to the FC-VCU 103 flows into the diode and the stored energy is released from the reactor while the switching element is turned off. Therefore, when only one of the four conversion units included in the FC-VCU 103 is driven, the currents that flow through each one of the conversion units in which the switching element is turned off are output from the FC-VCU 103, as illustrated in FIG. 3. In a case of driving all of the four conversion units included in the FC-VCU 103, interleave control is performed in which the on/off switch phases of the conversion units are shifted from each other by 90 degrees, as illustrated in FIG. 4. In this case, the ripple of the output current from the FC-VCU 103 is smaller than that in the case illustrated in FIG. 3 where only one conversion unit is driven because the output currents from the conversion units are combined at the output node of the FC-VCU 103. In a case of driving two of the four conversion units included in the FC-VCU 103, interleave control is performed in which the on/off switch phases of the driven conversion units are shifted from each other by 180 degrees. The ripple of the output current from the FC-VCU 103 in this case is larger than that in the case illustrated in FIG. 4 where the four conversion units are driven but is smaller than that in the case illustrated in FIG. 3 where only one conversion unit is driven. As described above, the ripple of the output current changes in accordance with the number of driven conversion units (a number of operating voltage converters). If the phase difference between the driven conversion units is made equal to a value obtained by dividing 360 degrees by the number of driven conversion units, the ripple of the output current can be minimized.

The number of driven conversion units also affects a loss occurred in the FC-VCU 103. A loss occurred in the FC-VCU 103 includes three types of losses, namely, a transition loss $\eta$trans that occurs when the switching element transitions between the on-state and the off-state, a conduction loss $\eta$conduct produced from a resistance component included in the switching element and so on, and a switching loss $\eta$switch (Fsw) produced by switching.

A loss $\eta$total_1 that occurs in the FC-VCU 103 in the case of driving only one of the four conversion units is expressed by expression (1) below, where "IFC" is the input current to the FC-VCU 103, "V1" is the input voltage of the FC-VCU 103, "V2" is the output voltage of the FC-VCU 103, "Ttrans" is a transition time of the switching element transitioning from the on-state to the off-state or from the off-state to the on-state, "Fsw" is the switching frequency, "RDSon" is the on-resistance of the switching element that constitutes the conversion unit, and "A" is a constant.

[Mathematical formula 1]

$$\eta \text{ total\_1} = \eta \text{ trans} + \eta \text{ conduct} + \eta \text{ switch} \quad (1)$$
$$= 2 \cdot V2 \cdot IFC \cdot Ttrans \cdot Fsw +$$
$$A \cdot RDSon \cdot \left(1 - \frac{V1}{V2}\right) \cdot IFC^2 +$$
$$\eta \text{switch}(Fsw)$$

According to the loss $\eta$total_1 expressed by expression (1), as the input current IFC to the FC-VCU 103 increases, the conduction loss specifically increases, and the heat value of the FC-VCU 103 increases. Therefore, in a case of increasing the number of driven conversion units and driving N (N is an integer equal to or larger than two) conversion units, a loss $\eta$total_N that occurs in the FC-VCU 103 is expressed by expression (2) below.

[Mathematical formula 2]

$$\eta\text{ total\_N} = N \cdot 2 \cdot V2 \cdot \frac{IFC}{N} \cdot \text{Ttrans} \cdot \qquad (2)$$

$$Fsw + N \cdot A \cdot RDSon \cdot \left(1 - \frac{V1}{V2}\right) \cdot$$

$$\left(\frac{IFC}{N}\right)^2 + N \cdot \eta\text{ switch}(Fsw)$$

$$= 2 \cdot V2 \cdot IFC \cdot \text{Ttrans} \cdot Fsw + \frac{1}{N} \cdot$$

$$A \cdot RDSon \cdot \left(1 - \frac{V1}{V2}\right) \cdot IFC^2 +$$

$$N \cdot \eta\text{switch}(Fsw)$$

Figure 5:
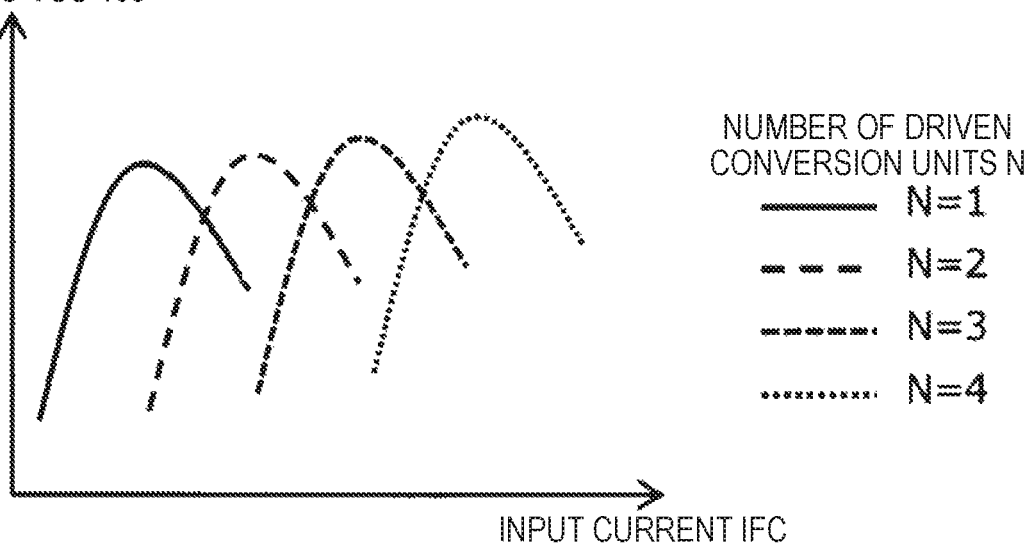
FIG. 5 is a graph illustrating the energy efficiency of the FC-VCU relative to the input current for each value of N, N being the number of driven conversion units (phases), the energy efficiency being determined by taking into consideration a loss.

According to the loss ηtotal_N expressed by expression (2), as the number of driven conversion units increases, the switching loss increases but the conduction loss decreases. Therefore, the ECU 113 determines the number of driven conversion units by using a map and so on indicating the energy efficiency of the FC-VCU 103 for each value of the number of driven conversion units N, the energy efficiency being determined by taking into consideration the loss. FIG. 5 is a graph illustrating the energy efficiency of the FC-VCU 103 relative to the input current IFC for each value of N, N being the number of driven conversion units, the energy efficiency being determined by taking into consideration the loss. The ECU 113 selects an appropriate value of N in accordance with the input current IFC to the FC-VCU 103 by using a map based on the graph in FIG. 5.

Figure 6:
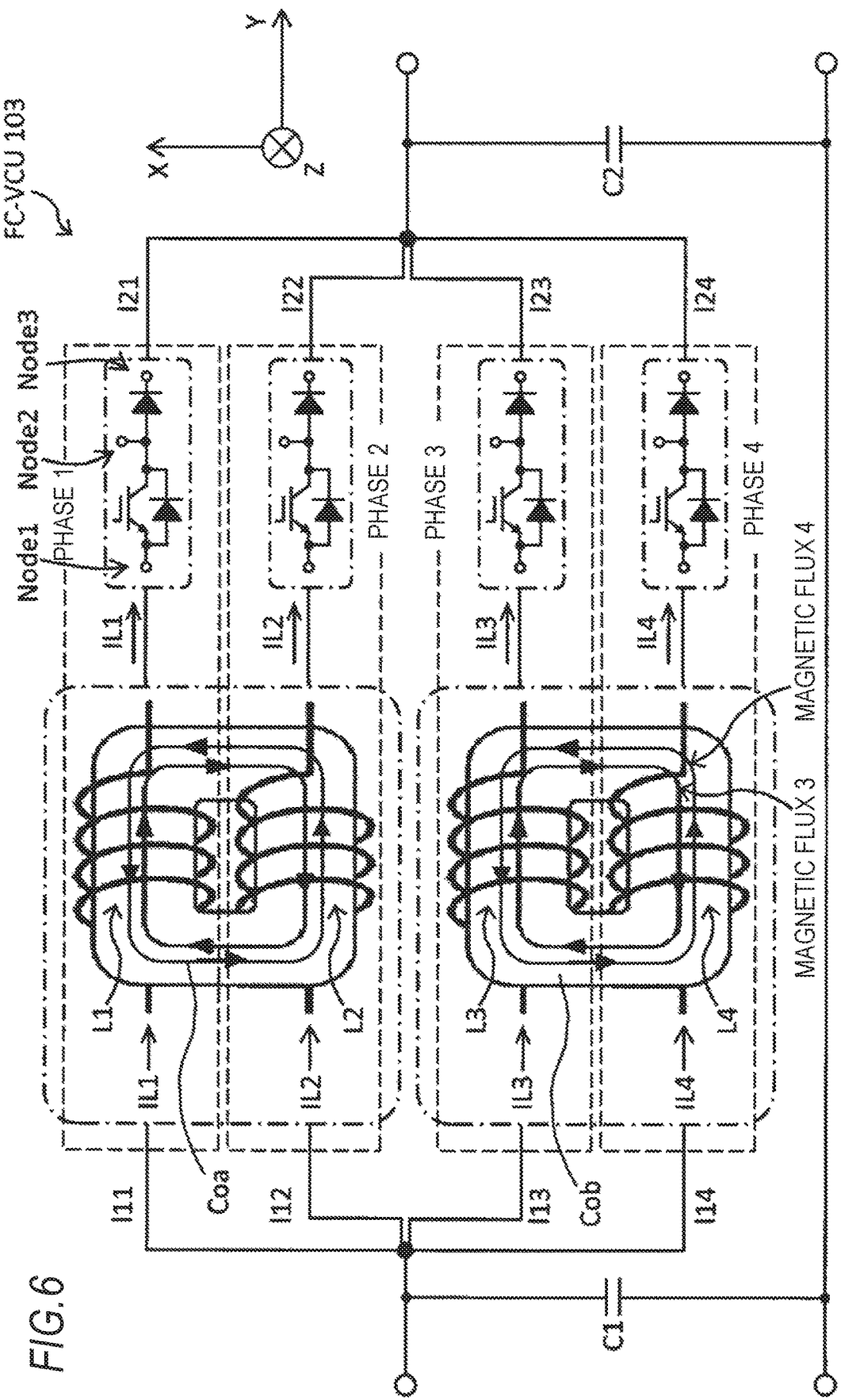
FIG. 6 is a diagram illustrating positional relationships among the components of the four conversion units (phases) included in the FC-VCU and smoothing capacitors illustrated in FIG. 2 when viewed in a Z-axis direction.

FIG. 6 is a diagram illustrating positional relationships among the components of the four conversion units included in the FC-VCU 103 and the smoothing capacitors C1 and C2 illustrated in FIG. 2 when viewed in a Z-axis direction. In the following description, the four conversion units included in the FC-VCU 103 are each expressed as "phase". Therefore, in this embodiment, the conversion unit including a reactor L1 is expressed as "phase 1", the conversion unit including a reactor L2 is expressed as "phase 2", the conversion unit including a reactor L3 is expressed as "phase 3", and the conversion unit including a reactor L4 is expressed as "phase 4", as illustrated in FIG. 6. A case where the number of driven conversion units (phases) (hereinafter sometimes referred to as "the number of operating phases") is one is expressed as "one phase", and a case where the number of driven conversion units (phases) is two is expressed as "two phases", for example. In accordance with the number of driven conversion units (phases) N, the number of operating phases is expressed as "N phases".

As illustrated in FIG. 6, in this embodiment, phase 1 to phase 4 are aligned and arranged on an X-Y plane such that phase 1 and phase 4 are arranged close to the edge of the X-Y plane, phase 2 is arranged closer to the center of the X-Y plane relative to phase 1, and phase 3 is arranged closer to the center of the X-Y plane relative to phase 4. The reactor L1 that constitutes phase 1 and the reactor L2 that constitutes phase 2 share a common iron core, and the winding direction of the coil of the reactor L1 relative to the iron core is opposite to the winding direction of the coil of the reactor L2 relative to the iron core. Similarly, the reactor L3 and the reactor L4 share a common iron core, and the winding direction of the coil of the reactor L3 relative to the iron core is opposite to the winding direction of the coil of the reactor L4 relative to the iron core. Therefore, the reactor L1 and the reactor L2 are magnetically coupled to each other, and the reactor L3 and the reactor L4 are magnetically coupled to each other.

FIG. 6 illustrates a state where, if the same currents are supplied to the reactors that are magnetically coupled to each other, magnetic flux that is generated in one of the phases and magnetic flux that is generated in the other phase cancel each other. A current IL3 that is supplied to the reactor L3 and a current IL4 that is supplied to the reactor L4 respectively generate magnetic flux 3 and magnetic flux 4 due to electromagnetic induction. As described above, the reactor L3 and the reactor L4 share the common iron core, and therefore, the magnetic flux 3 and the magnetic flux 4 are oriented opposite to each other and cancel each other. Therefore, magnetic saturation in the reactor L3 and in the reactor L4 can be suppressed. The same applies to the reactor L1 and the reactor L2.

The iron core shared by the reactor L1 and the reactor L2, which is referred to as an iron core Coa, is arranged on the X-Y plane so as to extend across phase 1 and phase 2, and the iron core shared by the reactor L3 and the reactor L4, which is referred to as an iron core Cob, is arranged on the X-Y plane so as to extend across phase 3 and phase 4. The X-Y plane may be a horizontal plane or may be a vertical plane. Note that the number of reactors that are magnetically coupled to each other is not limited to two. Three or four reactors or more than four reactors can be magnetically coupled to each other by using a common iron core, as described above.

Induced currents IL1 to IL4 of the reactors L1 to L4 of the respective phases are each input to a node Node2 that is connected to a node at which one end of the switching element and one end of the diode are connected to each other. A node Node1, which corresponds to the other end of the switching element, is connected to a ground line. The output current from each phase is output through a node Node3, which corresponds to the other end of the diode.

Figure 7:
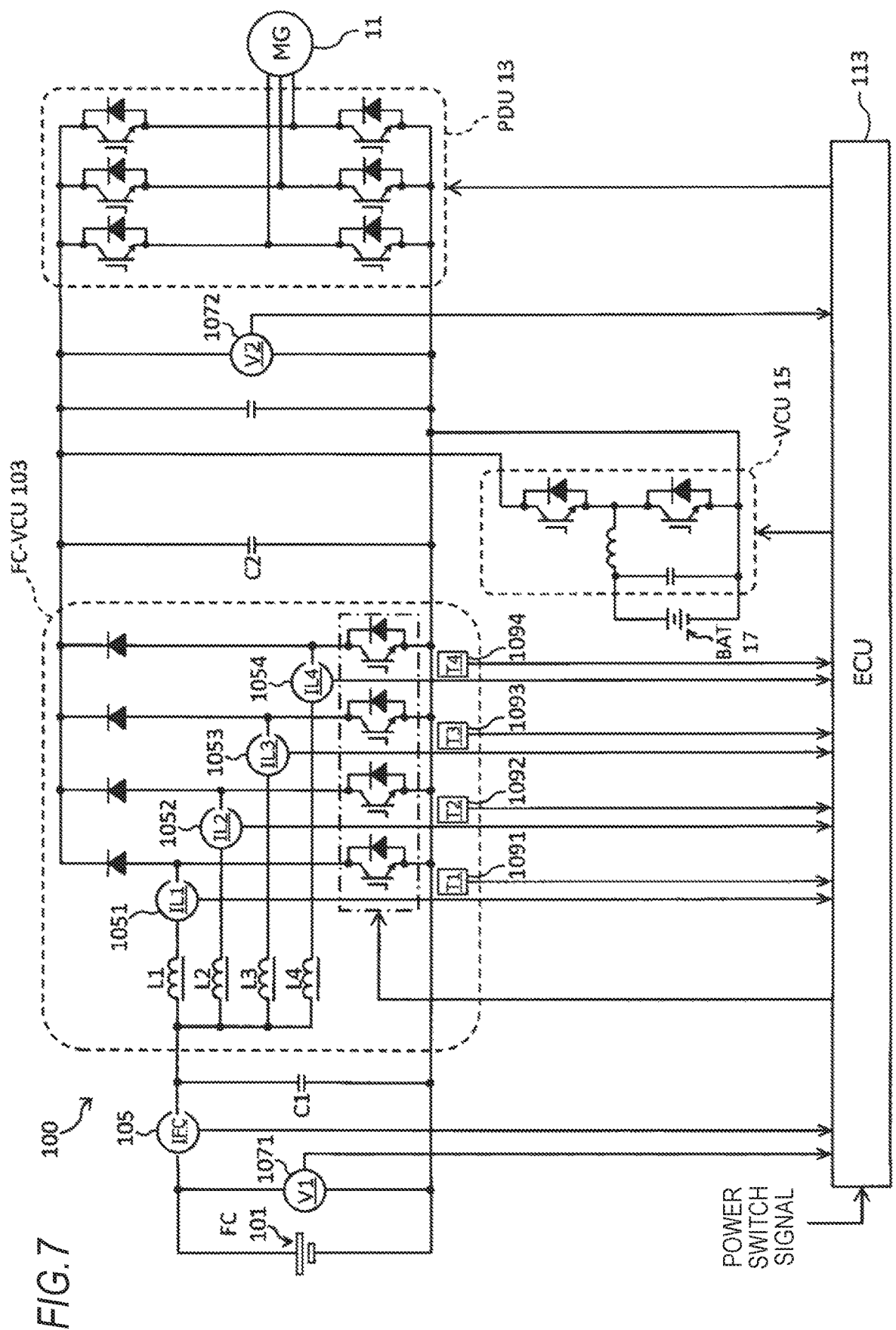
FIG. 7 is an electric circuit diagram illustrating relationships among the power supply device, the battery, the VCU, the PDU, and the motor/generator according to another embodiment.
Figure 8:
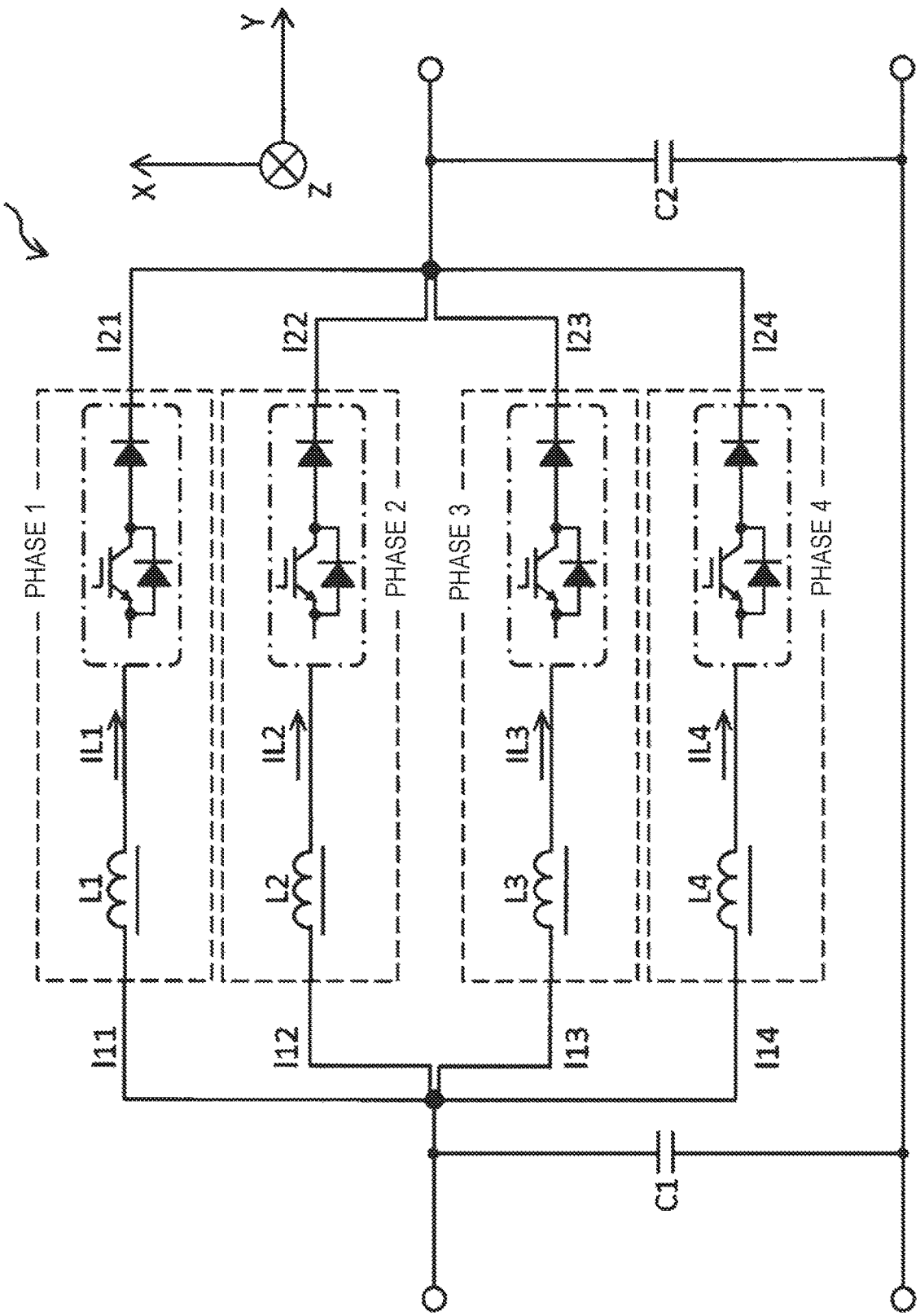
FIG. 8 is a diagram illustrating positional relationships among the components of the four conversion units (phases) included in the FC-VCU and the smoothing capacitors illustrated in FIG. 7 when viewed in the Z-axis direction.

Note that a configuration as illustrated in FIG. 7 may be employed in which iron cores are individually provided to the reactors that respectively constitute phase 1 to phase 4. Even in this case, however, phase 1 to phase 4 are aligned and arranged on the X-Y plane such that phase 1 and phase 4 are arranged close to the edge of the X-Y plane, phase 2 is arranged closer to the center of the X-Y plane relative to phase 1, and phase 3 is arranged closer to the center of the X-Y plane relative to phase 4, as illustrated in FIG. 8.

The current sensor 105 and the phase current sensors 1051 to 1054 included in the power supply device 100 are Hall effect current sensors that do not have an electrical contact (node) with a circuit for which the current is to be detected. The current sensors each include a core and a Hall element, and the Hall element, which is a magnetoelectric transducer, converts a magnetic field that is generated in the gap of the core and that is proportional to the input current into a voltage. The current sensor 105 detects the input current IFC to the FC-VCU 103, the input current IFC being the output current from the fuel cell 101. A signal indicating a voltage that corresponds to the input current IFC detected by the current sensor 105 is sent to the ECU 113. The phase current sensors 1051 to 1054 illustrated in FIG. 2 respectively detect the phase currents IL1 to IL4 that flow through the respective phases (conversion units) of the FC-VCU 103. Signals indicating voltages that respectively correspond to the phase currents IL1 to IL4 detected by the phase current sensors 1051 to 1054 are sent to the ECU 113. Note that the control cycle of the current sensor 105 and the control cycle of the phase current sensors 1051 to 1054 are different from each other in order to suppress interference of control in the ECU 113. In this embodiment, the control cycle of the current sensor 105 is faster than the control cycle of the phase current sensors 1051 to 1054. This difference is due to a difference in the role of the current sensor 105 and that of the phase current sensors 1051 to 1054. That is, the current sensor 105 significantly affects the efficiency of the FC-VCU 103 because the number of operating phases is changed by using a value detected by the current sensor 105, while the phase current sensors 1051 to 1054 are used as auxiliary current sensors to balance the current values of the phases that are driven based on values detected by the phase current sensors 1051 to 1054.

The voltage sensor 1071 detects the input voltage V1 of the FC-VCU 103, the input voltage V1 being the output voltage of the fuel cell 101. A signal indicating the voltage V1 detected by the voltage sensor 1071 is sent to the ECU 113. The voltage sensor 1072 detects the output voltage V2 of the FC-VCU 103. A signal indicating the voltage V2 detected by the voltage sensor 1072 is sent to the ECU 113.

The temperature sensors 1091 to 1094 specifically detect the temperatures in the vicinity of the switching elements of the phases (conversion units) of the FC-VCU 103 respectively. Signals indicating temperatures T1 to T4 respectively detected by the temperature sensors 1091 to 1094 are sent to the ECU 113.

The power switch 111 is a switch operated by the driver to start or stop the motor-driven vehicle in which the power supply device 100 is mounted. When the power switch 111 is operated (is turned on) while the motor-driven vehicle is in a stop state, a power switch signal indicating a start is input to the ECU 113. When the power switch 111 is operated (is turned off) in a state where the motor-driven vehicle is operating, a power switch signal indicating a stop is input to the ECU 113.

The ECU 113 controls the fuel cell 101, selects one or more phases to be driven from among the four phases that constitute the FC-VCU 103, performs on/off switch control using switching signals that are supplied to the switching elements of the selected phases, and controls the PDU 13 and the VCU 15. The ECU 113 performs power distribution control using the VCU 15 so as to take advantage of the characteristics of the fuel cell 101 and those of the battery 17, the characteristic of the fuel cell 101 being different from those of the battery 17. If this power distribution control is performed, the fuel cell 101 is used so as to supply constant power to the motor/generator 11 when the motor-driven vehicle is traveling while increasing the speed, and the battery 17 is used to supply power to the motor/generator 11 when a large driving force is required for the motor-driven vehicle to travel. When the motor-driven vehicle is traveling while decreasing the speed, the ECU 113 charges the battery 17 by using regenerative power generated by the motor/generator 11.

The ECU 113 performs various types of control on the FC-VCU 103 according to first to eleventh examples described below. Hereinafter, various types of control performed according to the examples are described in detail with reference to the drawings.

First Example

The ECU 113 according to the first example switches the driving pattern of the phases in the FC-VCU 103 in response to an on/off operation of the power switch 111.

FIG. 9 is a diagram of the first example illustrating, for different numbers of operating phases, phases that are driven in accordance with each driving pattern in the FC-VCU 103. The ECU 113 according to the first example controls the FC-VCU 103 in accordance with one of the four driving patterns illustrated in FIG. 9. For example, in a case of driving the FC-VCU 103 with one phase in accordance with the driving pattern 1, the ECU 113 performs on/off switch control on the switching element of phase 1. In a case of driving with two phases, the ECU 113 performs on/off switch control on the switching elements of phase 1 and phase 2 with a phase difference of 180 degrees. In a case of driving with four phases, the ECU 113 performs on/off switch control on the switching elements of phase 1 to phase 4 with a phase difference of 90 degrees. In the case of two phases, a phase that is driven in the case of one phase and another phase that shares the iron core of the reactor with the phase, such as "phase 1 and phase 2" or "phase 3 and phase 4", in other words, a phase and another phase that is magnetically coupled to the phase, namely, two phases in total, are driven. However, in a case of driving, with two phases, an FC-VCU 203 illustrated in FIG. 7 and FIG. 8 in which the iron cores are individually provided to the reactors of the respective phases, a phase that is driven in the case of one phase and one of the remaining three phases are driven. The driving patterns in the FC-VCU 103 illustrated in FIG. 9 exclude a three-phase operation because of a reason described below. However, in a case of using the FC-VCU 203 illustrated in FIG. 7 and FIG. 8, driving may be performed with three phases. The number of operating phases in the FC-VCU 103 or in the FC-VCU 203 may be determined by the ECU 113 based on the input current IFC to the FC-VCU 103 or to the FC-VCU 203.

Figure 10:
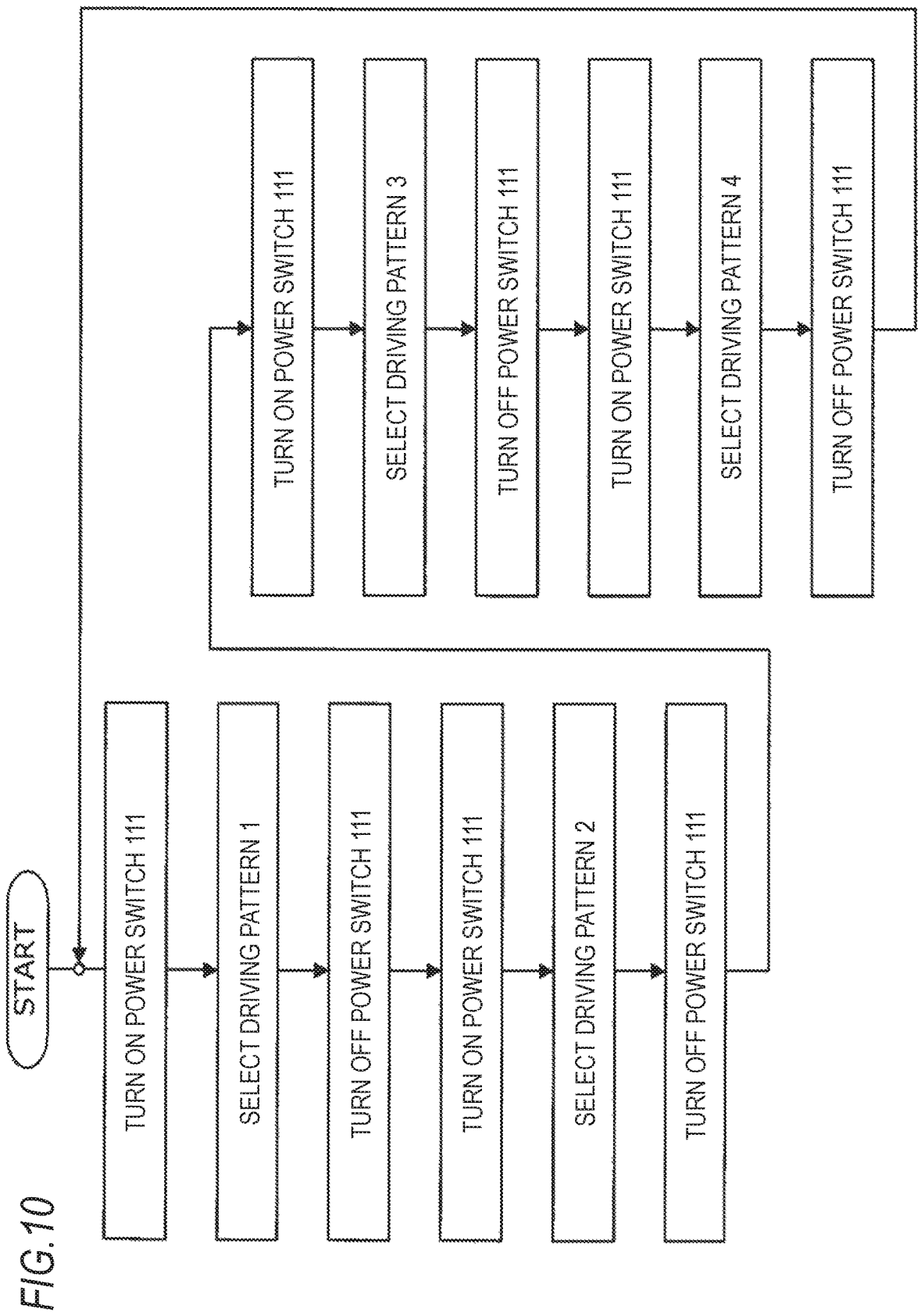
FIG. 10 is a flowchart for describing a selection procedure for selecting a driving pattern of the FC-VCU performed by an ECU according to the first example.

FIG. 10 is a flowchart for describing a selection procedure for selecting a driving pattern of the FC-VCU 103 performed by the ECU 113 according to the first example. As illustrated in FIG. 10, the ECU 113 sequentially selects one from among the four driving patterns 1 to 4 illustrated in FIG. 9 each time the power switch 111 is operated and turned on while the motor-driven vehicle is in the stop state. The ECU 113 controls the FC-VCU 103 so as to make one or more of the switching elements of the phases specified by the selected driving pattern perform an on/off switch operation in accordance with the flowchart illustrated in FIG. 10. As a result, by cyclically selecting the driving patterns described above, loads are equally applied to the respective phases, and therefore, the FC-VCU 103 can be made more durable and have longer life.

As described above, the control performed so as to allow loads to be equally applied to the respective phases according to the first example is simple control in which one of the four driving patterns 1 to 4 is sequentially selected each time the power switch 111 is operated and turned on while the motor-driven vehicle is in the stop state. The above-described control is simple control and further makes the control of the FC-VCU 103 stable because the cyclic selection of driving patterns, which is a complicated control parameter change, can be performed while the FC-VCU 103 is not operating and before the FC-VCU 103 starts operating. Note that, in the flowchart illustrated in FIG. 10, the ECU 113 selects a driving pattern after the power switch 111 has been operated and turned on; however, the ECU 113 may select and store a driving pattern in memory when the power switch 111 is operated and turned off and may thereafter read the stored driving pattern when the power switch 111 is operated and turned on. In the diagram illustrated in FIG. 9, all of the driving patterns are limited to driving with one phase, two phases, and four phases, and none of the driving patterns includes driving with three phases; however, for some of the driving patterns, three phases that are driven in a case of driving with three phases may be set in addition to one phase, two phases, and four phases.

Note that the ECU 113 according to the first example may perform power saving control described in the seventh example and phase current balance control described in the eighth example while the motor-driven vehicle is traveling in addition to the control described above. When only the control according to the first example is performed, loads are not equally applied while the motor-driven vehicle is traveling. When the above-described additional control is performed, loads can be equally applied to the respective phases even while the motor-driven vehicle is traveling, and therefore, the FC-VCU 103 can further be made more durable and have longer life.

In addition, the cyclic selection of driving patterns described in the first example, and the power saving control described in the seventh example and the phase current balance control described in the eighth example are performed in order to suppress a state where a load is intensively applied to a specific phase. In order to allow loads to be equally applied to the respective phases in a more appropriate manner by combining these control operations, contention (hunting) between the control operations needs to be avoided so that the respective control operations normally function.

A major control parameter in the cyclic selection of driving patterns described in the first example is an on/off operation of the power switch 111. A major control parameter in the power saving control described in the seventh example includes the output values of the temperature sensors 1091 to 1094. A major control parameter in the phase current balance control described in the eighth example includes values detected by the phase current sensors 1051 to 1054. As described above, the major control parameters in the respective control operations are different from one another, and therefore, any one of the control operations does not affect the remaining control operations at all.

Further, the power saving control described in the seventh example and the phase current balance control described in the eighth example are performed while the motor-driven vehicle is traveling. Meanwhile, the cyclic selection of driving patterns described in the first example is performed while the motor-driven vehicle is in the stop state (upon starting the motor-driven vehicle), that is, the cyclic selection is applied in a completely different situation.

That is, for the cyclic selection of driving patterns described in the first example, and for the power saving control described in the seventh example and the phase current balance control described in the eighth example, duplicated hunting measures, namely, a measure based on the major control parameters and a measure based on the situations in which the control operations are to be applied, are taken. Therefore, when these control operations are appropriately combined, the FC-VCU 103 can further be made more durable and have longer life.

Second Example

The ECU 113 according to the second example drives phase 2 or phase 3 arranged close to the center of the X-Y plane among phase 1 to phase 4 aligned and arranged on the X-Y plane in a case of driving the magnetic-coupling-type FC-VCU 103 illustrated in FIG. 2 and FIG. 6 with one phase.

Figures 11, 12:
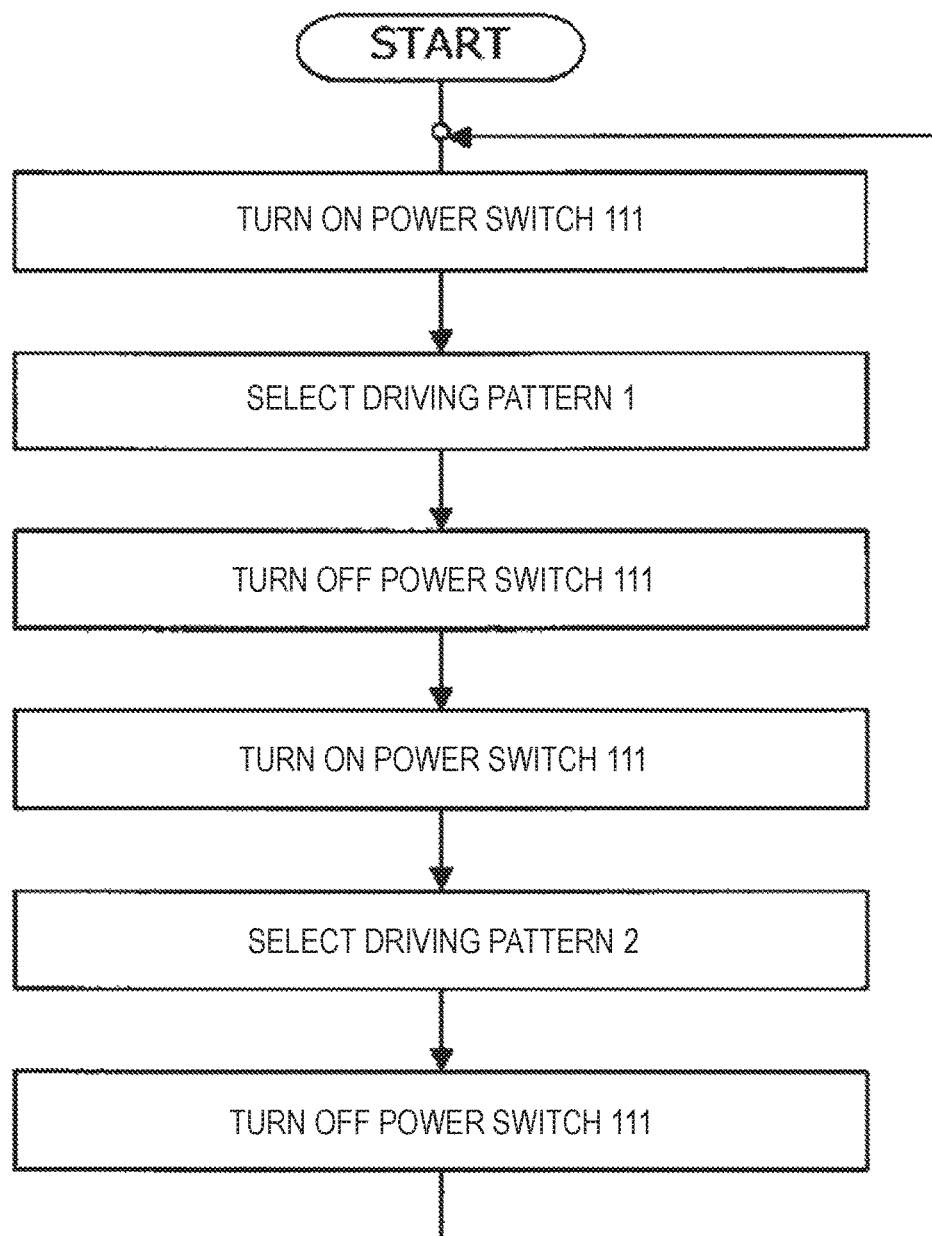
FIG. 11 is a diagram of a second example illustrating, for different numbers of operating phases, phases that are driven in accordance with each driving pattern in the FC-VCU.
FIG. 12 is a flowchart for describing a selection procedure for selecting a driving pattern of the FC-VCU performed by the ECU according to the second example.

FIG. 11 is a diagram of the second example illustrating, for different numbers of operating phases, phases that are driven in accordance with each driving pattern in the FC-VCU 103. The ECU 113 according to the second example controls the FC-VCU 103 in accordance with one of the two driving patterns illustrated in FIG. 11. For example, in a case of driving the FC-VCU 103 with one phase in accordance with the driving pattern 1, the ECU 113 performs on/off switch control on the switching element of phase 2. In a case of driving with two phases, the ECU 113 performs on/off switch control on the switching elements of phase 1 and phase 2 with a phase difference of 180 degrees. In a case of driving with four phases, the ECU 113 performs on/off switch control on the switching elements of phase 1 to phase 4 with a phase difference of 90 degrees. In the case of two phases, a phase that is driven in the case of one phase and another phase that shares the iron core of the reactor with the phase, such as "phase 1 and phase 2" or "phase 3 and phase 4", in other words, a phase and another phase that is magnetically coupled to the phase, namely, two phases in total, are driven. However, in a case of driving, with two phases, the FC-VCU 203 illustrated in FIG. 7 and FIG. 8, in which the iron cores are individually provided to the reactors of the respective phases, a phase that is driven in the case of one phase (phase 2 or phase 3) and another phase adjacent to the phase and arranged close to the center of the X-Y plane (phase 3 or phase 2) are driven. In a case of using the FC-VCU 203 illustrated in FIG. 7 and FIG. 8, driving may be performed with three phases. The number of operating phases in the FC-VCU 103 or in the FC-VCU 203 may be determined by the ECU 113 based on the input current IFC to the FC-VCU 103 or to the FC-VCU 203.

FIG. 12 is a flowchart for describing a selection procedure for selecting a driving pattern of the FC-VCU 103 performed by the ECU 113 according to the second example. As illustrated in FIG. 12, the ECU 113 sequentially selects one from among the two driving patterns 1 and 2 illustrated in FIG. 11 each time the power switch 111 is operated and turned on while the motor-driven vehicle is in the stop state. The ECU 113 controls the FC-VCU 103 based on the driving pattern selected in accordance with the flowchart illustrated in FIG. 12.

As described above, according to the second example, a phase that is driven in the case of driving the FC-VCU 103 with one phase is phase 2 or phase 3 arranged close to the center of the X-Y plane among phase 1 to phase 4 aligned and arranged as illustrated in FIG. 6. The reason why phase 2 or phase 3 is preferentially used is that the lengths of the lines from phase 2 to the smoothing capacitors C1 and C2 (112 and 122 in FIG. 6) are respectively shorter than the lengths of the lines from phase 1 to the smoothing capacitors C1 and C2 (111 and 121 in FIG. 6) or that the lengths of the lines from phase 3 to the smoothing capacitors C1 and C2 (113 and 123 in FIG. 6) are respectively shorter than the lengths of the lines from phase 4 to the smoothing capacitors C1 and C2 (114 and 124 in FIG. 6). If a line is long, the L component increases and the smoothing capability of the smoothing capacitors C1 and C2 decreases. Therefore, if phase 1 or phase 4 is selected, switching ripple generated in response to an operation of the power switch 111 becomes large. However, if phase 2 or phase 3 for which the lengths of the lines to the smoothing capacitors C1 and C2 are shorter is preferentially used as a phase with which voltage conversion is performed, and phase 1 or phase 4 for which the lengths of the lines to the smoothing capacitors C1 and C2 are longer are not used, as in the second example, the input/output currents of the FC-VCU 103 are sufficiently smoothed by the smoothing capacitors C1 and C2 and ripple is suppressed. The noise level of phase 2 and phase 3 that externally affects the FC-VCU 103 is lower than the noise level of phase 1 and phase 4 arranged close to the edge of the FC-VCU 103. Noise from other electric and electronic parts provided around the FC-VCU 103 is blocked by phase 1 and phase 4, and therefore, the noise level is low due to the effect of blocking, and the ripple is small. Accordingly, the ECU 113 preferentially uses phase 2 or phase 3 in the case of driving the FC-VCU 103 with one phase. As a result, it is possible to suppress a state where loads are intensively applied to some of the phases and to suppress adverse effects on other electric and electronic parts provided around the FC-VCU 103 to the extent possible. Note that, in the diagram illustrated in FIG. 11, all of the driving patterns are limited to driving with one phase, two phases, and four phases, and none of the driving patterns includes driving with three phases; however, for some of the driving patterns, three phases that are driven in the case of driving with three phases may be set in addition to one phase, two phases, and four phases.

A first advantage of the second example is that the volume of the smoothing capacitors C1 and C2 can be reduced due to lowered ripple of the output current from the FC-VCU 103, resulting in the FC-VCU 103 having a lighter weight and a smaller size. In addition, a second advantage is that loads are allowed to be equally applied to the respective phases, and therefore, the FC-VCU 103 can be made more durable and have longer life. That is, the second example can simultaneously provide both the first and second advantages.

Similarly to the cyclic selection of driving patterns described in the first example, the cyclic selection of driving patterns described in the second example can be combined with the power saving control described in the seventh example and the phase current balance control described in the eighth example to thereby make the FC-VCU 103 more durable and have longer life. As in the first example, the duplicated hunting measures, namely, the measure based on the major control parameters and the measure based on the situations in which the control operations are to be applied, are taken for the cyclic selection of driving patterns described in the second example to avoid contention with the power saving control described in the seventh example and the phase current balance control described in the eighth example. Therefore, when these control operations are appropriately combined, the FC-VCU 103 can further be made more durable and have longer life.

Note that the cyclic selection of driving patterns described in the second example is applicable to a multiphase converter other than the four-phase magnetic-coupling-type multiphase converter. In a first modification of the second example, the cyclic selection of driving patterns may be performed in a 2N-phase magnetic-coupling-type multiphase converter in which adjacent phases are magnetically coupled to each other in sets of two, where N is a natural number equal to or larger than three. For example, in a six-phase magnetic-coupling-type multiphase converter, phase 3 or phase 4 that is positioned in the center of the multiphase converter is used in the case of driving with one phase, both phase 3 and phase 4 magnetically coupled to each other are used in the case of driving with two phases, and phase 2 or phase 5 that is a phase closer to the center of the multiphase converter next to phase 3 and phase 4 is additionally used in the case of driving with three phases. That is, the driving patterns may be set so that a phase positioned closer to the center of the multiphase converter and another phase that is magnetically coupled to the phase are preferentially driven.

Note that the cyclic selection of driving patterns described in the second example is applicable to a multiphase converter other than the multiphase converter in which phases are magnetically coupled to each other in sets of two. In a second modification of the second example, the cyclic selection of driving patterns may be performed in an L×M-phase magnetic-coupling-type multiphase converter in which adjacent phases are magnetically coupled to each other in sets of M, where M is a natural number equal to or larger than three and L is a natural number equal to or larger than one. For example, in a six-phase magnetic-coupling-type multiphase converter, as a first driving pattern, phase 3 that is positioned in the center of the multiphase converter is used in the case of driving with one phase, phase 2 among phase 1 and phase 2 that are magnetically coupled to phase 3, phase 2 being closer to the center of the multiphase converter, and phase 3 are used in the case of driving with two phases, phase 1 to phase 3 are used in the case of driving with three phases, and phase 4 that is positioned in the center of the multiphase converter is used in addition to phase 1 to phase 3 in the case of driving with four phases. As a second driving pattern, phase 4 that is positioned in the center of the multiphase converter is used in the case of driving with one phase, phase 5 among phase 5 and phase 6 that are magnetically coupled to phase 4, phase 5 being closer to the center of the multiphase converter, and phase 4 are used in the case of driving with two phases, phase 4 to phase 6 are used in the case of driving with three phases, and phase 3 that is positioned in the center of the multiphase converter is used in addition to phase 4 to phase 6 in the case of driving with four phases. The first and second driving patterns are cyclically selected.

Further, note that the cyclic selection of driving patterns described in the second example is applicable to a multiphase converter that does not include magnetically coupled phases. In a third modification of the second example, the cyclic selection of driving patterns may be performed in a multiphase converter that does not include magnetically coupled phases. In the third modification, no phases are magnetically coupled to each other, and therefore, a phase that is positioned closer to the center of the multiphase converter is preferentially used each time the number of phases that are driven increases.

Third Example

The ECU 113 according to the third example determines the number of operating phases of the FC-VCU 103 by using a loss map based on only the input current IFC, the loss map being created in advance based on the input current IFC to the FC-VCU 103, the input current IFC being the output current from the fuel cell 101, the input voltage V1 of the FC-VCU 103, the input voltage V1 being the output voltage of the fuel cell 101, and the output voltage V2 of the FC-VCU 103, the output voltage V2 being a target value. In the following description, the value of "output voltage V2/input voltage V1" is referred to as the boosting ratio of the FC-VCU 103.

Figure 13:
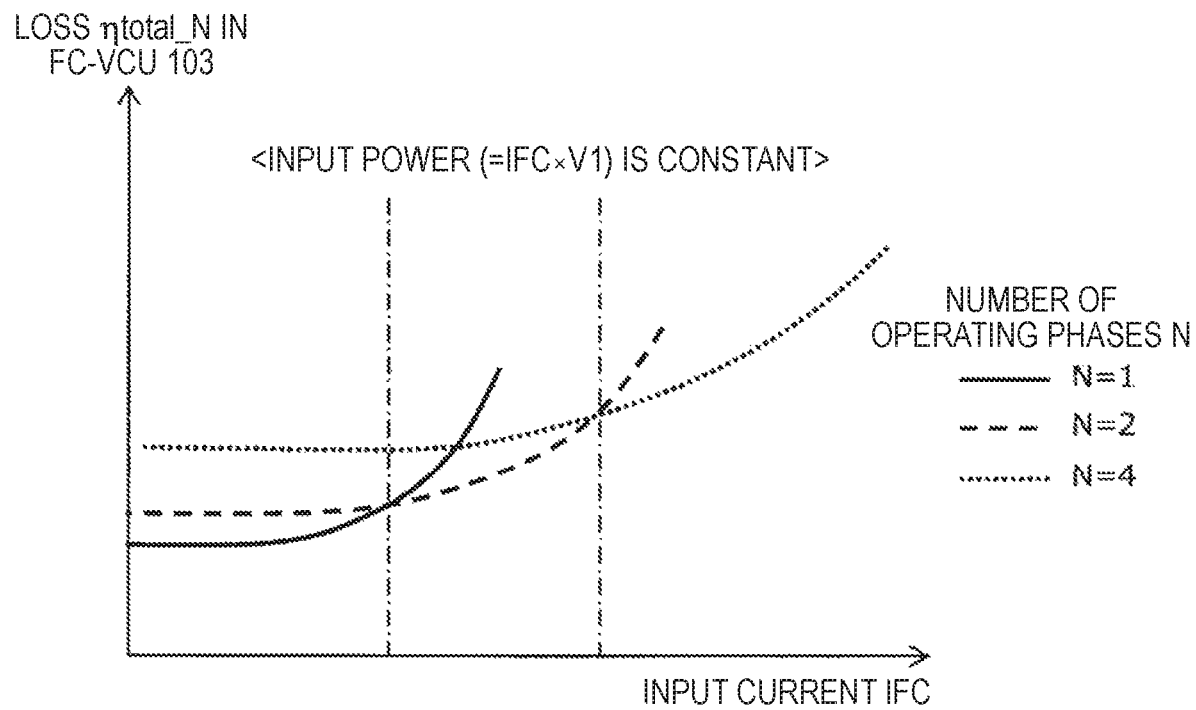
FIG. 13 is a graph illustrating, for each value of N, N being the number of operating phases, a loss ηtotal_N in the FC-VCU relative to the input current IFC in a case where the input power of the FC-VCU is made constant.
Figure 14:
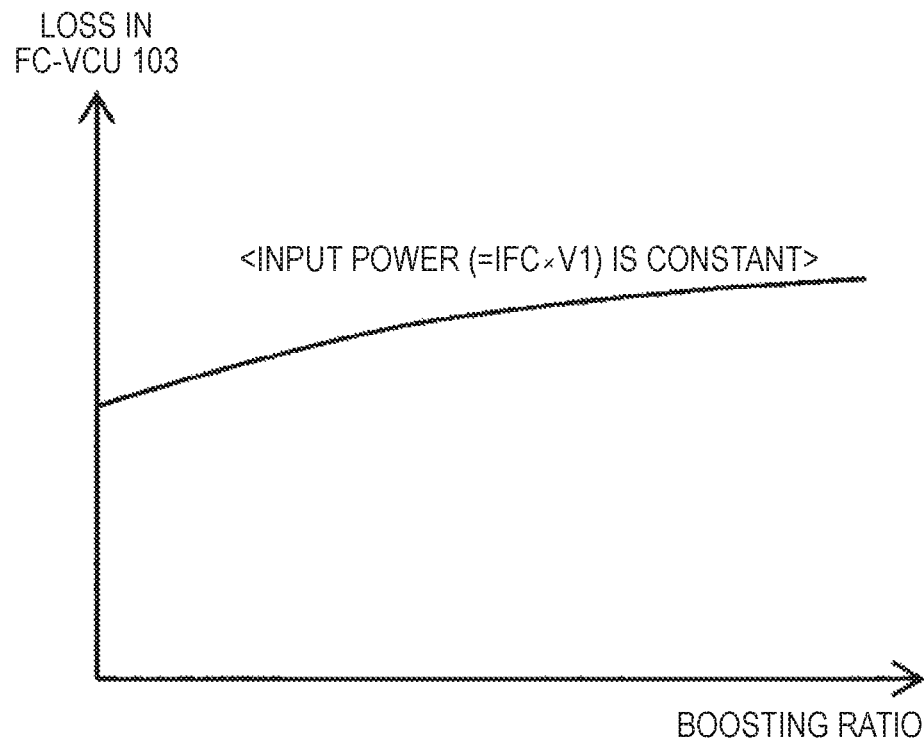
FIG. 14 is a graph illustrating a loss in the FC-VCU relative to the boosting ratio in a case where the input power is made constant and the FC-VCU is driven with a predetermined number of phases.

FIG. 13 is a graph illustrating, for each value of N, N being the number of operating phases, a loss $\eta$total_N in the FC-VCU 103 relative to the input current IFC in a case where the input power (=IFC×V1) of the FC-VCU 103 is made constant. FIG. 14 is a graph illustrating a loss in the FC-VCU 103 relative to the boosting ratio in a case where the input power is made constant and the FC-VCU 103 is driven with a predetermined number of phases. As illustrated in FIG. 13, the magnitude of a loss in the FC-VCU 103 varies depending on the input current IFC and also on the number of operating phases N. Therefore, a value of the number of operating phases N with which the loss is minimized in the case where the input power is made constant can be obtained from the input current IFC. However, as illustrated in FIG. 14, the magnitude of a loss in the FC-VCU 103 varies depending also on the boosting ratio (=output voltage V2/input voltage V1). For a commercial power system, which is a constant power supply, for example, the number of operating phases can be appropriately changed based on only FIG. 13 and FIG. 14; however, for a power supply having I-V characteristics in which the output voltage varies in accordance with the output current as described below, the I-V characteristics need to be taken into consideration in order to appropriately change the number of operating phases.

Figure 15:
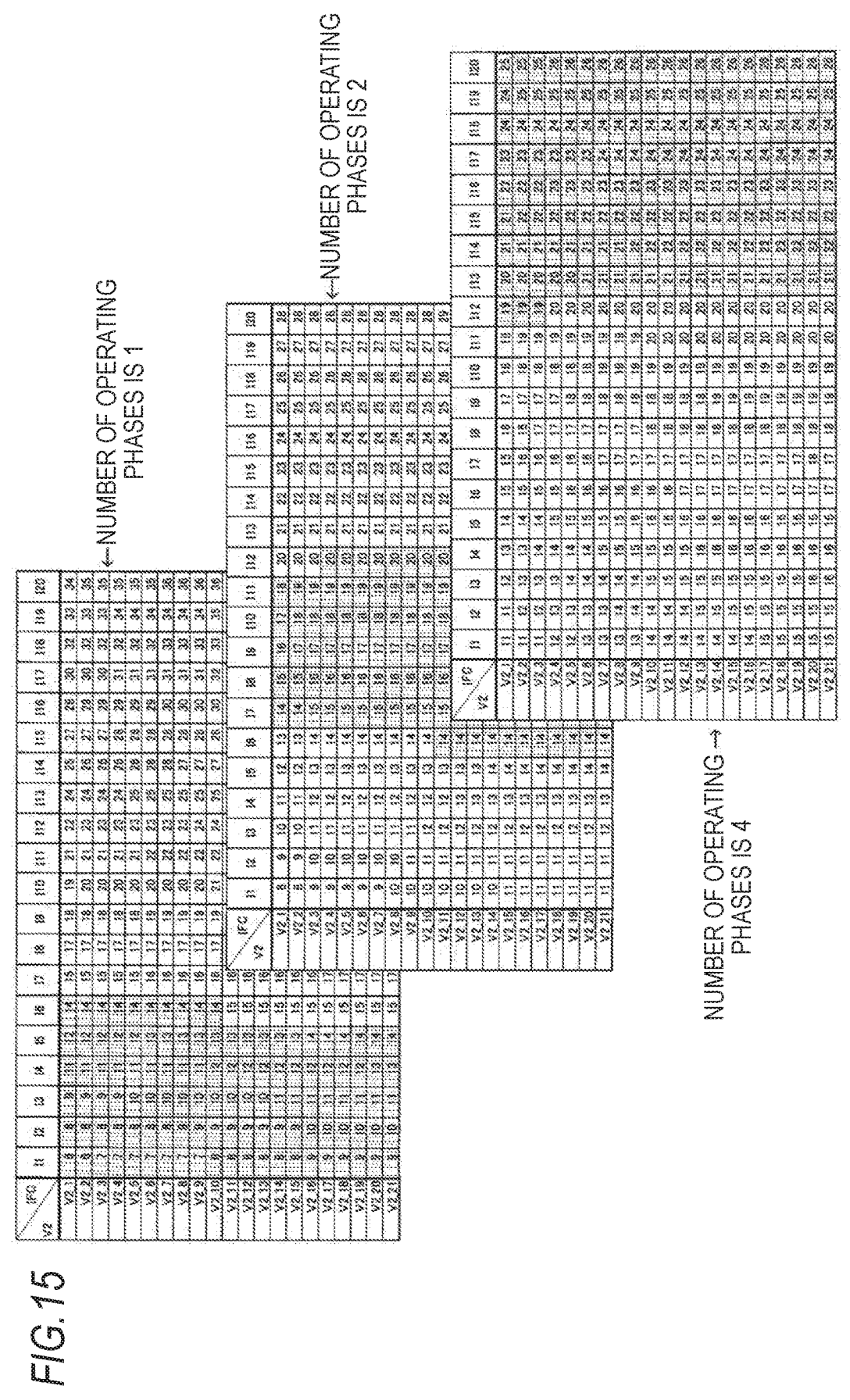

Therefore, in the third example, a loss in the FC-VCU 103 relative to the input current IFC is derived in advance for each value of the output voltage V2 of the FC-VCU 103, and a loss map is created for each value of the number of operating phases N. In the third example, the FC-VCU 103 illustrated in FIG. 2 and FIG. 6 is driven with one phase, two phases, or four phases for a reason described below, and therefore, a loss map for one phase, that for two phases, and that for four phases illustrated in FIG. 15 are created. In the loss maps illustrated in FIG. 15, the horizontal axis represents the input current IFC, the vertical axis represents the output voltage V2, and loss values in the FC-VCU 103 each corresponding to a corresponding one of the values of the input current IFC and a corresponding one of the values of the output voltage V2 extracted from a predetermined range are indicated. The values of the input current IFC are respectively represented by I1 to I20 and are values set at equal intervals. The values of the output voltage V2 are respectively represented by V2_1 to V2_21 and are values set at equal intervals. Note that the relationship Output Voltage V2=Boosting Ratio×Input Voltage V1 (3) is satisfied. The losses indicated in the loss maps illustrated in FIG. 15 and those in the loss map illustrated in FIG. 17 described below are not actual loss values (W) but values for describing magnitude correlations among loss values under the respective conditions, and are obtained by, for example, normalizing actual loss values.

Figure 16:
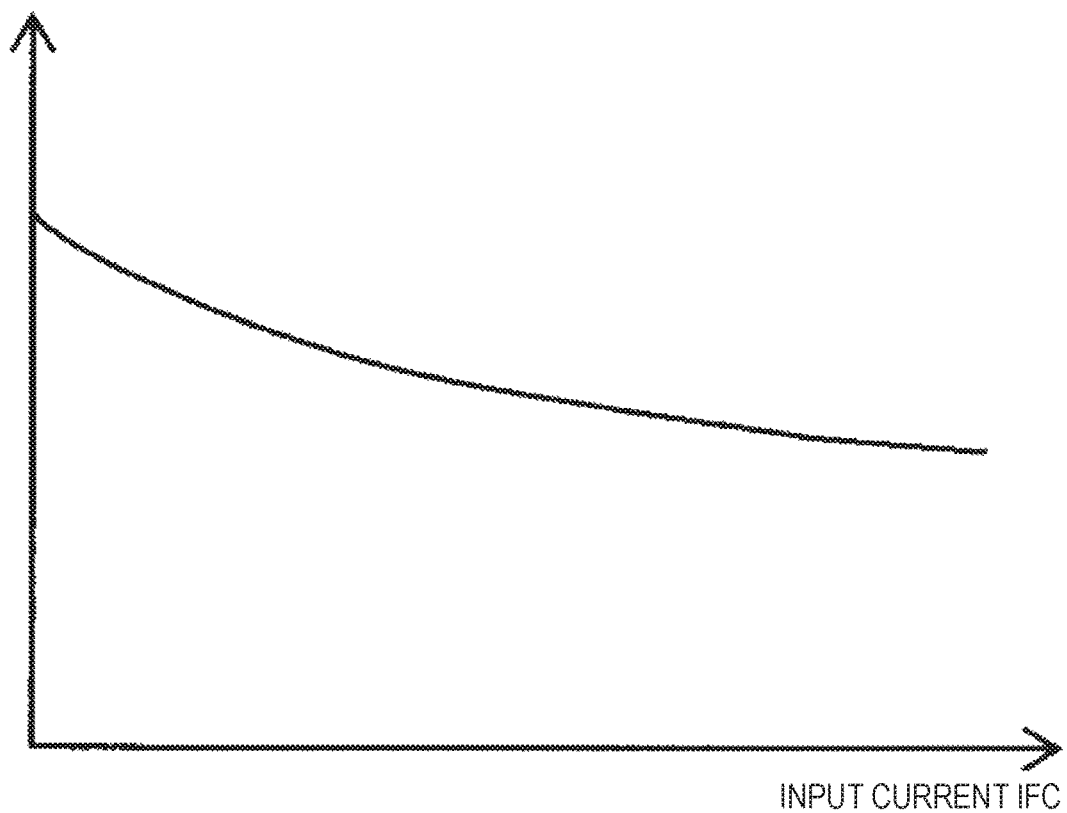
FIG. 16 is a graph illustrating the I-V characteristics of a fuel cell IV in which the closed-circuit voltage varies in accordance with the amount of discharge.

The input voltage V1 has a certain relationship based on the I-V characteristics of the fuel cell 101 relative to the input current IFC as illustrated in FIG. 16, and therefore, can be derived from the input current IFC. Accordingly, when the input voltage V1 is assumed to be a coefficient in expression (3) above, the output voltage V2 illustrated in FIG. 15 is a variable that indirectly represents the boosting ratio.

In the loss maps illustrated in FIG. 15, for each of the combinations of the values of the input current IFC and the values of the output voltage V2, a cell that includes the minimum value among three loss values that correspond to the combination, in other words, a cell that corresponds to the most efficient case, is hatched. In the third example, a combined loss map illustrated in FIG. 17 that is obtained by extracting the minimum values in the hatched cells in the three loss maps illustrated in FIG. 15 is created, and thresholds of the input current IFC based on which the number of operating phases of the FC-VCU 103 is switched are set based on the combined loss map.

Figure 17:
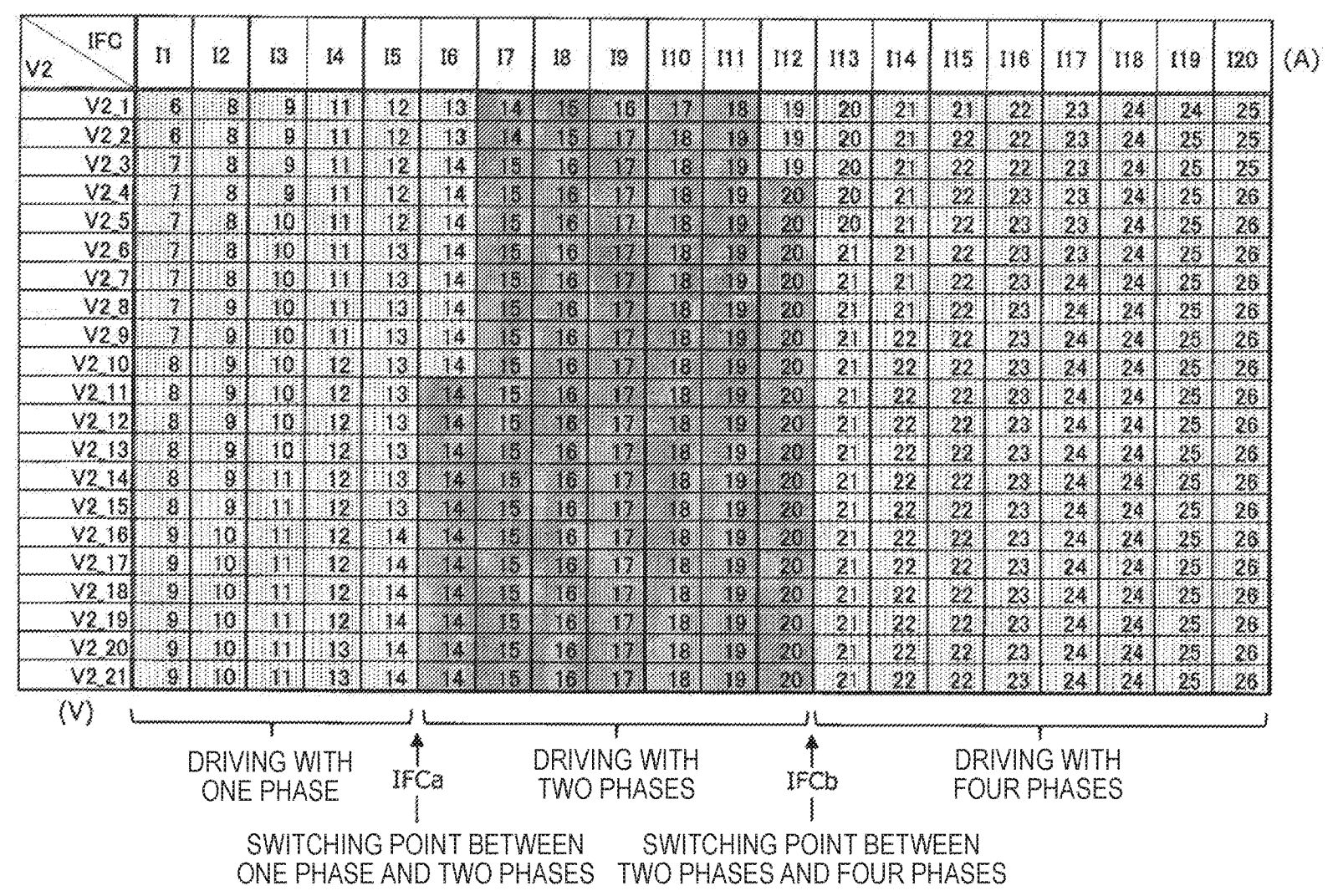

As indicated by the combined loss map in FIG. 17, in a case where the number of operating phases for which the loss value is smallest differs depending on the value of the output voltage V2 for the same value of the input current IFC, a number of operating phases for which the number of cells that include the minimum loss values for different values of the output voltage V2 is larger is set as the number of operating phases with which voltage conversion is performed for the same value of the input current IFC. For example, in the example illustrated in FIG. 17, the number of cells that include the minimum loss values for different values of the output voltage V2 when the input current IFC is I12(A) is three in a case where the number of operating phases is four and 18 in a case where the number of operating phases is two. Therefore, the number of operating phases when the input current IFC is I12(A) is set to two, and a threshold of the input current IFC based on which switching between two phases and four phases is performed is set to a value IFCb between I12(A) and I13(A). Alternatively, the combined loss map may be created by excluding a number of operating phases for which the number of cells that include the minimum loss values is smallest. The threshold set based on the combined loss map is not limited to the threshold that is set in accordance with the number of cells described above and may be a threshold that is set in accordance with the magnitudes of loss values for a predetermined value of the output voltage V2, the loss values corresponding to different numbers of operating phases. The predetermined value of the output voltage V2 is, for example, the mean or median value of values within the range of the output voltage V2 in the loss map. If the predetermined value of the output voltage V2 is V2_11, a threshold of the input current IFC based on which switching between one phase and two phases is performed is set to a value IFCa between I5(A) and I6(A), and a threshold of the input current IFC based on which switching between two phases and four phases is performed is set to a value IFCb between I12(A) and I13(A).

A threshold of the input current IFC based on which the number of operating phases is switched may be set so as to provide hysteresis in a case where the input current IFC increases and in a case where the input current IFC decreases. For example, the threshold IFCb that corresponds to the point of switching between two phases and four phases is set to I13(A) in a case where the input current IFC increases and switching from two phases to four phases is performed, and is set to I13-Δ(A) in a case where the input current IFC decreases and switching from four phases to two phases is performed. Such hysteresis is provided to thereby eliminate contention between control operations.

The loss maps illustrated in FIG. 15 and the combined loss map illustrated in FIG. 17 are maps of loss values; however, efficiency maps may be used instead of the maps of loss values. In this case, a threshold of the input current IFC is set by using a combined efficiency map based on the number of operating phases with which the efficiency is maximized.

Taking into consideration the absolute value of the rate of increase in the command value of the input current IFC and the absolute value of the rate of decrease in the command value of the input current IFC, it is desirable to set the threshold IFCb to I13(A) for a smaller absolute value and to set the threshold IFCb to I13-Δ (A) for a larger absolute value. If the absolute value is small, the value IFC is in the vicinity of the threshold for a longer time period, and therefore, switching of the number of operating phases can be performed more appropriately and the loss decreases. In the third example, the absolute value of the rate of increase in the command value of the input current IFC is smaller than the absolute value of the rate of decrease in the command value of the input current IFC, and therefore, the threshold IFCb is set to I13(A) in the case where the input current IFC increases and switching from two phases to four phases is performed, and the threshold IFCb is set to IL3-Δ(A) in the case where the input current IFC decreases and switching from four phases to two phases is performed.

The ECU 113 according to the third example determines the number of operating phases of the FC-VCU 103 by using, as reference values, the thresholds IFCa and IFCb of the input current IFC, the thresholds corresponding to the points of switching of the number of operating phases, in accordance with the above-described combined loss map illustrated in FIG. 17 and based on only the input current IFC detected by the current sensor 105 or based on only the input current IFC obtained from the values detected by the phase current sensors 1051 to 1054. Note that the loss maps illustrated in FIG. 15 and the combined loss map illustrated in FIG. 17 are created in advance by a computer different from the ECU 113.

As described above, a value necessary for the ECU 113 according to the third example to determine the number of operating phases of the FC-VCU 103 is only the input current IFC to the FC-VCU 103, and ECU 113 can determine the number of operating phases by performing simple control using the thresholds IFCa and IFCb as reference values. Accordingly, a value other than the input current IFC is not necessary for determining the number of operating phases, and therefore, efficient and appropriate switch control on the number of operating phases can be performed. As a result, even if the output of the fuel cell 101 changes, the FC-VCU 103 efficiently operates.

The above description assumes that the number of operating phases of the magnetic-coupling-type FC-VCU 103 illustrated in FIG. 2 and FIG. 6 is one, two, or four. In a case of using the FC-VCU 203 illustrated in FIG. 7 and FIG. 8 in which the iron cores are individually provided to the reactors of the respective phases, thresholds that correspond to switching points, namely, a switching point between one phase and two phases, a switching point between two phases and three phases, and a switching point between three phases and four phases, are set in accordance with a combined loss map based on four loss maps, namely, loss maps for one phase to four phases including three phases. In a case of driving the FC-VCU 103 with multiple phases, the ECU 113 according to the third example may perform the phase current balance control described in the eighth example.

In the above description, a loss under each condition is calculated for each of the values of the output voltage V2 ranging from V2_1(V) to V2_21(V) required by the FC-VCU 103, the values of the output voltage V2 being set at predetermined voltage (V) intervals, as illustrated in FIG. 15 and FIG. 17. In a modification, however, a loss under each condition may be calculated for only the mean value of values within the range of the output voltage V2 required by the FC-VCU 103, and the number of operating phases corresponding to the input current IFC may be determined based on the calculated losses. In the combined loss map illustrated in FIG. 17, the thresholds of the input current IFC can be obtained by focusing on only V2_11(V), which is the mean value of values within the range of the output voltage V2 required by the FC-VCU 103. According to this modification, the number of operating phases of the FC-VCU 103 can be changed at an efficient point, and time taken to configure control relating to the number of operating phases can be significantly reduced.

In the third example, the case where the number of operating phases is changed based on only the input current IFC is described. In a modification of the third example, however, the number of operating phases may be changed based on the output voltage V2 in addition to the input current IFC so as to perform more efficient voltage conversion. In this modification, driving with four phases is performed when the input current IFC is I12(A) and the output voltage V2 ranges from V2_1(V) to V2_3(V), and driving with two phases is performed when the input current IFC is I12(A) and the output voltage V2 ranges from V2_4(V) to V2_21(V).

Fourth Example

The ECU 113 according to the fourth example prohibits an odd number of phases except for one phase as the number of operating phases of the magnetic-coupling-type FC-VCU 103 illustrated in FIG. 2 and FIG. 6.

Figures 18, 19:
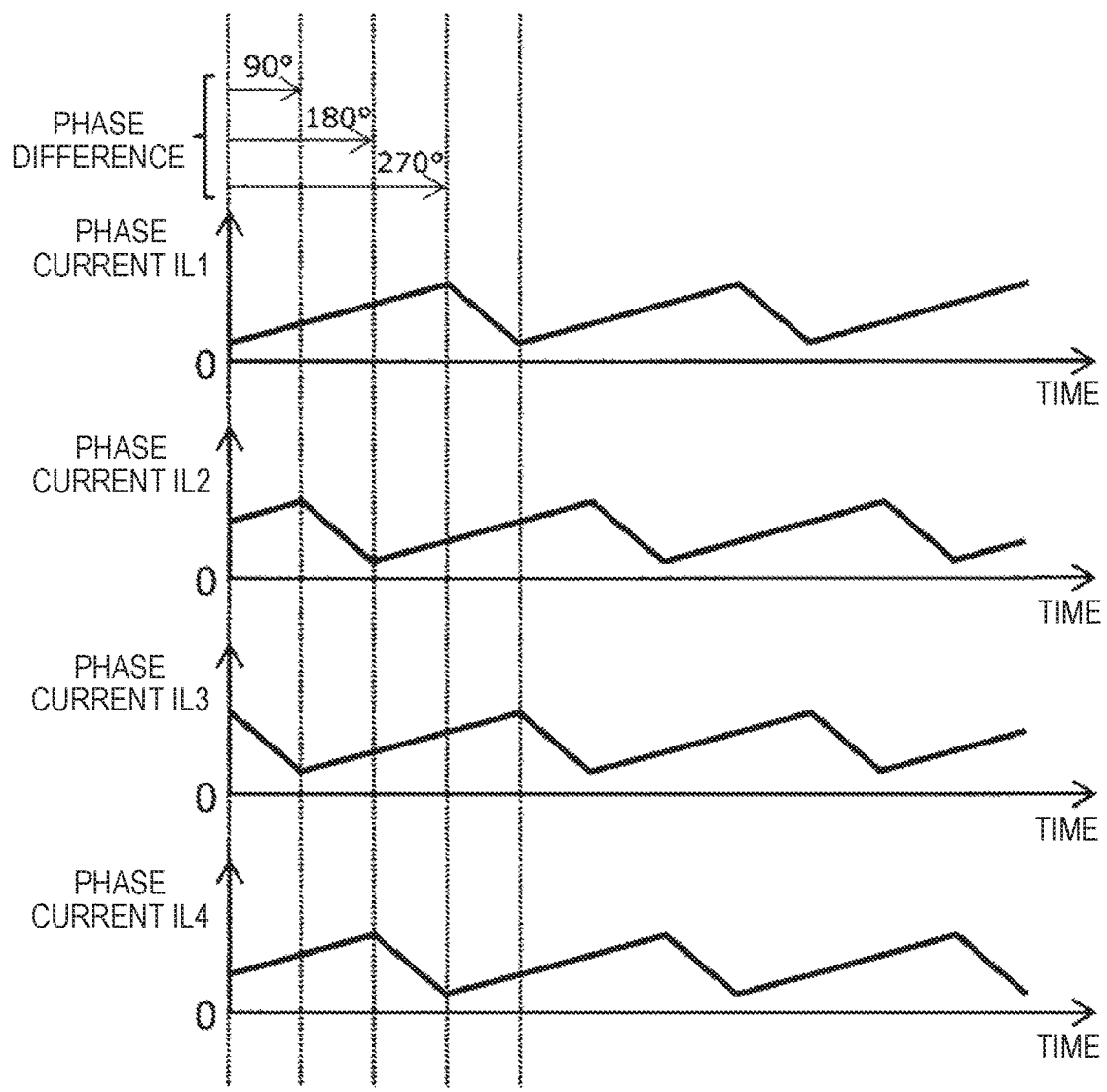
FIG. 18 is a diagram of a fourth example illustrating, for different numbers of operating phases, phases that are driven in accordance with each driving pattern in the FC-VCU.
FIG. 19 is a diagram illustrating changes in phase currents IL1 to IL4 over time that flow through the respective phases in a case of driving the FC-VCU with four phases.

FIG. 18 is a diagram of the fourth example illustrating, for different numbers of operating phases, phases that are driven in accordance with each driving pattern in the FC-VCU 103. The ECU 113 according to the fourth example controls the FC-VCU 103 in accordance with one of the four driving patterns illustrated in FIG. 18. For example, in a case of driving the FC-VCU 103 with one phase in accordance with the driving pattern 1, the ECU 113 performs on/off switch control on the switching element of phase 1. In a case of driving with two phases, the ECU 113 performs on/off switch control on the switching elements of phase 1 and phase 2 with a phase difference of 180 degrees.

In a case of driving with four phases, the ECU 113 performs on/off switch control on the switching elements of phase 1 to phase 4 with a phase difference of 90 degrees. In the case of two phases, a phase that is driven in the case of one phase and another phase that shares the iron core of the reactor with the phase, such as "phase 1 and phase 2" or "phase 3 and phase 4", namely, two phases in total, are driven.

FIG. 19 is a diagram illustrating changes in the phase currents IL1 to IL4 over time that flow through the respective phases in the case of driving the FC-VCU 103 with four phases. As illustrated in FIG. 19, the amplitudes of the phase currents IL1 to IL4 in the case of driving the FC-VCU 103 with four phases uniformly change because the input currents to the respective phases are balanced by the phase current balance control described in the eighth example. Similarly, in the case of driving the FC-VCU 103 with two phases, the amplitudes of the phase currents IL1 and IL2 when phase 1 and phase 2 are driven and the amplitudes of the phase currents IL3 and IL4 when phase 3 and phase 4 are driven uniformly change.

Figure 20:
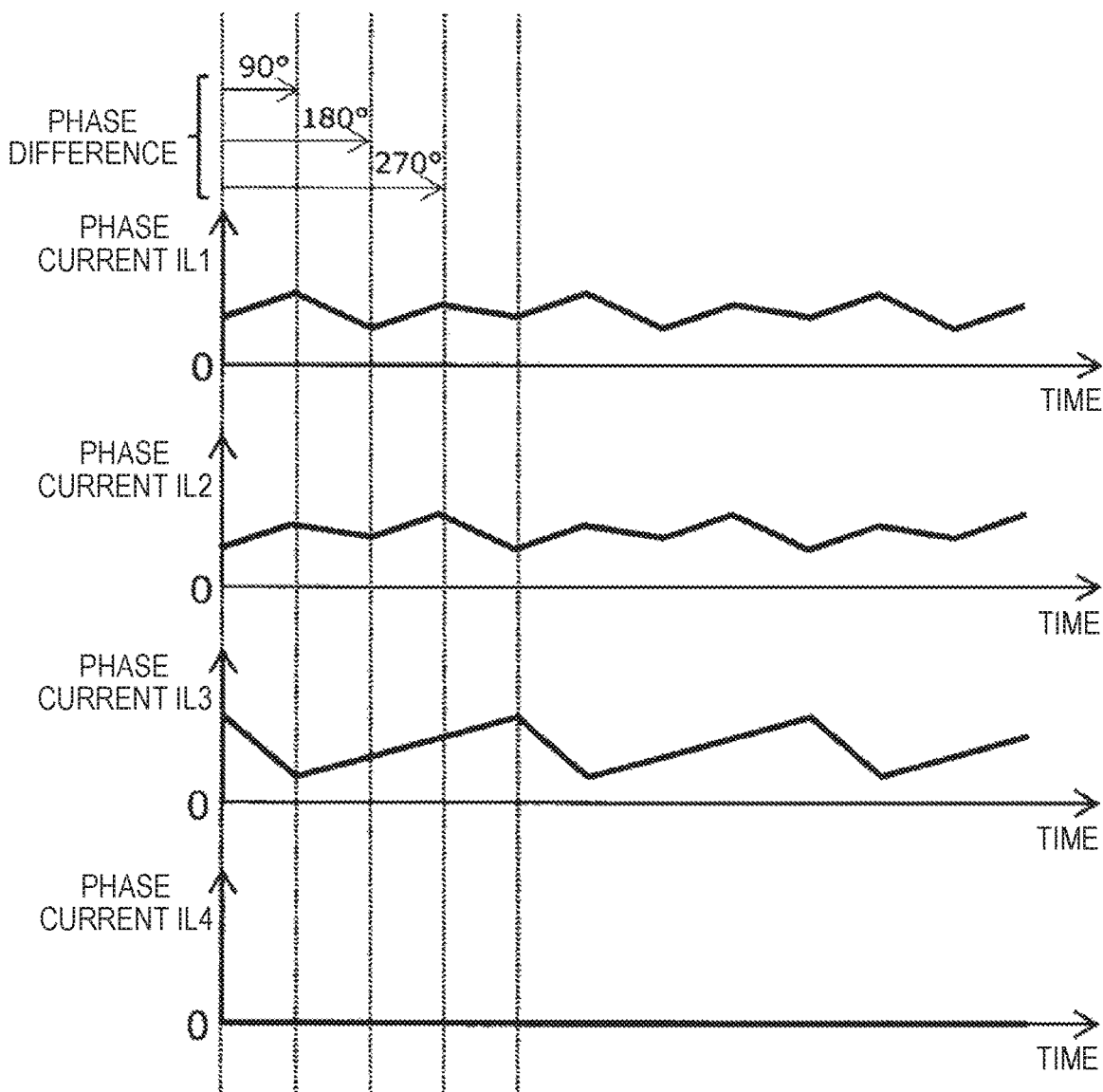
FIG. 20 is a diagram illustrating changes in the phase currents IL1 to IL4 over time that flow through the respective phases in a case of driving the FC-VCU with three phases.

FIG. 20 is a diagram illustrating changes in the phase currents IL1 to IL4 over time that flow through the respective phases in a case of driving the FC-VCU 103 with three phases. Even if the input currents to the respective phases are balanced by the phase current balance control described in the eighth example, when the number of operating phases is changed from four to three, the phase current IL4 flowing through phase 4 decreases, the magnetic flux 4 illustrated in FIG. 6 that acts in a direction so as to cancel the magnetic flux 3 of the iron core Cob reduces, and the phase current IL3 of phase 3 that forms the magnetic coupling pair and that has the opposite winding increases. As a result, the amplitude of the phase current IL3 significantly changes relative to the changes in the amplitudes of the phase currents IL1 and IL2, as illustrated in FIG. 20, and a higher load is applied to phase 3 than those applied to the remaining phases.

Therefore, the ECU 113 according to the fourth example prohibits driving of the FC-VCU 103 with an odd number of phases except for one phase. Note that, also in a case of changing the number of operating phases from two to three, similar imbalance between the phase currents occurs.

If driving with one phase is also prohibited, the energy efficiency of the FC-VCU 103 decreases specifically when the input current IFC is low, as illustrated in FIG. 5. Therefore, the ECU 113 according to the fourth example allows driving with one phase even for the magnetic-coupling type FC-VCU 103.

As described above, according to the fourth example, an odd number of phases except for one phase is prohibited as the number of operating phases of the magnetic-coupling-type FC-VCU 103. Accordingly, it is possible to prevent a state where a load is intensively applied to a single phase, and therefore, the FC-VCU 103 can have longer life and be made more durable. If driving with an odd number of phases is prohibited, one of the paired phases that share the iron core is not driven except for the case where the number of operating phases is one, and therefore, the amplitudes of the phase currents of the phases that are driven uniformly change, and control of the FC-VCU 103 is stable. Further, the amplitudes of the phase currents of the phases that are driven uniformly change, and therefore, ripple of the output current from the FC-VCU 103 is reduced by the interleave control described above and the volume of the smoothing capacitor C2 can be reduced, resulting in the FC-VCU 103 having a lighter weight and a smaller size.

The fourth example has been described while assuming the case where two adjacent phases are magnetically coupled to each other. In a modification of the fourth example, in a case where N adjacent phases are magnetically coupled to each other, only one phase and a number of phases, the number being a multiple of N, are used as the operating phases, and it is prohibited to use only some of the N phases that are magnetically coupled to each other as the operating phases except for one phase, where N is a natural number equal to or larger than three.

In the above description, the one-phase operation is exceptionally allowed in order to suppress a decrease in the energy efficiency of the FC-VCU 103 specifically when the input current IFC is low. In a modification, however, the one-phase operation may be prohibited in order to further make the FC-VCU 103 more durable and have longer life.

Fifth Example

The ECU 113 according to the fifth example changes, in a stepwise and successive manner, the duty ratio for on/off switch control on the switching element of a phase that starts being driven or the duty ratio for on/off switch control on the switching element of a phase that stops being driven when the number of operating phases of the FC-VCU 103 is switched.

Figure 21:
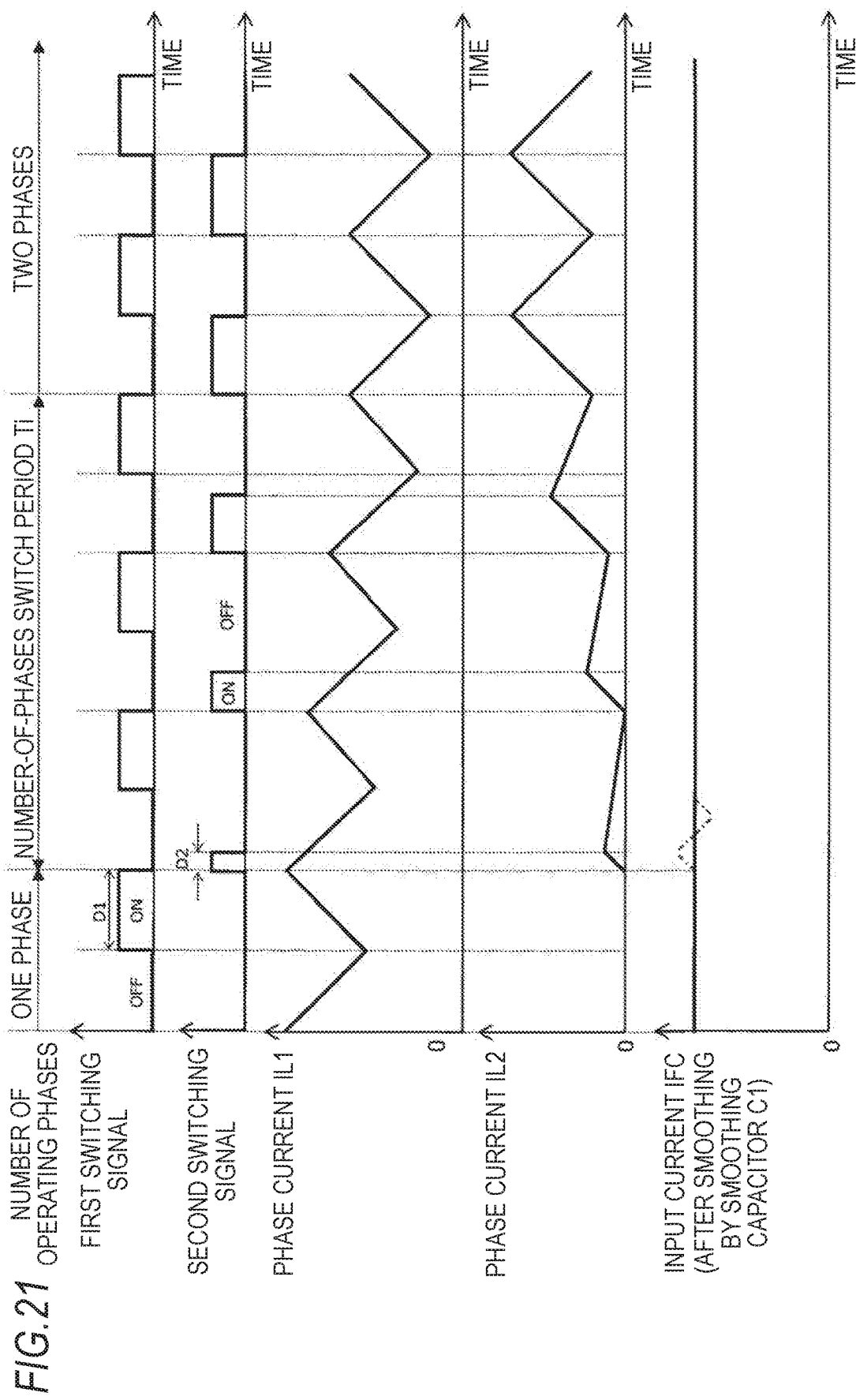
FIG. 21 is a diagram of a fifth example illustrating changes in a duty ratio over time that is used in on/off switch control on the switching element of phase 1 that is being driven, changes in duty ratios D1 and D2 over time that is used in on/off switch control on the switching element of phase 2 that starts being driven, changes in the phase currents IL1 and IL2 over time, and changes in the input current IFC over time, for example, when the number of operating phases of the FC-VCU is switched from one to two.

FIG. 21 is a diagram of the fifth example illustrating changes in a duty ratio D1 over time that is used in on/off switch control on the switching element of phase 1 that is kept driven, changes in a duty ratio D2 over time that is used in on/off switch control on the switching element of phase 2 that starts being driven, changes in the phase currents IL1 and IL2 over time, and changes in the input current IFC over time, for example, when the number of operating phases of the FC-VCU 103 is switched from one to two. When phase 2 newly starts being driven in addition to phase 1 that is being driven, the ECU 113 according to the fifth example sets a number-of-phases switch period Ti for switching from one phase to two phases and changes the duty ratio D2 for on/off switch control on the switching element of phase 2 that starts being driven in a stepwise manner without changing the duty ratio D1 for on/off switch control on the switching element of phase 1 that is kept driven during the period Ti, as illustrated in FIG. 21. Note that, in the end, the duty ratio for phase 2 after the number-of-phases switch period Ti becomes equal to the duty ratio for phase 1.

If the ECU 113 starts driving phase 2 in accordance with a duty ratio determined based on a desired boosting ratio for the FC-VCU 103 without setting the number-of-phases switch period Ti, the input current IFC varies as represented by the dot-and-dash line in FIG. 21. This variation in the input current IFC compromises the control stability and leads to an increase in the volume of the smoothing capacitors C1 and C2, which may hinder the FC-VCU 103 from being reduced in weight and size. When the duty ratio for a phase that starts being driven is increased in a stepwise manner towards the duty ratio for a phase that is being driven, as in the fifth example, the phase current that flows through the phase that starts being driven gradually changes, and therefore, the variation in the input current IFC can be suppressed.

Figure 22:
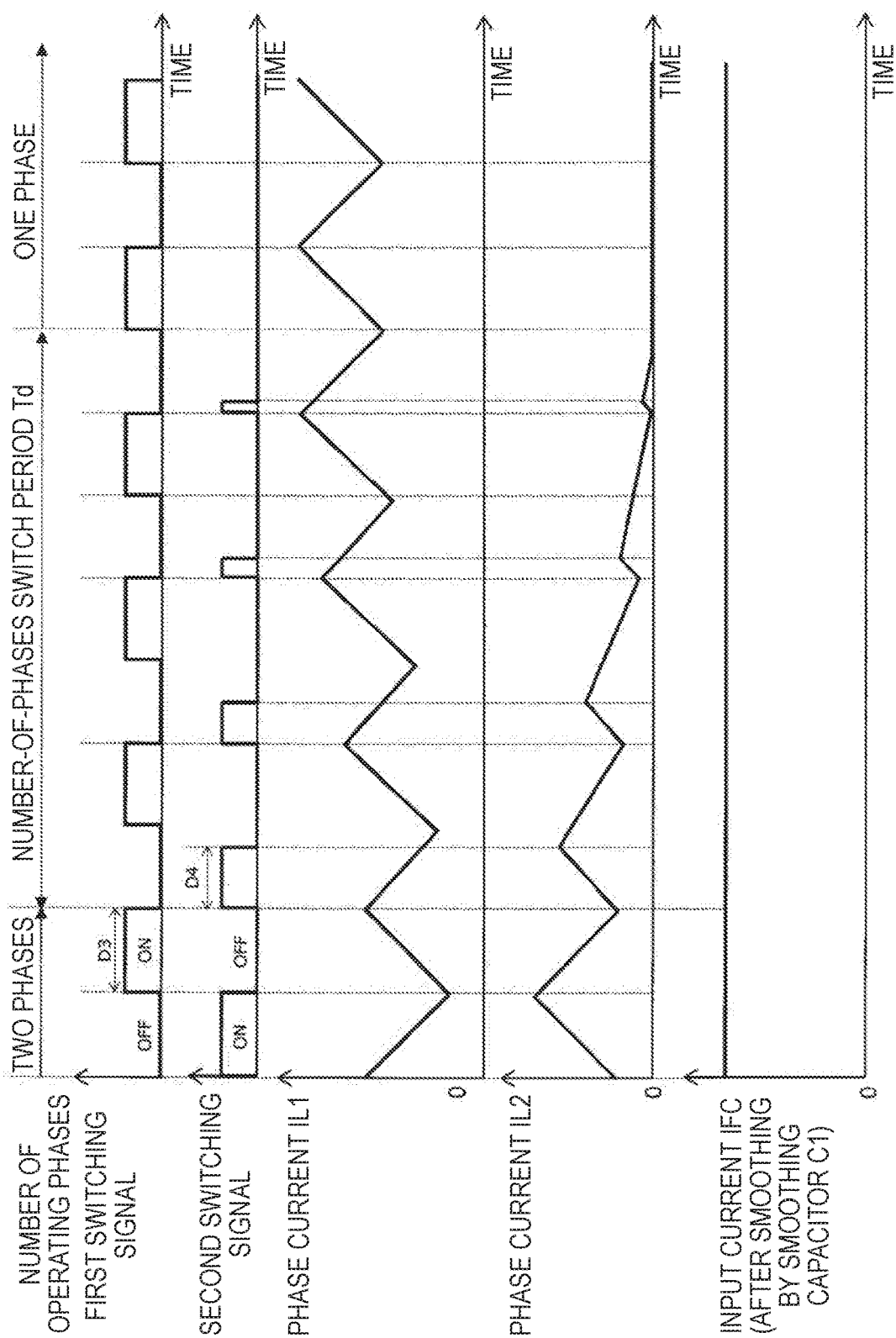
FIG. 22 is a diagram of the fifth example illustrating changes in a duty ratio over time that is used in on/off switch control on the switching element of phase 1 that is kept driven, changes in duty ratios D3 and D4 over time that is used in on/off switch control on the switching element of phase 2 that stops being driven, changes in the phase currents IL1 and IL2 over time, and changes in the input current IFC over time, for example, when the number of operating phases of the FC-VCU is switched from two to one.

When phase 2 stops being driven, for example, in order to switch the number of operating phases of the FC-VCU 103 from two to one, the ECU 113 according to the fifth example sets a number-of-phases switch period Td for switching from two phases to one phase and decreases a duty ratio D4 for on/off switch control on the switching element of phase 2 that stops being driven to zero in a stepwise manner without changing a duty ratio D3 for on/off switch control on the switching element of phase 1 that is kept driven, as illustrated in FIG. 22. FIG. 22 is a diagram illustrating changes in the duty ratio D3 over time that is used in on/off switch control on phase 1 that is being driven, changes in the duty ratio D4 over time that is used in on/off switch control on phase 2 that stops being driven, changes in the phase currents IL1 and IL2 over time, and changes in the input current IFC over time, for example, when the number of operating phases of the FC-VCU 103 is switched from two to one.

In the case of increasing the number of operating phases as illustrated in FIG. 21, a load that is applied per phase driven (hereinafter referred to as "driven phase") decreases, and therefore, the control stability of the FC-VCU 103 increases. Further, the decreased load contributes to increased durability and longer life of the FC-VCU 103. In the case of decreasing the number of operating phases as illustrated in FIG. 22, a load that is applied per driven phase increases, and therefore, the control stability of the FC-VCU 103 decreases. Further, the increased load hinders the FC-VCU 103 from being more durable and having longer life. If the number of operating phases is decreased as described above, a transition to a state occurs where the control stability of the FC-VCU 103 decreases. Therefore, the ECU 113 makes the number-of-phases switch period Td that is set in the case of decreasing the number of operating phases longer than the number-of-phases switch period Ti that is set in the case of increasing the number of operating phases, and makes the change rate of the duty ratio D4 smaller than that of D2 illustrated in FIG. 21.

Figure 23:
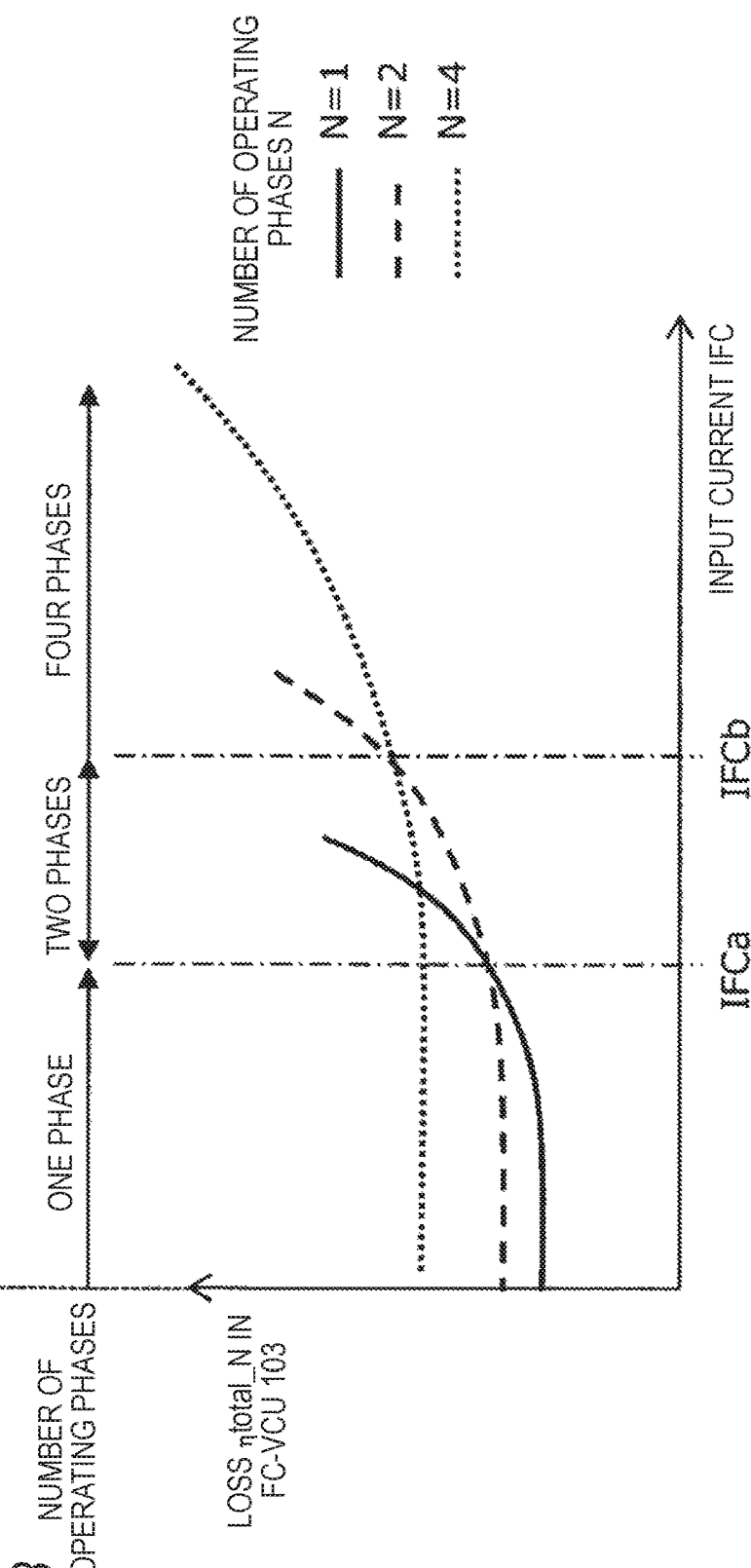
FIG. 23 is a diagram of the fifth example illustrating example relationships between thresholds of the input current IFC based on which the number of operating phases is switched and the amount of change in the phase current that flows through a driven phase associated with the switching of the number of operating phases.

The above-described examples illustrated in FIG. 21 and FIG. 22 correspond to the case of switching the number of operating phases between one phase and two phases, and the same applies to switching between two phases and four phases. However, in a case of switching the number of operating phases by referring to the thresholds IFCa and IFCb of the input current IFC used in switching of the number of operating phases and determined in advance based on a loss occurring in the FC-VCU 103, as illustrated in FIG. 23, the ECU 113 makes the number-of-phases switch periods Ti and Td longer and makes the change rate of the duty ratio smaller as the amount of change in the phase current that flows through a phase that is kept driven or the amount of change in the phase current that flows through a phase that starts being driven or through a phase that stops being driven, the phases being driven phases associated with the switching of the number of operating phases, increases. In the example illustrated in FIG. 23, the amount of change in the phase current flowing through a driven phase in the case of switching between one phase and two phases is equal to "IFCa/2", and the amount of change in the phase current flowing through a driven phase in the case of switching between two phases and four phases is equal to "IFCb/2−IFCb/4". The amount of change in the phase current in a case of switching the number of operating phases in a non-consecutive manner, such as switching between two phases and four phases, is highly likely to be larger than the amount of change in the phase current in a case of consecutively switching the number of operating phases. Accordingly, the number-of-phases switch periods in the case of non-consecutive switching of the number of operating phases are made longer than those in the case of consecutive switching.

The thresholds of the input current IFC that correspond to the points at which the number of operating phases is switched may be set so as to provide hysteresis in a case where the input current IFC increases and in a case where the input current IFC decreases. In the case where hysteresis is provided, the amount of change in the phase current flowing through a driven phase associated with a change in the number of operating phases differs between the case where the input current IFC increases and the case where the input current IFC decreases.

Figure 24:
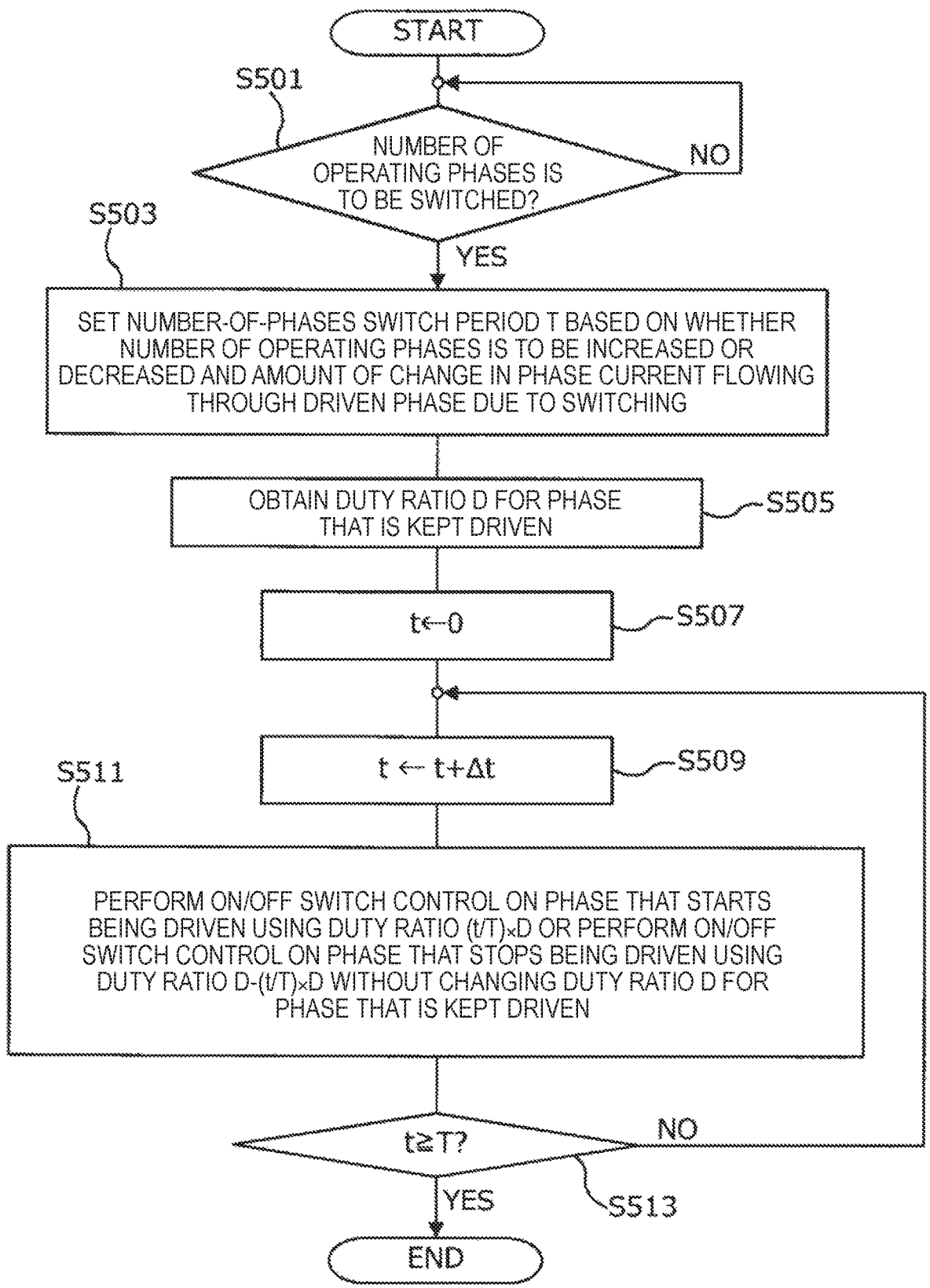
FIG. 24 is a flowchart illustrating an operation performed by the ECU according to the fifth example when the number of operating phases of the FC-VCU is switched.

FIG. 24 is a flowchart illustrating an operation performed by the ECU 113 according to the fifth example when the number of operating phases of the FC-VCU 103 is switched. As illustrated in FIG. 24, the ECU 113 determines whether the number of operating phases is to be switched (step S501). If the number of operating phases is to be switched, the flow proceeds to step S503. In step S503, the ECU 113 sets a number-of-phases switch period T based on whether the number of operating phases is to be increased or decreased and the amount of change in the phase current flowing through a driven phase due to the switching. Here, the ECU 113 makes the number-of-phases switch period T in the case of decreasing the number of operating phases longer than the number-of-phases switch period T in the case of increasing the number of operating phases, and makes the number-of-phases switch period T longer as the amount of change in the phase current flowing through a driven phase due to the switching increases. Further, the ECU 113 makes the number-of-phases switch period T in the case of switching the number of operating phases in a non-consecutive manner longer than that in the case of consecutive switching.

Next, the ECU 113 obtains a duty ratio D for a phase that is kept driven (step S505). Subsequently, the ECU 113 sets a count value t that represents time to zero (step S507). Subsequently, the ECU 113 newly sets the count value t to a value obtained by adding a control cycle Δt to the present count value t (step S509). Subsequently, the ECU 113 performs on/off switch control on the switching element of a phase that starts being driven by using a duty ratio equal to (t/T)×D in the case of increasing the number of operating phases, and performs on/off switch control on the switching element of a phase that stops being driven by using a duty ratio equal to D−(t/T)×D in the case of decreasing the number of operating phases, without changing the duty ratio D for the phase that is kept driven (step S511). Subsequently, the ECU 113 determines whether the count value t is equal to or larger than the number-of-phases switch period T (t≥T) (step S513). If t≥T is satisfied, the series of steps ends. If t<T is satisfied, the flow returns to step S509.

As described above, the ECU 113 according to the fifth example changes the duty ratio for on-off switch control on the switching element of a phase that starts being driven or a phase that stops being driven in a stepwise manner when the number of operating phases of the FC-VCU 103 is switched. Accordingly, the amount of the phase current that flows through the phase that starts being driven or the phase current that flows through the phase that stops being driven gradually changes. As a result, a variation in the input current IFC when the number of operating phases is switched can be suppressed. Although the control stability of the FC-VCU 103 in the case of decreasing the number of operating phases decreases, the number-of-phases switch period is made longer as the control stability decreases. Therefore, even in the case of decreasing the number of operating phases, a variation in the input current IFC when the number of operating phases is switched can be suppressed. Similarly, the control stability decreases as the amount of change in the phase current flowing through a driven phase when the number of operating phases is switched increases. Accordingly, by making the number-of-phases switch period longer in this case, a variation in the input current IFC when the number of operating phases is switched can be suppressed. In the case of switching the number of operating phases in a non-consecutive manner, the amount of change in the phase current is large, and the control stability is highly likely to decrease. By making the number-of-phases switch period longer in this case, a variation in the input current IFC when the number of operating phases is switched can be suppressed. Accordingly, it is possible to suppress an increase in the weight and size of the FC-VCU 103 associated with an increase in the volume of the smoothing capacitors C1 and C2 while the control stability is maintained.

Figure 25:
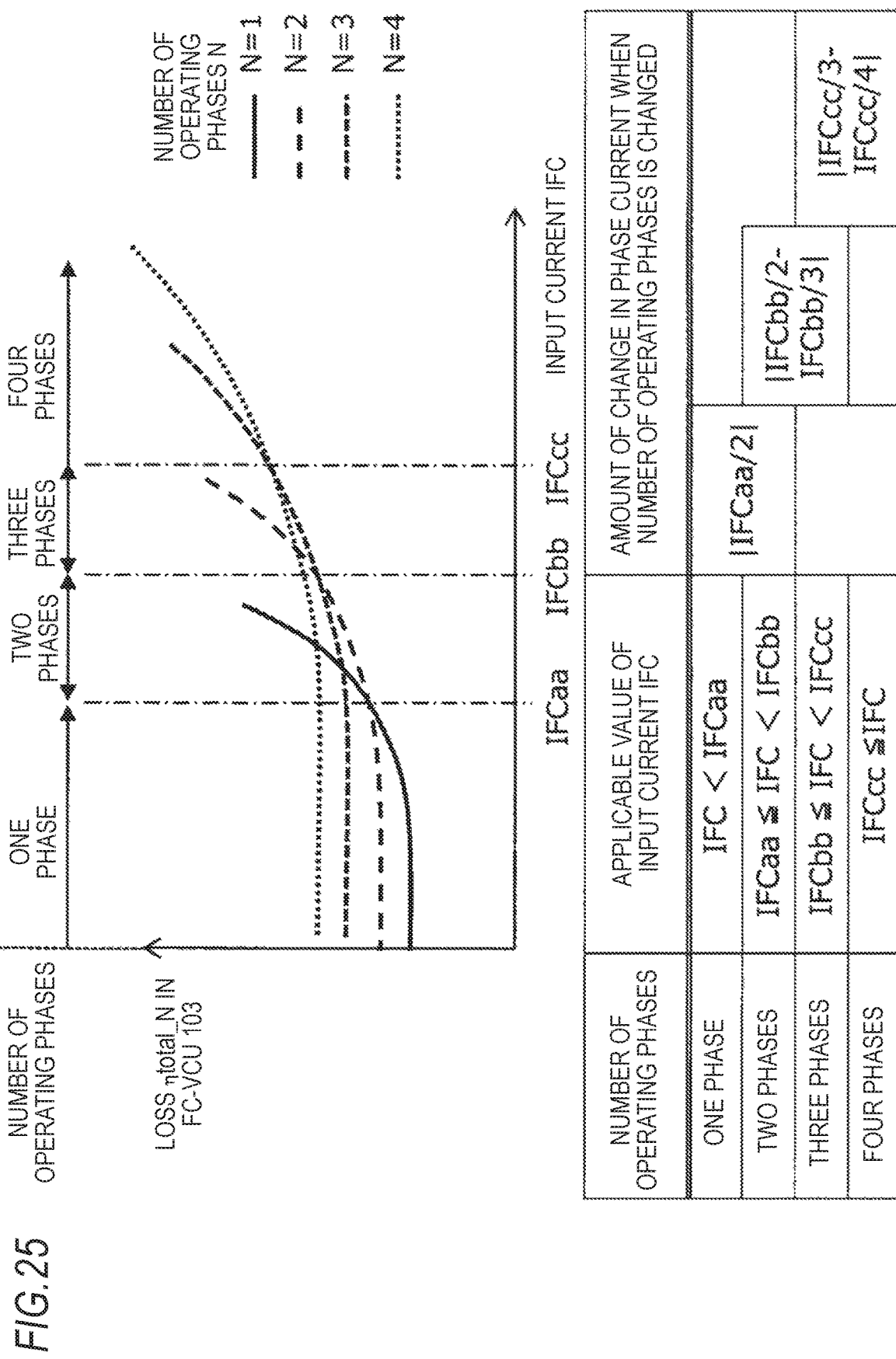
FIG. 25 is a diagram of the fifth example illustrating other example relationships between thresholds of the input current IFC based on which the number of operating phases is switched and the amount of change in the phase current that flows through a driven phase associated with the switching of the number of operating phases.

Note that the example illustrated in FIG. 23 corresponds to the case where the number of operating phases of the magnetic-coupling-type FC-VCU 103 illustrated in FIG. 2 and FIG. 6 is one, two, or four. In a case of using the FC-VCU 203 illustrated in FIG. 7 and FIG. 8 in which the iron cores are individually provided to the reactors of the respective phases, one phase to four phases including three phases are used as the operating phases. In this case, the number of operating phases is switched by referring to thresholds IFCaa, IFCbb, and IFCcc of the input current IFC used in switching of the number of operating phases and determined in advance based on a loss occurring in the FC-VCU 103, as illustrated in FIG. 25, and the ECU 113 makes the number-of-phases switch periods Ti and Td longer and makes the change rate of the duty ratio smaller as the amount of change in the phase current that flows through a driven phase associated with the switching of the number of operating phases increases.

Sixth Example

The ECU 113 according to the sixth example sets the frequency (hereinafter referred to as "switching frequency") of switching signals based on the input current IFC to the FC-VCU 103 so that the amplitude of the ripple of the input/output currents of the smoothing capacitors C1 and C2 is equal to or smaller than a threshold, and makes the number of operating phases of the FC-VCU 103 be changed in synchronization with a setting change of the switching frequency.

Figure 26:
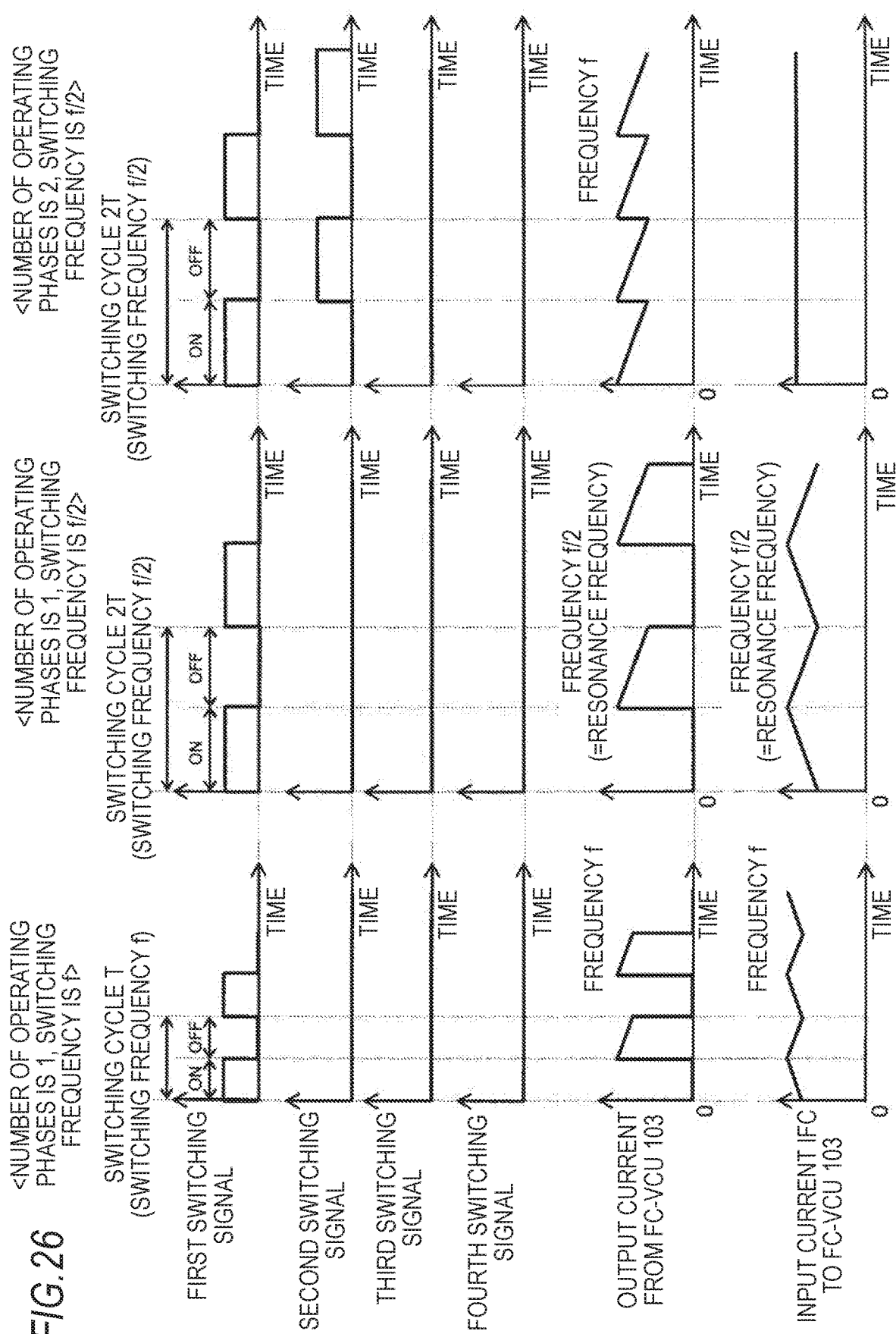
FIG. 26 is a diagram of a sixth example illustrating changes in the output current from the FC-VCU over time and changes in the input current IFC to the FC-VCU over time, for example, in a case where the number of operating phases of the FC-VCU that is controlled with a switching frequency f is one, in a case where the number of operating phases of the FC-VCU that is controlled with a switching frequency f/2 is one, and in a case where the number of operating phases of the FC-VCU that is controlled with the switching frequency f/2 is two and interleave control is performed.

FIG. 26 is a diagram illustrating changes in the output current from the FC-VCU 103 over time and changes in the input current IFC to the FC-VCU 103 over time, for example, in a case where the number of operating phases of the FC-VCU 103 that is controlled with a switching frequency f is one, in a case where the number of operating phases of the FC-VCU 103 that is controlled with a switching frequency f/2 is one, and in a case where the number of operating phases of the FC-VCU 103 that is controlled with the switching frequency f/2 is two and the interleave control described above is performed. As illustrated by the example on the left of FIG. 26, in the case where the ECU 113 drives the FC-VCU 103 with one phase, if on/off switch control is performed on the switching element of the driven phase with the switching frequency f, the frequency of the output current and that of the input current IFC of the FC-VCU 103 are "f", which is equal to the switching frequency f. When the switching frequency is changed to f/2 without changing the number of operating phases from one phase, the frequency of the output current and that of the input current IFC of the FC-VCU 103 become "f/2", which is equal to the switching frequency f/2. If the frequency for f/2 is the resonance frequency of a circuit including the smoothing capacitor C1 provided on the input side of the FC-VCU 103 and a circuit provided in the upstream of the FC-VCU 103, or the resonance frequency of a circuit including the smoothing capacitor C2 provided on the output side of the FC-VCU 103 and a circuit provided in the downstream of the FC-VCU 103, the ripple of the output current and that of the input current IFC of the FC-VCU 103 become large, which is not desirable. The sixth example is described while assuming that the frequency f/2 is the resonance frequency.

If the switching frequency is set to a low value specifically in a case where the input current IFC is low and the FC-VCU 103 is driven with one phase, the input current IFC may have a value equal to zero over certain periods (zero-crossing) and have a discontinuous waveform. The input current IFC having such a discontinuous waveform may decrease the control stability of the FC-VCU 103 and is not desirable.

If the switching frequency in the case where the FC-VCU 103 is driven with one phase is low, problems arise in which the ripple increases and the control stability decreases, for example. Therefore, it is desirable to set the switching frequency in this case to a value that is sufficiently high so that the above-described problems do not arise. However, if the frequency set to a high value is applied to a case where the number of operating phases is two or more, the switching loss in the entire FC-VCU 103 increases, and another problem may arise in which the FC-VCU 103 is overheated due to the heat produced by the switching elements. Therefore, it is desirable to set the switching frequency of the FC-VCU 103 to a lower value as the number of operating phases increases. As illustrated in the example on the right of FIG. 26 in contrast to the example on the left, in the case where the FC-VCU 103 is driven with two phases, on/off switch control is performed on the switching elements of the driven phases with the switching frequency f/2. The frequency of the output current from the FC-VCU 103 in this case remains the same as the frequency in the case illustrated in the example on the left because interleave control is performed on the FC-VCU 103, and it is possible to avoid the resonance frequency equal to f/2.

Figure 27:
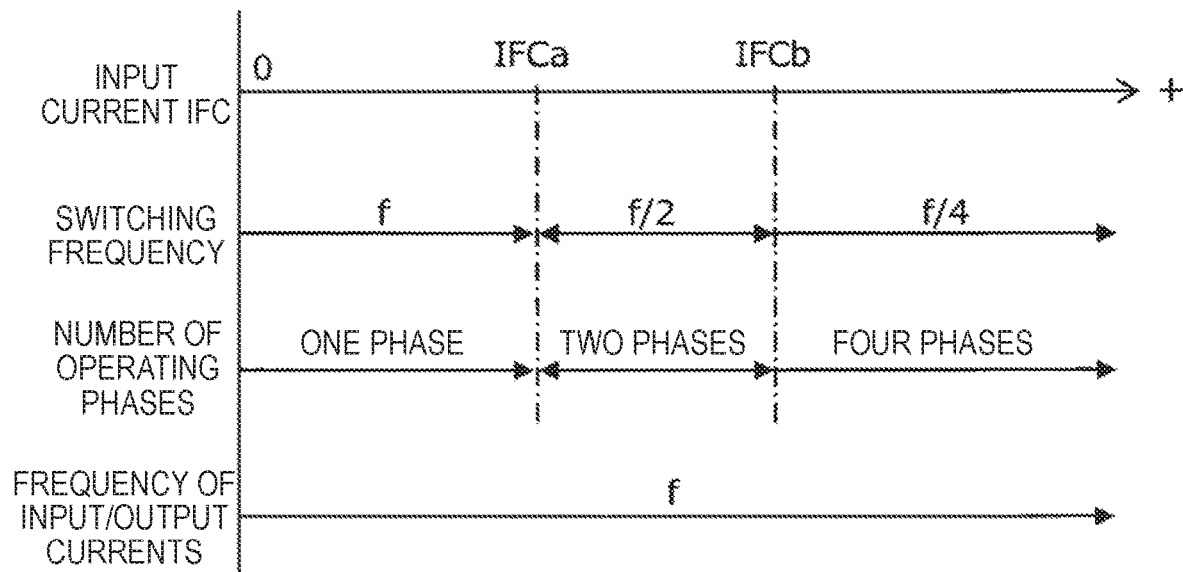
FIG. 27 is a diagram illustrating example relationships among the input current IFC, the switching frequency, the number of operating phases, and the frequency of the input/output currents when the ECU according to the sixth example controls the FC-VCU.

FIG. 27 is a diagram illustrating relationships among the input current IFC, the switching frequency, the number of operating phases, and the frequency of the input/output currents when the ECU 113 according to the sixth example controls the FC-VCU 103. The ECU 113 according to the sixth example determines the switching frequency and the number of operating phases of the FC-VCU 103 based on the relationships illustrated in FIG. 27. That is, the ECU 113 sets the switching frequency that corresponds to the input current IFC to the FC-VCU 103 and switches the number of operating phases in synchronization with a setting change of the switching frequency. The switching frequency f in the case of driving the FC-VCU 103 with one phase is set to a value such that the amplitude of the ripple of the output current from and that of the input current IFC to the FC-VCU 103 are equal to or smaller than a threshold. In a case of performing interleave control when a multiphase operation is performed, the switching frequency that corresponds to the input current IFC is set so that a value obtained by multiplying the switching frequency by the number of operating phases is not equal to the resonance frequency. Preferably, the switching frequency that corresponds to the input current IFC is set so that the frequency of the output current does not vary even if the number of operating phases is changed.

Figure 28:
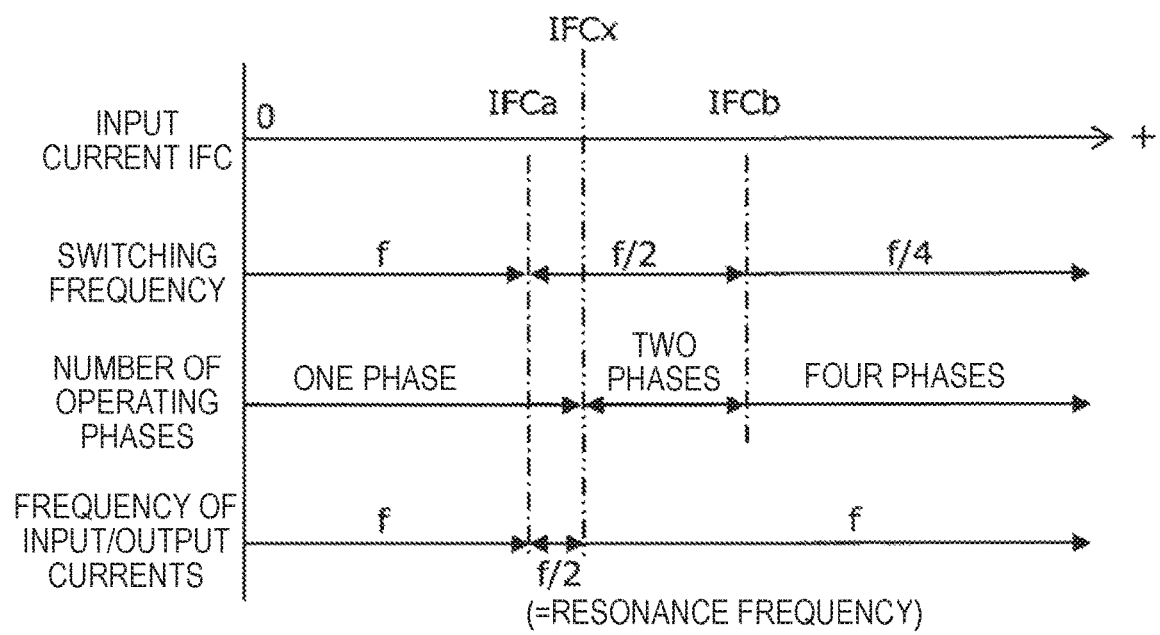
FIG. 28 is a diagram illustrating example relationships among the input current IFC, the switching frequency, the number of operating phases, and the frequency of the input/output currents when the ECU that does not perform control according to the sixth example determines the number of operating phases based on a loss in the FC-VCU.

If the number of operating phases is changed based on a threshold IFCx of the input current IFC based on a loss in the FC-VCU 103 as illustrated in FIG. 28, for example, unlike the sixth example in which the number of operating phases is changed in synchronization with a setting change of the switching frequency, the FC-VCU 103 can be driven in a state where the energy efficiency is always high. However, the frequency of the input/output currents of the FC-VCU 103 is equal to the resonance frequency f/2 depending on the value of the input current IFC, and the ripple increases.

As described above, in the sixth example, the frequency (switching frequency) of switching signals is set based on the input current IFC to the FC-VCU 103 so that the amplitude of the ripple caused by resonance on the input and output sides of the FC-VCU 103 is equal to or smaller than a threshold, and the number of operating phases of the FC-VCU 103 is changed in synchronization with a setting change of the switching frequency based on the input current IFC. Accordingly, even if a setting of the FC-VCU 103 is changed, it is possible to prevent resonance from occurring on the input and output sides of the FC-VCU 103 by changing the software without changing the hardware configuration and to increase the control stability of the FC-VCU 103.

As the switching frequency that is set when the input current IFC is low, a value that is sufficiently high is set such that the problem in which the FC-VCU 103 is overheated does not arise. Therefore, it is possible to lower the lower limit of the current level of the input current IFC at which zero-crossing does not occur and a continuous waveform is obtained. That is, it is possible to widen the range of the input current with which the control stability of a predetermined level or higher can be guaranteed. Further, the amplitude of the ripple of the output current from and that of the input current IFC to the FC-VCU 103 is made equal to or smaller than a threshold, and therefore, it is possible to avoid an increase in the volume of the smoothing capacitors C1 and C2, and the FC-VCU 103 can be made smaller and lighter.

Figure 29:
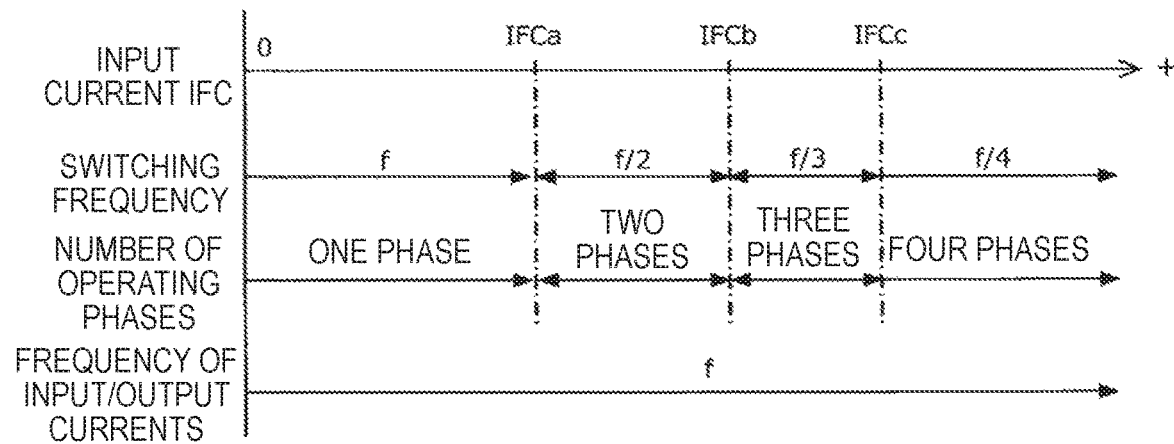
FIG. 29 is a diagram illustrating other example relationships among the input current IFC, the switching frequency, the number of operating phases, and the frequency of the input/output currents when the ECU according to the sixth example controls the FC-VCU.

Note that the example illustrated in FIG. 27 corresponds to the case where the number of operating phases of the magnetic-coupling-type FC-VCU 103 illustrated in FIG. 2 and FIG. 6 is one, two, or four. In a case of using the FC-VCU 203 illustrated in FIG. 7 and FIG. 8 in which the iron cores are individually provided to the reactors of the respective phases, one phase to four phases including three phases are used as the operating phases. Relationships among the input current IFC, the switching frequency, and the number of operating phases in this case are illustrated in FIG. 29. The thresholds of the input current IFC based on which the switching frequency and the number of operating phases are switched may be set so as to provide hysteresis in a case where the input current IFC increases and in a case where the input current IFC decreases. For example, regarding the threshold IFCa illustrated in FIG. 27 and FIG. 29, which is the point at which switching between one phase and two phases is performed, a value that is set in the case where the input current IFC decreases and switching from two phases to one phase is performed is lower than a value that is set in the case where the input current IFC increases and switching from one phase to two phases is performed. Such hysteresis is provided so that contention (hunting) between control operations can be eliminated.

Seventh Example

The ECU 113 according to the seventh example increases the number of operating phases of the FC-VCU 103 to a number larger than the present number of operating phases if the temperature of the FC-VCU 103 exceeds a threshold.

Figure 30:
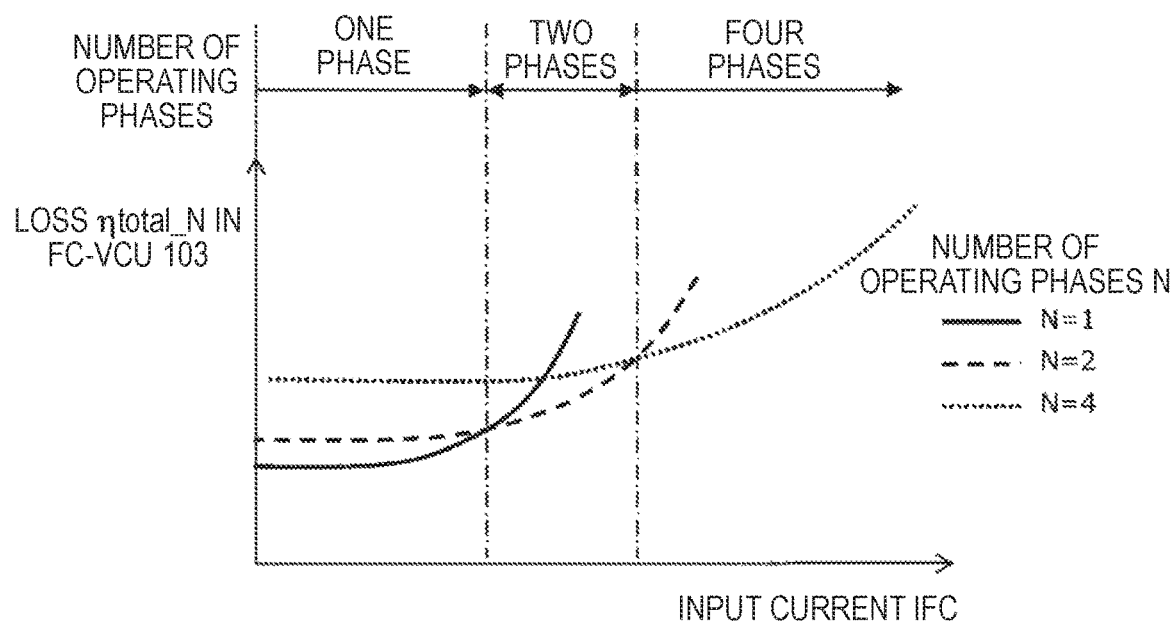
FIG. 30 is a graph illustrating, for each value of N, N being the number of operating phases, the loss ηtotal_N in the FC-VCU relative to the input current IFC.
Figure 31:
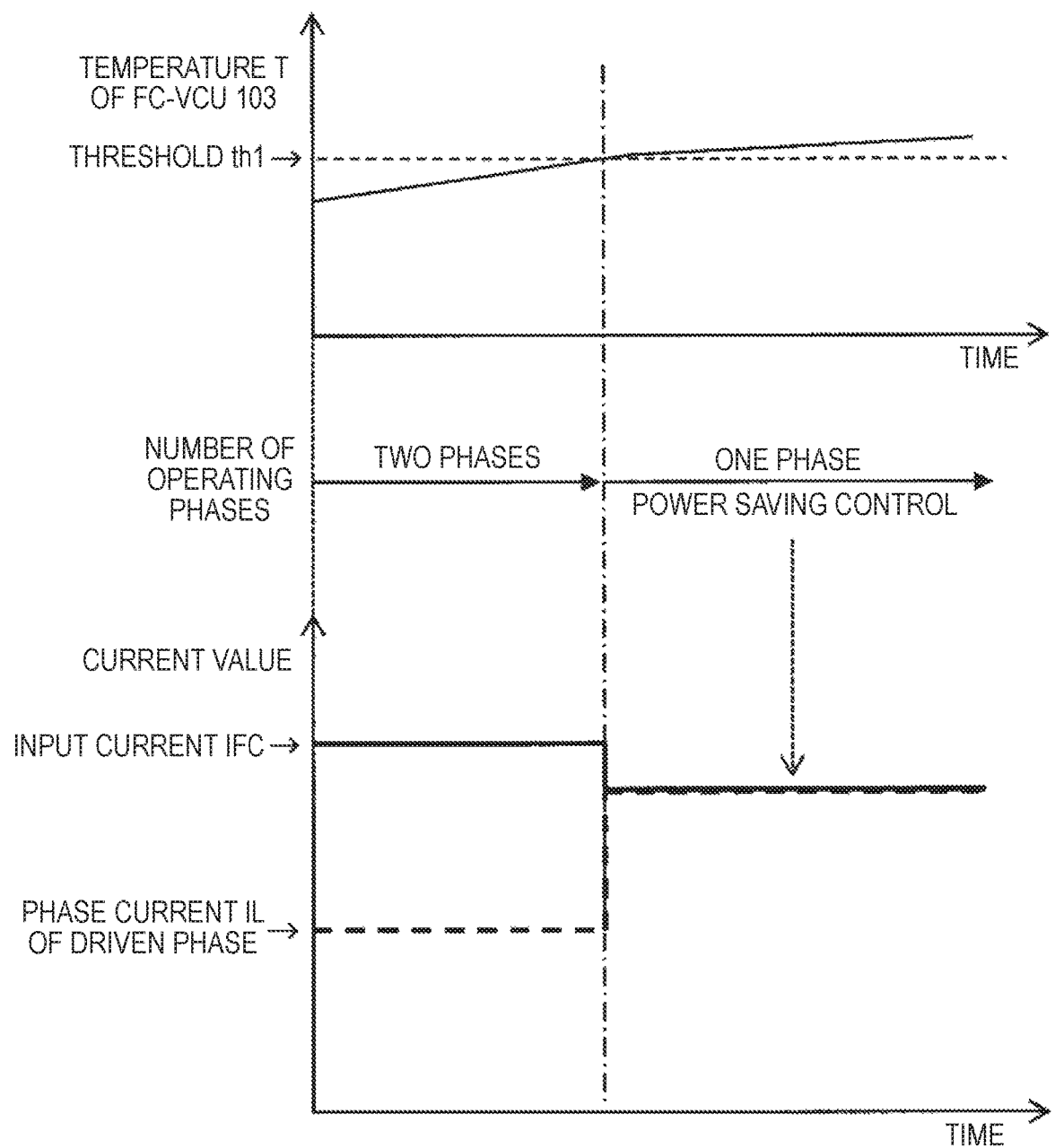
FIG. 31 is a diagram illustrating a case where the phase current that flows through a driven phase increases in a case where the input current IFC decreases as a result of power saving control and the number of operating phases is decreased.

The ECU 113 according to the seventh example performs control (hereinafter referred to as "power saving control") to decrease the input current IFC, which is the output current from the fuel cell 101, in order to prevent the FC-VCU 103 from being overheated if at least one of the temperatures T1 to T4 respectively detected by the temperature sensors 1091 to 1094 (hereinafter simply referred to as "temperature T") exceeds a threshold th1. However, in a case where the ECU 113 determines the number of operating phases of the FC-VCU 103 based on the input current IFC by referring to the graph illustrated in FIG. 30, if the input current IFC decreases as a result of power saving control and the number of operating phases is decreased, the phase current that flows through a driven phase increases, and the temperature T of the FC-VCU 103 may further increase unintendedly, as illustrated in FIG. 31. The power saving control is control performed on the FC-VCU 103 by changing the duty ratio for a driven phase; however, the power saving control may be output control performed on the fuel cell 101.

Figure 32:
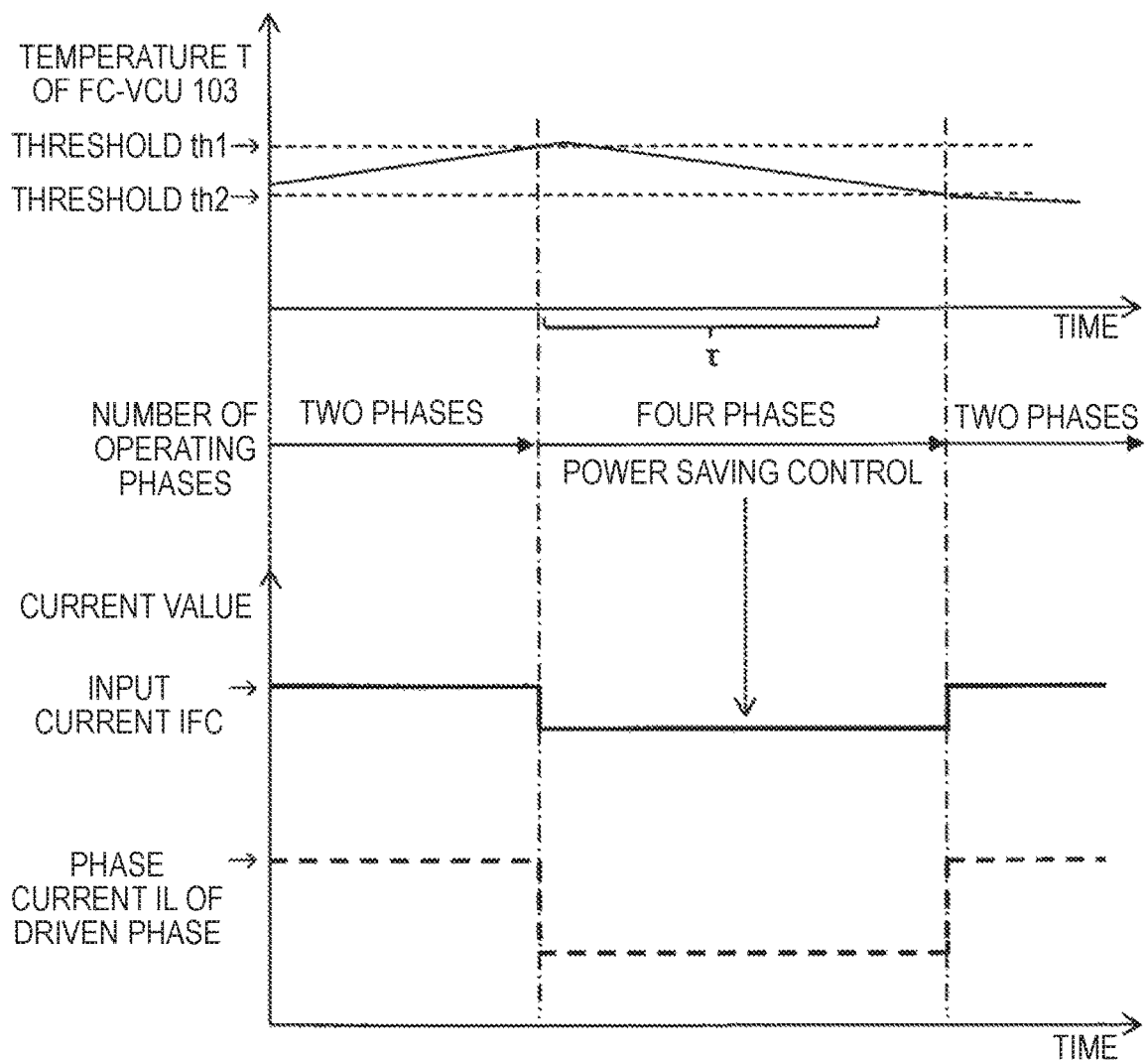
FIG. 32 is a diagram of a seventh example illustrating a case of increasing the number of operating phases of the FC-VCU to a number larger than the number of phases before power saving control is performed regardless of the input current IFC when power saving control is performed.

The ECU 113 according to the seventh example increases the number of operating phases of the FC-VCU 103 to a number larger than the number of operating phases before power saving control is performed regardless of the input current IFC, as illustrated in FIG. 32, even in the case where the temperature T exceeds the threshold th1 and the power saving control is performed. In the example illustrated in FIG. 32, if the temperature T exceeds the threshold th1 while the FC-VCU 103 is being driven with two phases, power saving control is performed and the number of operating phases of the FC-VCU 103 is changed to four. As a result, the phase current IL that flows through each phase of the FC-VCU 103 decreases and a load applied to each phase is reduced, resulting in a decrease in the temperature T of the FC-VCU 103.

The ECU 113 according to the seventh example maintains the state where power saving control is performed and the number of operating phases of the FC-VCU 103 is increased for a predetermined time τ or more. That is, the ECU 113 prohibits power saving control from being stopped and the number of operating phases from being changed before the elapse of the predetermined time τ. After the predetermined time τ has elapsed, if the temperature T falls below a threshold th2, the ECU 113 stops the power saving control and changes the number of operating phases so as to correspond to the input current IFC after the power saving control has been stopped. Note that the threshold th2 is a value smaller than the threshold th1.

Figure 33:
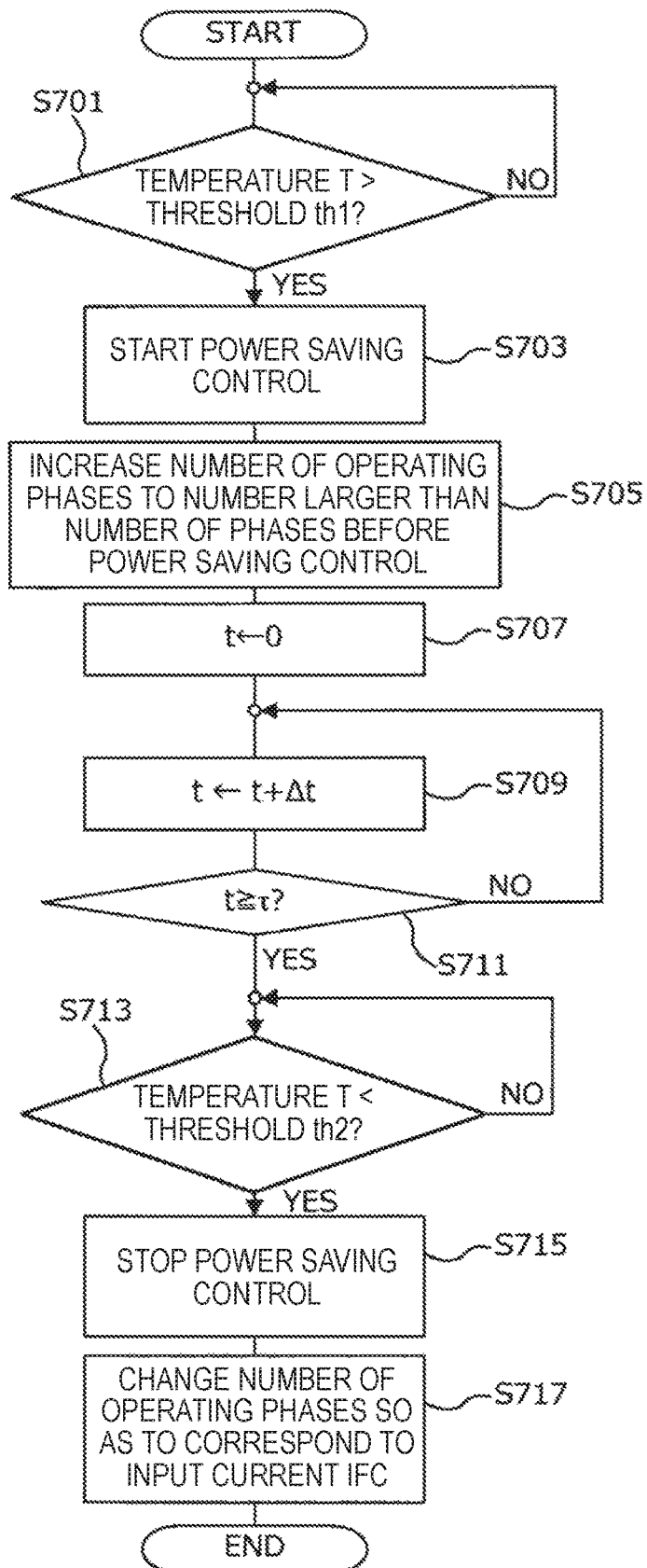
FIG. 33 is a flowchart illustrating an operation performed by the ECU according to the seventh example when the temperature of the FC-VCU exceeds a threshold.

FIG. 33 is a flowchart illustrating an operation performed by the ECU 113 according to the seventh example when the temperature of the FC-VCU 103 exceeds the threshold. As illustrated in FIG. 33, the ECU 113 determines whether the temperature T exceeds the threshold th1 (T>th1) (step S701). If T>th1 is satisfied, the flow proceeds to step S703. In step S703, the ECU 113 starts power saving control. Next, the ECU 113 increases the number of operating phases of the FC-VCU 103 to a number larger than the number of phases before the power saving control is performed (step S705). When increasing the number of operating phases, the ECU 113 sets the number-of-phases switch period as described in the fifth example and increases the duty ratio for a phase that starts being driven in a stepwise and successive manner. However, the number-of-phases switch period set in step S705 is made shorter than the number-of-phases switch period in a case of simply increasing the number of operating phases without performing power saving control when the temperature of the FC-VCU 103 is equal to or lower than the threshold. As a result, the operation of increasing the number of operating phases performed in step S705 is completed quickly.

Next, the ECU 113 sets a count value t that represents time to zero (step S707). Subsequently, the ECU 113 newly sets the count value t to a value obtained by adding a control cycle Δt to the present count value t (step S709). Subsequently, the ECU 113 determines whether the count value t is equal to or larger than the predetermined time τ(t≥τ) (step S711). If t≥τ is satisfied, the flow proceeds to step S713. If t<τ is satisfied, the flow returns to step S709. In step S713, the ECU 113 determines whether the temperature T falls below the threshold th2 (T<th2). If T<th2 is satisfied, the flow proceeds to step S715. In step S715, the ECU 113 stops the power saving control started in step S703. Subsequently, the ECU 113 changes the number of operating phases so as to correspond to the input current IFC after the power saving control has been stopped (step S717).

As described above, according to the seventh example, in the case where the temperature of the FC-VCU 103 exceeds the threshold and power saving control is performed, the number of operating phases of the FC-VCU 103 is increased to a number larger than the present number of phases to thereby reduce a load applied to a driven phase. Accordingly, an increase in the temperature can be suppressed before the FC-VCU 103 is overheated while the FC-VCU 103 is kept driven, and the normal state can be maintained.

Note that the example illustrated in FIG. 32 corresponds to the case where the number of operating phases of the magnetic-coupling-type FC-VCU 103 illustrated in FIG. 2 and FIG. 6 is one, two, or four. As described in the fourth example, in the magnetic-coupling-type FC-VCU 103, for avoiding a state where loads are intensively applied to some of the phases, it is not desirable to use only some of the plurality of phases that are magnetically coupled to each other. This is because, even if the number of operating phases is increased so as to reduce a load applied to a driven phase, loads are intensively applied to some of the phases, and it is not possible to eliminate the possibility of the FC-VCU 103 entering the overheated state.

Meanwhile, in a case of using the FC-VCU 203 illustrated in FIG. 7 and FIG. 8 in which the iron cores are individually provided to the reactors of the respective phases, one phase to four phases including three phases are used as the operating phases. In this case, if the temperature T exceeds the threshold th1 while the FC-VCU 203 is being driven with two phases, power saving control is performed and the number of operating phases of the FC-VCU 103, which is currently two, is changed to a larger number, namely, three or four. Even in a case where the magnetic-coupling-type FC-VCU 103 is used or the non-magnetic-coupling-type FC-VCU 203 is used, the ECU 113 may change the number of operating phases to the maximum number regardless of the number of operating phases used when the temperature T exceeds the threshold th1. When the number of operating phases is changed to the maximum number of operating phases, a load applied to a driven phase can be minimized, the possibility of the FC-VCU 103 entering the overheated state can be eliminated earlier, and the normal state can be maintained.

Note that, in the examples illustrated in FIG. 2 and FIG. 7, the temperature sensors 1091 to 1094 are provided in the vicinity of the switching elements only; however, temperature sensors may be provided at other positions inside the FC-VCU 103 or 203, such as in the vicinity of the diodes or the reactors L1 to L4, or outside the FC-VCU 103 or 203, such as in the vicinity of the fuel cell 101 or the smoothing capacitors C1 and C2, and power saving control described in the seventh example may be performed based on temperatures detected by the temperature sensors.

Eighth Example

The ECU 113 according to the eighth example performs control in a case where at least one of the phase current sensors 1051 to 1054 or the current sensor 105 fails, the control being appropriate for the failure state. Determination of failures of the current sensor 105 and the phase current sensors 1051 to 1054 is performed by the ECU 113. Determination of failures of the current sensor 105 and the phase current sensors 1051 to 1054 can be performed by using various publicly known methods. For example, in a case of using a method for determining a failure where the output value is fixed to an upper value, a failure where the output value is fixed to an intermediate value, and a failure where the output value is fixed to a lower value as disclosed by Japanese Unexamined Patent Application Publication No. 10-253682, the entire contents of which are incorporated herein by reference, the ECU 113 determines that an abnormal failure state occurs if a state where a signal that represents a voltage corresponding to the detected current value indicates a value outside a specified range lasts for a predetermined time or longer.

In the eighth example, in a case where all of the current sensor 105 and the phase current sensors 1051 to 1054 are in a normal state, the value of the input current IFC to the FC-VCU 103 detected by the current sensor 105 is used by the ECU 113 to determine the number of operating phases of the FC-VCU 103. The values of the phase currents IL1 to IL4 respectively detected by the phase current sensors 1051 to 1054 are used by the ECU 113 to perform phase current balance control. The phase current balance control is control performed to increase or decrease the duty ratio for the switching signal for each driven phase so that the phase current of each driven phase matches a target value that is obtained by dividing the sum of the moving averages of the phase currents IL1 to IL4 by the number of operating phases of the FC-VCU 103.

The switch control on the number of operating phases is performed based on the input current IFC to the FC-VCU 103 or the sum of the values of the phase currents IL1 to IL4, as described in the third example. However, because of a product error in the phase current sensors or a difference between the phases of the phase currents of the respective phases due to the interleave control, the sum of the values of the phase currents IL1 to IL4 does not necessarily indicate the true value of the input current to the FC-VCU 103, and therefore, it is desirable to use the input current IFC to the FC-VCU 103. Meanwhile, the values of the phase currents IL1 to IL4 are necessary for performing the phase current balance control, and therefore, the phase current sensors 1051 to 1054 are used. Any of the above-described control operations can prevent loads from intensively applied to some of the phases.

FIG. 34 is a diagram of the eighth example illustrating, for different states of the current sensor 105 and the phase current sensors 1051 to 1054, current values for determining the number of operating phases, current values for performing phase current balance control, and whether the power saving control is performed or not. As illustrated in FIG. 34, if at least one of the phase current sensors 1051 to 1054 fails, the number of operating phases of the FC-VCU 103 is determined based on the value of the input current IFC to the FC-VCU 103 detected by the current sensor 105 as in the case of the normal state, and phase current balance control is not performed. In a case where the current sensor 105 fails, the number of operating phases of the FC-VCU 103 is determined based on the sum of the values of the phase currents IL1 to IL4 respectively detected by the phase current sensors 1051 to 1054, and phase current balance control is performed based on the phase currents IL1 to IL4 respectively detected by the phase current sensors 1051 to 1054 as in the case of the normal state.

In the case where at least one of the phase current sensors 1051 to 1054 fails and in the case where the current sensor 105 fails, control (power saving control) for decreasing the input current IFC, which is the output current from the fuel cell 101, is performed. The power saving control is control performed on the FC-VCU 103 by changing the duty ratio for a driven phase; however, the power saving control may be output control performed on the fuel cell 101. Power saving control that is performed in the case where at least one of the phase current sensors 1051 to 1054 fails is performed in order to maintain the control stability that may decrease because of phase current balance control not being performed. Power saving control that is performed in the case where the current sensor 105 fails is performed in order to maintain the control stability that may decrease due to the synchronization of the cycle of control based on the sum of the values of the phase currents IL1 to IL4 for determining the number of operating phases of the FC-VCU 103 with the cycle of phase current balance control based on the phase currents IL1 to IL4. Further, the sum of the values of the phase currents IL1 to IL4 does not necessarily indicate the true value of the input current to the FC-VCU 103 because of a product error in the phase current sensors or a difference between the phases of the phase currents of the respective phases due to the interleave control as described above. Therefore, the power saving control is performed in order to respond to such a case.

The control cycle of the current sensor 105 and the control cycle of the phase current sensors 1051 to 1054 are different from each other in order to prevent interference in control by the ECU 113. In the eighth example, the control cycle of the current sensor 105 is faster than the control cycle of the phase current sensors 1051 to 1054. As described above, this difference is due to a difference in the role of the current sensor 105 and that of the phase current sensors 1051 to 1054. That is, the current sensor 105 significantly affects the efficiency of the FC-VCU 103 because the number of operating phases is changed by using a value detected by the current sensor 105 while the phase current sensors 1051 to 1054 are used as auxiliary current sensors to balance the current values of the phases that are driven based on values detected by the phase current sensors 1051 to 1054.

Figure 35:
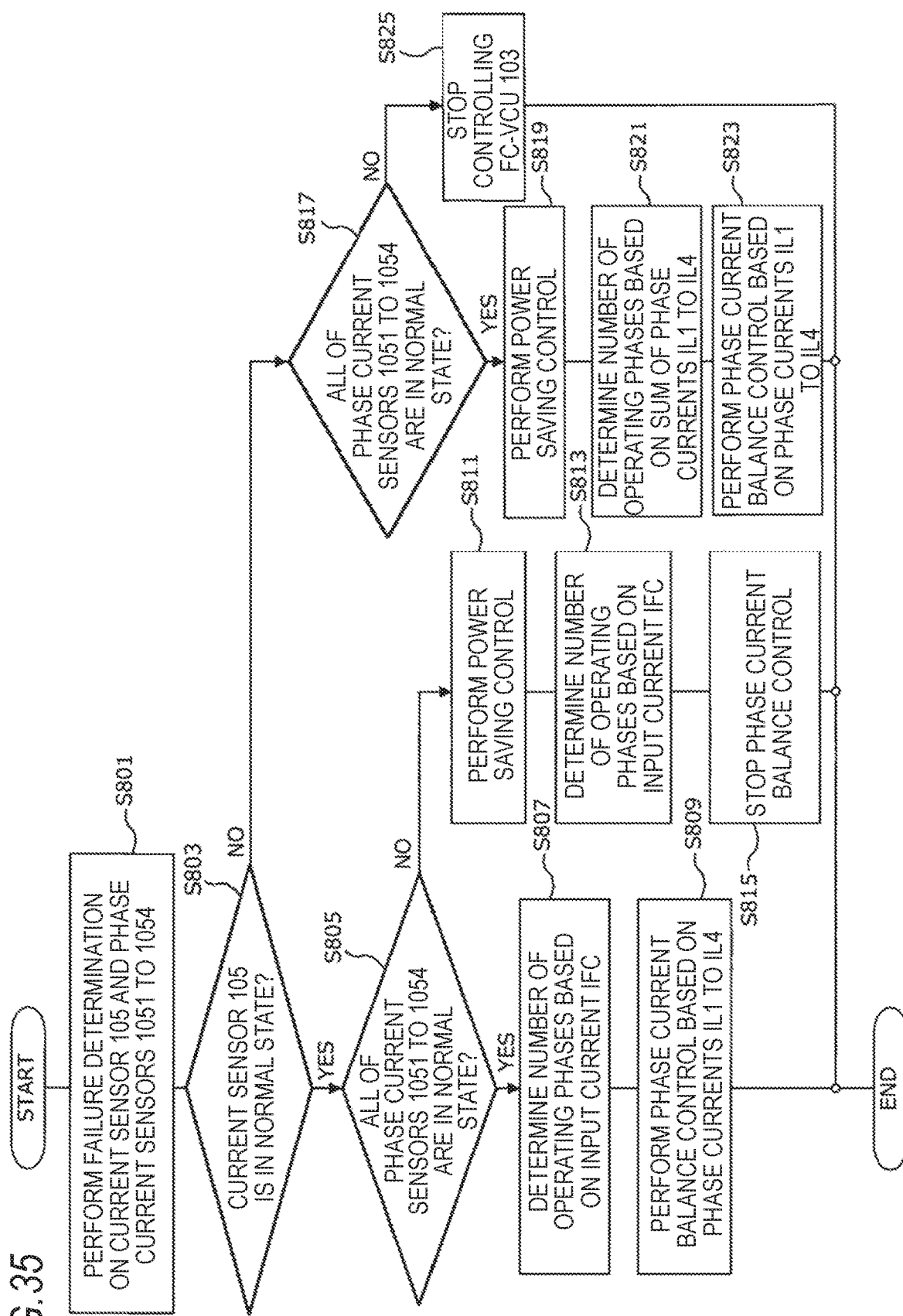
FIG. 35 is a flowchart illustrating an operation performed by the ECU according to the eighth example in accordance with the state of the current sensor and those of the phase current sensors.

FIG. 35 is a flowchart illustrating an operation performed by the ECU 113 according to the eighth example in accordance with the state of the current sensor 105 and those of the phase current sensors 1051 to 1054. As illustrated in FIG. 35, the ECU 113 performs failure determination on the current sensor 105 and the phase current sensors 1051 to 1054 (step S801). Next, the ECU 113 determines whether the current sensor 105 is in the normal state or in the abnormal failure state based on the result of the failure determination performed in step S801 (step S803). If the current sensor 105 is in the normal state, the flow proceeds to step S805. If the current sensor 105 is in the abnormal failure state, the flow proceeds to step S817. In step S805, the ECU 113 determines whether the phase current sensors 1051 to 1054 are in the normal state. If all of the phase current sensors 1051 to 1054 are in the normal state, the flow proceeds to step S807. If at least one of the phase current sensors 1051 to 1054 is in the abnormal failure state, the flow proceeds to step S811.

In step S807, the ECU 113 determines the number of operating phases of the FC-VCU 103 based on the input current IFC by performing switch control on the number of operating phases described in the third example, for example. Next, the ECU 113 performs phase current balance control based on the values of the phase currents IL1 to IL4 (step S809). In step S811, the ECU 113 performs power saving control. Next, the ECU 113 determines the number of operating phases of the FC-VCU 103 based on the input current IFC (step S813). Subsequently, the ECU 113 stops the phase current balance control (step S815). According to the description given above, the ECU 113 performs the power saving control (step S811) before stopping the phase current balance control (step S815). This is because the number of operating phases is decreased based on the value of the input current IFC that is limited by the power saving control, and therefore, even if the phase current balance control is stopped, a variation in the phase currents of the respective phases occurs to a small degree.

In step S817, the ECU 113 determines whether the phase current sensors 1051 to 1054 are in the normal state or in the abnormal failure state. If all of the phase current sensors 1051 to 1054 are in the normal state, the flow proceeds to step S819. If at least one of the phase current sensors 1051 to 1054 is in the abnormal failure state, the flow proceeds to step S825. In step S819, the ECU 113 performs power saving control. Next, the ECU 113 determines the number of operating phases of the FC-VCU 103 based on the sum of the values of the phase currents IL1 to IL4 (step S821). Subsequently, the ECU 113 performs phase current balance control based on the values of the phase currents IL1 to IL4 (step S823). In step S825, the ECU 113 stops controlling the FC-VCU 103.

As described above, according to the eighth example, even if at least one of the phase current sensors 1051 to 1054 fails or the current sensor 105 fails, the values detected by the normal current sensors are complementarily used to perform switch control on the number of operating phases or phase current balance control for avoiding a state where loads are intensively applied to some of the phases, thereby continuously performing the control operations. As a result, even if one of the current sensors fails, it is possible to maintain a state where loads are equally applied to the respective phases and to suppress a state where a load is intensively applied to one phase, which is the advantage of the above-described control operations.

Ninth Example

The ECU 113 according to the ninth example superimposes an AC signal on a control signal outside a loop of feedback control (hereinafter referred to as "feedback loop") in the ECU 113 that controls the FC-VCU 103, the control signal being output from the feedback loop and used to perform on/off switch control on each switching element of the FC-VCU 103. Further, the ECU 113 generates a pulse-like switching signal based on the control signal on which the AC signal is superimposed, and outputs the switching signal to each switching element of the FC-VCU 103. The AC component included in the switching signal is superimposed in order to measure the impedance of the fuel cell 101. The value of the amplitude of the AC signal is set in accordance with the tenth example or the eleventh example described below.

Figure 36:
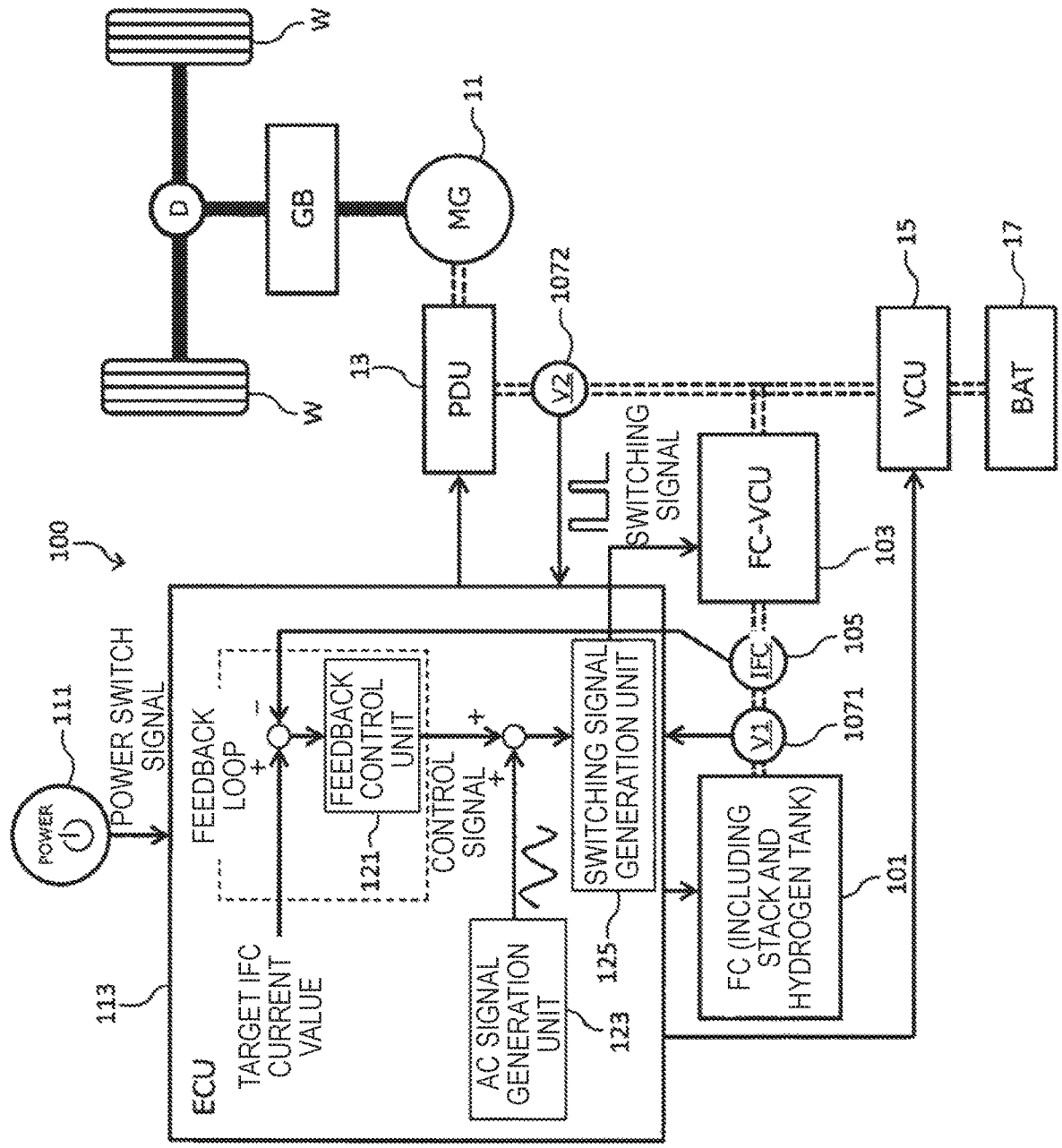
FIG. 36 is a block diagram illustrating an overall configuration of the motor-driven vehicle in which the power supply device including the ECU according to a ninth example is mounted.

FIG. 36 is a block diagram illustrating an overall configuration of the motor-driven vehicle in which the power supply device including the ECU 113 according to the ninth example is mounted. As illustrated in FIG. 36, the ECU 113 according to the ninth example includes a feedback control unit 121, an AC signal generation unit 123, and a switching signal generation unit 125. In the ninth example, the FC-VCU 103 is controlled in an current control mode, and therefore, a feedback loop for feeding back a result output from the feedback control unit 121 and obtained by using a target value of the input current IFC (hereinafter referred to as "target IFC current value") of the FC-VCU 103 as an input value, that is, a value (input current IFC) detected by the current sensor 105 is formed in the ECU 113.

The feedback control unit 121 outputs a control signal based on a difference between the target IFC current value and the value of the input current IFC detected by the current sensor 105. The AC signal generation unit 123 generates an AC signal that is superimposed on the control signal for measuring the impedance of the fuel cell 101.

The AC signal generated by the AC signal generation unit 123 is superimposed on the control signal output from the feedback control unit 121 outside the feedback loop. The switching signal generation unit 125 generates a pulse-like switching signal based on the control signal on which the AC signal is superimposed and outputs the switching signal to each switching element of the FC-VCU 103.

Note that the control cycle in the feedback loop described above and the control cycle in the stage in which the AC signal is superimposed on the control signal outside the feedback loop are different from each other, and the control cycle in the stage in which the AC signal is superimposed is slower than the control cycle in the feedback loop. This difference exists because a relatively faster control cycle is required in the feedback loop so as to allow the FC-VCU 103 to output a target voltage in a voltage control mode described below and to output a target current in the current control mode described below. Meanwhile, the control cycle in the stage in which the AC signal is superimposed is not required to be set to such a faster control cycle, and a relatively slower cycle is desirable so that the impedance of the fuel cell 101 can be accurately measured.

In the above description, the ECU 113 controls the FC-VCU 103 in the voltage control mode in which the voltage V2 is made to match an optimum voltage at which the driving efficiency of the motor/generator 11 is equal to or higher than a threshold, and therefore, a target V2 voltage value is input to the feedback loop and the voltage V2 is fed back. The ECU 113 may control the FC-VCU 103 in the current control mode in which the FC-VCU 103 is stably controlled. In this case, a target value of the output current from the FC-VCU 103 is input to the feedback loop, and a detected value of the output current is fed back. Also in this case, the AC signal generated by the AC signal generation unit 123 is superimposed on the control signal output from the feedback control unit 121 outside the feedback loop.

The ECU 113 measures the impedance of the fuel cell 101 by using an AC impedance method based on the input current IFC to the FC-VCU 103 on which on/off switch control is performed in accordance with the switching signal including the AC component and based on the output voltage of the fuel cell 101, the output voltage being the input voltage V1, and indirectly determines the moisture state within the fuel cell 101. In an AC impedance method, the ECU 113 samples values detected by the current sensor 105 and by the voltage sensor 1071 at a predetermined sampling rate, performs Fourier transform processing (fast Fourier transform (FFT) arithmetic processing or discrete Fourier transform (DFT) arithmetic processing) on the values, and thereafter obtains the impedance of the fuel cell 101 by, for example, dividing the voltage value obtained as a result of the Fourier transform processing by the current value obtained as a result of the Fourier transform processing. The moisture state within the fuel cell 101 affects ionic conduction in an electrolyte within the fuel cell 101, and therefore, has a correlation with the impedance of the fuel cell 101. Accordingly, the moisture state within the fuel cell 101 can be indirectly determined by measuring the impedance of the fuel cell 101 with the above-described AC impedance method.

As described above, according to the ninth example, the AC component to be included in the switching signal used in on/off switch control on each switching element of the FC-VCU 103 is superimposed on the control signal at a timing when the control signal is outside the feedback loop in the ECU 113. If the AC signal is superimposed inside the feedback loop, the input current IFC to the FC-VCU 103, the input current IFC being a feedback component specifically in a case where the AC signal is a high-frequency signal, fluctuates to a large degree and is followed by the fluctuation, and therefore, the gain in the feedback loop needs to be increased. As a result, the control stability of the FC-VCU 103 may decrease.

Theoretically, the control cycle in the feedback loop needs to be sufficiently faster than that for the AC signal to be superimposed, otherwise the ECU 113 is unable to recognize the AC signal and is unable to perform AC superimposition. Accordingly, specifically in the case where the AC signal is a high-frequency signal, the control cycle in the feedback loop is an ultrahigh-speed cycle, and the computational load of the ECU 113 becomes excessively large.

However, the control cycle outside the feedback loop is slower than the control cycle in the feedback loop, and therefore, the above-described problem does not arise if the AC signal is superimposed outside the feedback loop as in the ninth example. Accordingly, the impedance of the fuel cell 101 can be measured while the control stability of the FC-VCU 103 is guaranteed and the computational load of the ECU 113 is suppressed. When the humidity amount of a fuel gas to be supplied to the fuel cell 101 is adjusted based on the measured impedance of the fuel cell 101, it is possible to always maintain the moisture state of the fuel cell 101 to an appropriate state and to suppress degradation or a decrease in the efficiency of the fuel cell 101.

In the feedback loop in the ECU 113 according to the ninth example, the input current IFC is fed back; however, the output voltage V2 of the FC-VCU 103 may be fed back in the feedback loop.

Tenth Example

In a case of driving the FC-VCU 103 with a single phase, on/off switch control is performed on only one switching element among the plurality of switching elements included in the FC-VCU 103. Therefore, even if an AC component is superimposed on a switching signal used to control the switching element, zero-crossing in the phase current is suppressed as long as the amplitude of the AC component is appropriate, and the control stability of the FC-VCU 103 is not compromised. However, in a case of driving the FC-VCU 103 with multiple phases, on/off switch control is performed on the plurality of switching elements. An AC component superimposed on each switching signal may cause zero-crossing of one or more of the phase currents or require AC superimposition control performed on the switching elements in addition to duty control and interleave control that are usually performed, resulting in a decrease in the control stability of the FC-VCU 103. The decrease in the control stability is highly likely to occur if interleave control in which the on/off switch phases of the switching elements are shifted. The AC component included in the switching signals to the FC-VCU 103 is superimposed in order to measure the impedance of the fuel cell 101, as described in the ninth example.

In view of the above-described situation, the ECU 113 according to the tenth example sets sections that correspond to the number of operating phases of the FC-VCU 103 and that are determined based on the input current IFC to the FC-VCU 103. Then, the ECU 113 superimposes an AC signal having an amplitude value that is appropriate for each section on a control signal used in on/off switch control on the switching element of each driven phase. The ECU 113 generates a pulse-like switching signal based on the control signal on which the AC signal is superimposed and outputs the switching signal to the FC-VCU 103. In a case of driving the FC-VCU 103 with one phase, the corresponding section is divided into two sections, and the ECU 113 outputs a switching signal obtained by superimposing an AC signal having an amplitude value that is appropriate for each section on the control signal for the driven phase.

Figure 37:
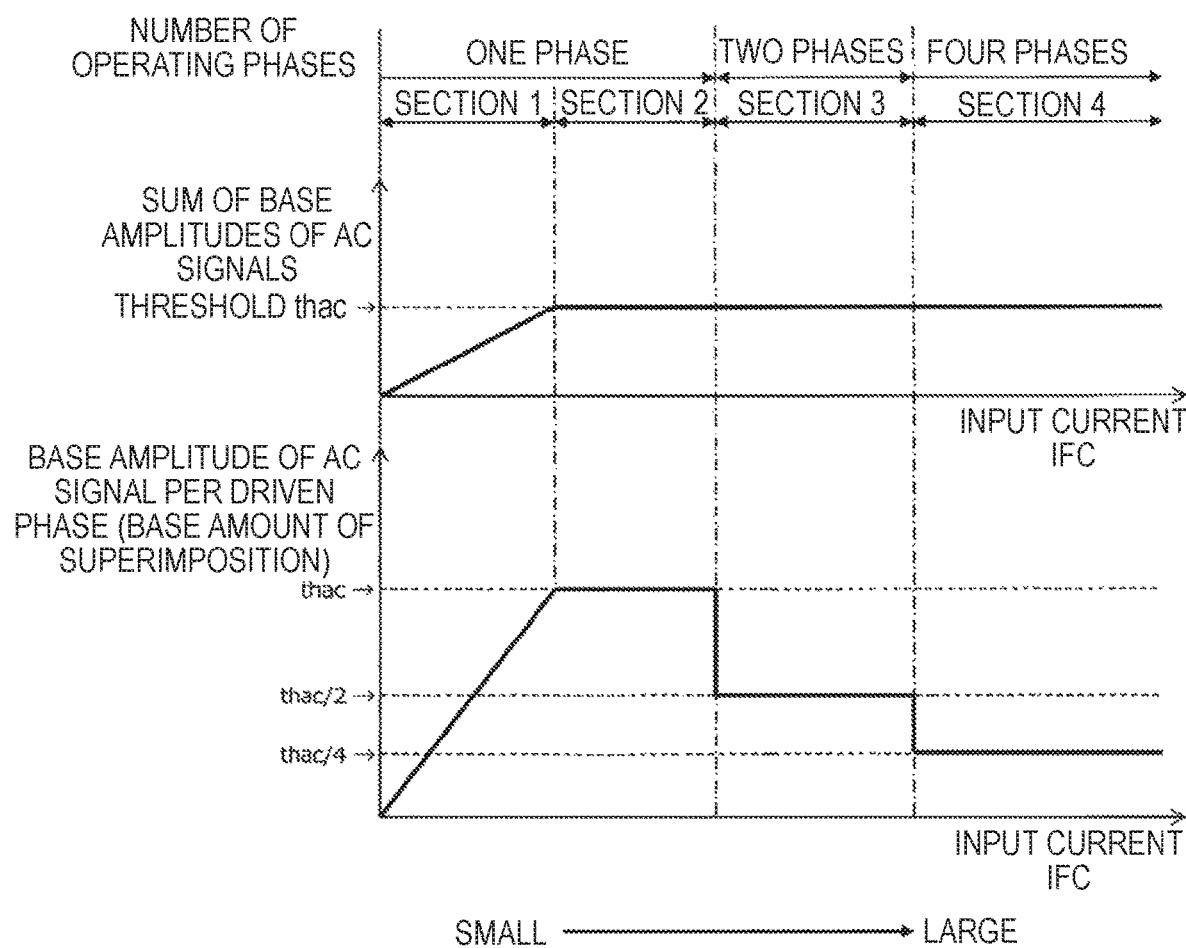
FIG. 37 is a diagram of a tenth example illustrating changes in the base amplitude of an AC signal over time, the base amplitude corresponding to the number of operating phases of the FC-VCU, and changes in the sum of the base amplitudes over time.
Figure 38:
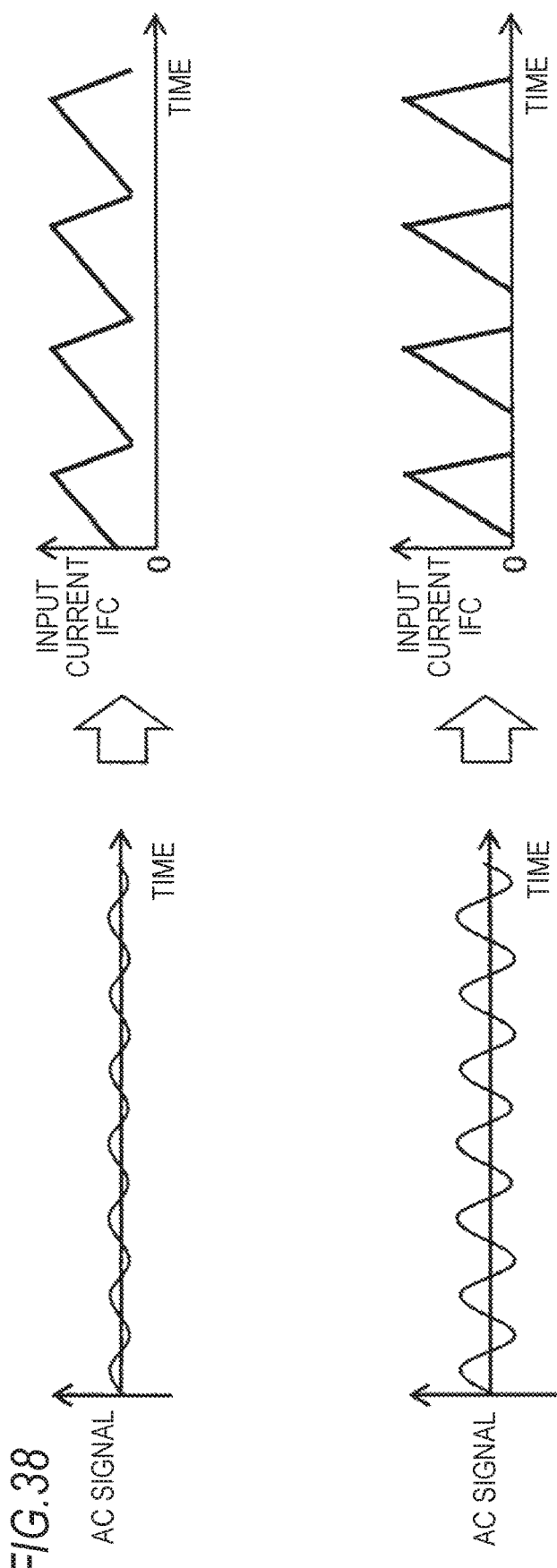
FIG. 38 includes enlarged diagrams illustrating the input current when the value of the input current IFC is close to 0(A), the enlarged diagrams being provided for describing the waveform of the input current that differs depending on the magnitude of the amplitude of an AC signal that is superimposed when the FC-VCU is driven with one phase.

FIG. 37 is a diagram of the tenth example illustrating changes in the base amplitude of an AC signal over time, the base amplitude corresponding to the number of operating phases of the FC-VCU 103, and changes in the sum of the base amplitudes over time. FIG. 38 includes enlarged diagrams illustrating the input current IFC when the value of the input current IFC is close to 0(A), the enlarged diagrams being provided for describing the waveform of the input current IFC that differs depending on the magnitude of the amplitude of an AC signal that is superimposed when the FC-VCU 103 is driven with one phase. On the left of FIG. 38, two AC signals having the same cycles and different amplitudes are illustrated. The amplitude of the AC signal illustrated in the left upper portion of FIG. 38 is smaller than the amplitude of the AC signal illustrated in the left lower portion of FIG. 38. On the right of FIG. 38, the waveforms of the input currents IFC that respectively include AC components corresponding to the AC signals illustrated on the left of FIG. 38 are illustrated. Note that a DC component of the input current IFC is based on the magnitude of the control signal.

If the amplitude of an AC signal that is superimposed is small, values detected by the current sensor 105 and the voltage sensor 1071 do not include a sufficient AC component, and it is not possible to accurately measure the impedance of the fuel cell 101. Therefore, it is desirable that the amplitude of an AC signal that is superimposed is large to the extent that the performance of the fuel cell 101 is not affected and that the control stability of the fuel cell 101 and the FC-VCU 103 is not compromised. However, the input current IFC in the case where the FC-VCU 103 is driven with one phase is smaller than that in the case where the FC-VCU 103 is driven with multiple phases. If an AC signal having a large amplitude is superimposed on a control signal for the driven phase when the input current IFC is smaller, the observed amplitude of the input current IFC becomes large due to the AC signal, and the input current IFC has a value equal to zero over certain periods (zero-crossing) and has a discontinuous waveform, as illustrated in the right lower portion of FIG. 38. The input current IFC having such a discontinuous waveform may make the control of the fuel cell 101 unstable, and therefore, is not desirable. Accordingly, in the tenth example, in the case of driving the FC-VCU 103 with one phase, the section is divided into two sections, namely, section 1 and section 2, depending on the magnitude of the input current IFC, as illustrated in FIG. 37. Over section 1 in which the input current IFC is smaller, the ECU 113 gradually increases the base amplitude (hereinafter referred to as "base amount of superimposition") of an AC signal per driven phase as the input current IFC increases to the extent that the waveform of the input current IFC does not become discontinuous. A section over which the value of the input current IFC is equal to or larger than a value at the point at which the base amount of superimposition reaches a threshold thac is set as section 2. In section 2, the amount equal to the threshold thac that is appropriate as the base amount of superimposition can be superimposed while the waveform of the input current IFC is kept continuous. Therefore, the ECU 113 sets the base amount of superimposition to the threshold thac regardless of the magnitude of the input current IFC.

In section 3 that corresponds to the case where the FC-VCU 103 is driven with two phases, the ECU 113 sets the base amount of superimposition to "thac/2" regardless of the magnitude of the input current IFC so that the sum of the amplitudes of AC signals that are superimposed on respective control signals for the two driven phases is equal to the threshold thac described above that is appropriate as the base amount of superimposition. Similarly, in section 4 that corresponds to the case where the FC-VCU 103 is driven with four phases, the ECU 113 sets the base amount of superimposition to "thac/4" regardless of the magnitude of the input current IFC so that the sum of the amplitudes of AC signals that are superimposed on respective control signals for the four driven phases is equal to the threshold thac that is appropriate as the base amount of superimposition. Note that the ECU 113 may set the base amount of superimposition in a section that corresponds to a case where the FC-VCU 103 is driven with multiple phases (n phases) to a value smaller than "thac/n" as the input current IFC increases.

Figure 39:
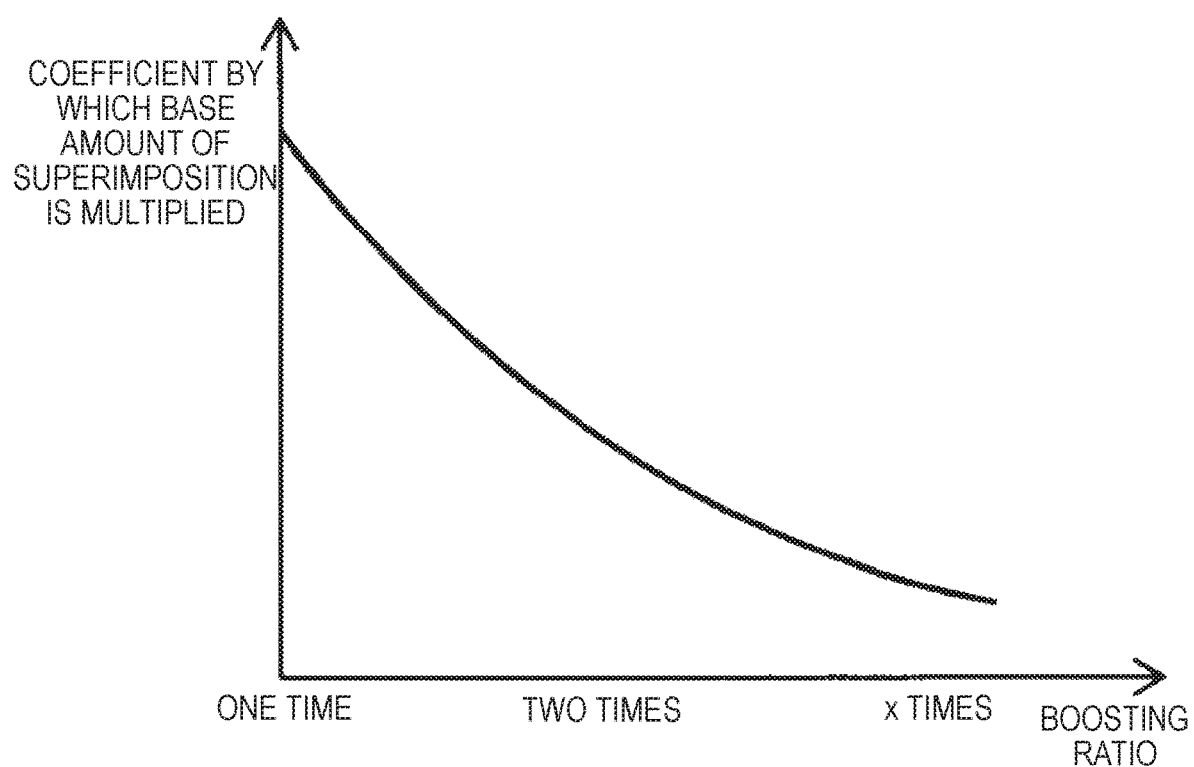
FIG. 39 is a diagram illustrating a relationship between the boosting ratio of the FC-VCU and a coefficient by which the base amount of superimposition is multiplied.

The ECU 113 multiplies the base amount of superimposition by a coefficient that differs depending on the boosting ratio of the FC-VCU 103. FIG. 39 is a diagram illustrating a relationship between the boosting ratio of the FC-VCU 103 and a coefficient by which the base amount of superimposition is multiplied. As illustrated in FIG. 39, the coefficient by which the base amount of superimposition is multiplied decreases as the boosting ratio increases because the ripple of the input current IFC becomes larger as the boosting ratio increases, and AC superimposition is easily performed. The ECU 113 multiplies the base amount of superimposition derived based on the relationships illustrated in FIG. 37 by the coefficient that corresponds to the boosting ratio of the FC-VCU 103, and outputs switching signals obtained by superimposing AC signals having an amplitude value indicated by the calculated value on control signals for the respective driven phases.

As described above, according to the tenth example, the amplitude of an AC component included in the switching signals has a value appropriate for each section, and therefore, the impedance of the fuel cell 101 can be accurately measured because of the AC component while the control stability of the FC-VCU 103 is not compromised.

Note that the example illustrated in FIG. 37 corresponds to the case where the number of operating phases of the magnetic-coupling-type FC-VCU 103 illustrated in FIG. 2 and FIG. 6 is one, two, or four. In a case of using the FC-VCU 203 illustrated in FIG. 7 and FIG. 8 in which the iron cores are individually provided to the reactors of the respective phases, one phase to four phases including three phases are used as the operating phases. In this case, in the section that corresponds to the case where the FC-VCU 103 is driven with three phases, the ECU 113 sets the base amount of superimposition to "thac/3" regardless of the magnitude of the input current IFC so that the sum of the amplitudes of AC signals that are superimposed on control signals for the three driven phases is equal to the threshold thac described above that is appropriate as the base amount of superimposition.

Eleventh Example

In a case of driving the FC-VCU 103 with a single phase, on/off switch control is performed on only one switching element among the plurality of switching elements included in the FC-VCU 103. Therefore, even if an AC component is superimposed on a switching signal used to control the switching element, zero-crossing in the phase current is suppressed as long as the amplitude of the AC component is appropriate, and the control stability of the FC-VCU 103 is not compromised. However, in a case of driving the FC-VCU 103 with multiple phases, on/off switch control is performed on the plurality of switching elements. An AC component superimposed on each switching signal may cause zero-crossing of one or more of the phase currents or require AC superimposition control performed on the switching elements in addition to duty control and interleave control that are usually performed, resulting in a decrease in the control stability of the FC-VCU 103. As the number of operating phases in the case of driving the FC-VCU 103 with multiple phases increases, a decrease in the control stability due to the AC component included in the switching signals becomes noticeable. The AC component included in the switching signals to the FC-VCU 103 is superimposed in order to measure the impedance of the fuel cell 101, as described in the ninth example.

In view of the above-described situation, the ECU 113 according to the eleventh example sets sections that correspond to the number of operating phases of the FC-VCU 103 and that are determined based on the input current IFC to the FC-VCU 103. Then, the ECU 113 superimposes an AC signal having an amplitude value that is appropriate for each section on a control signal used in on/off switch control on the switching element of each driven phase. The ECU 113 generates a pulse-like switching signal based on the control signal on which the AC signal is superimposed and outputs the switching signal to the FC-VCU 103. In a case of driving the FC-VCU 103 with one phase, the corresponding section is divided into two sections, and the ECU 113 outputs a switching signal obtained by superimposing an AC signal having an amplitude value that is appropriate for each section on the control signal for the driven phase.

Figure 40:
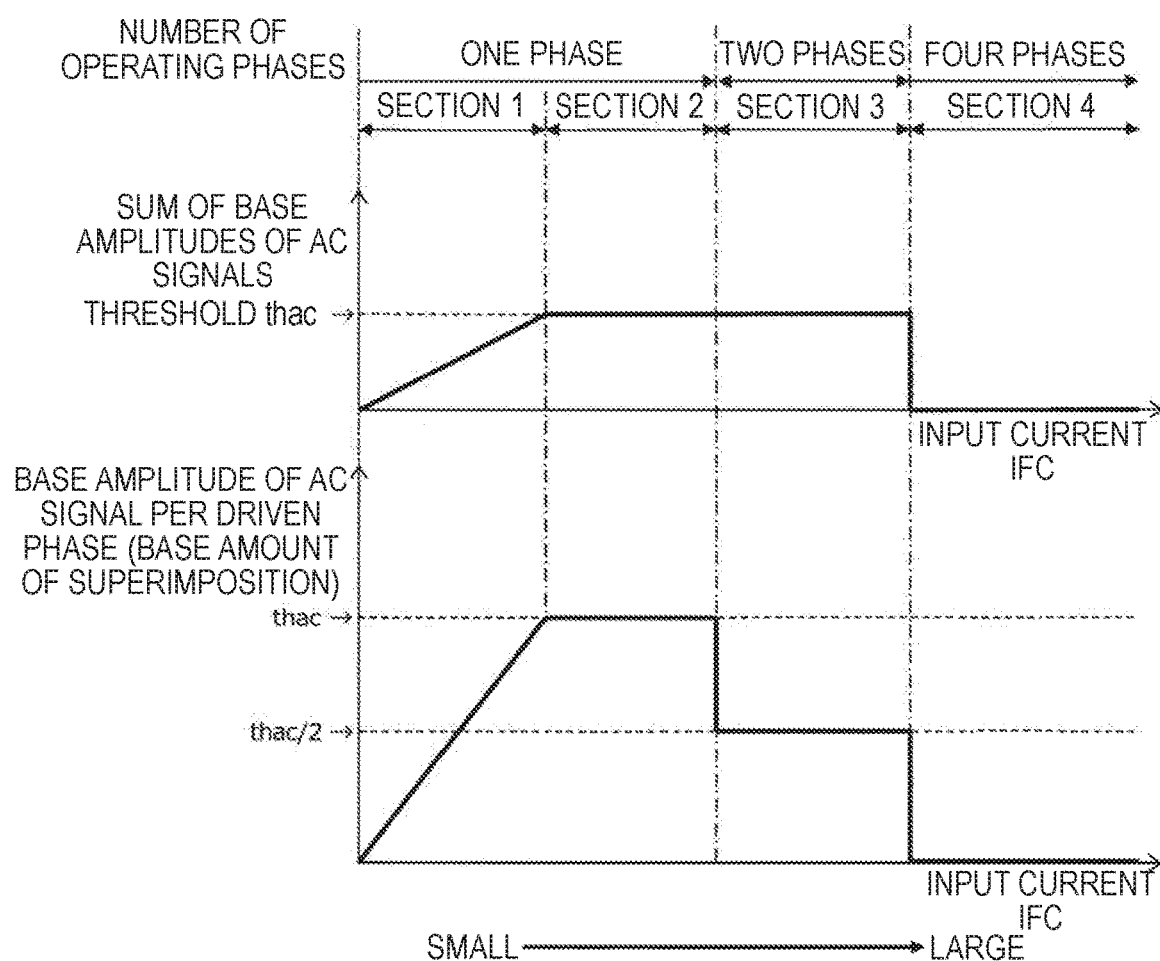
FIG. 40 is a diagram of an eleventh example illustrating changes in the base amplitude of an AC signal over time, the base amplitude corresponding to the number of operating phases of the FC-VCU, and changes in the sum of the base amplitudes over time.
Figure 41:
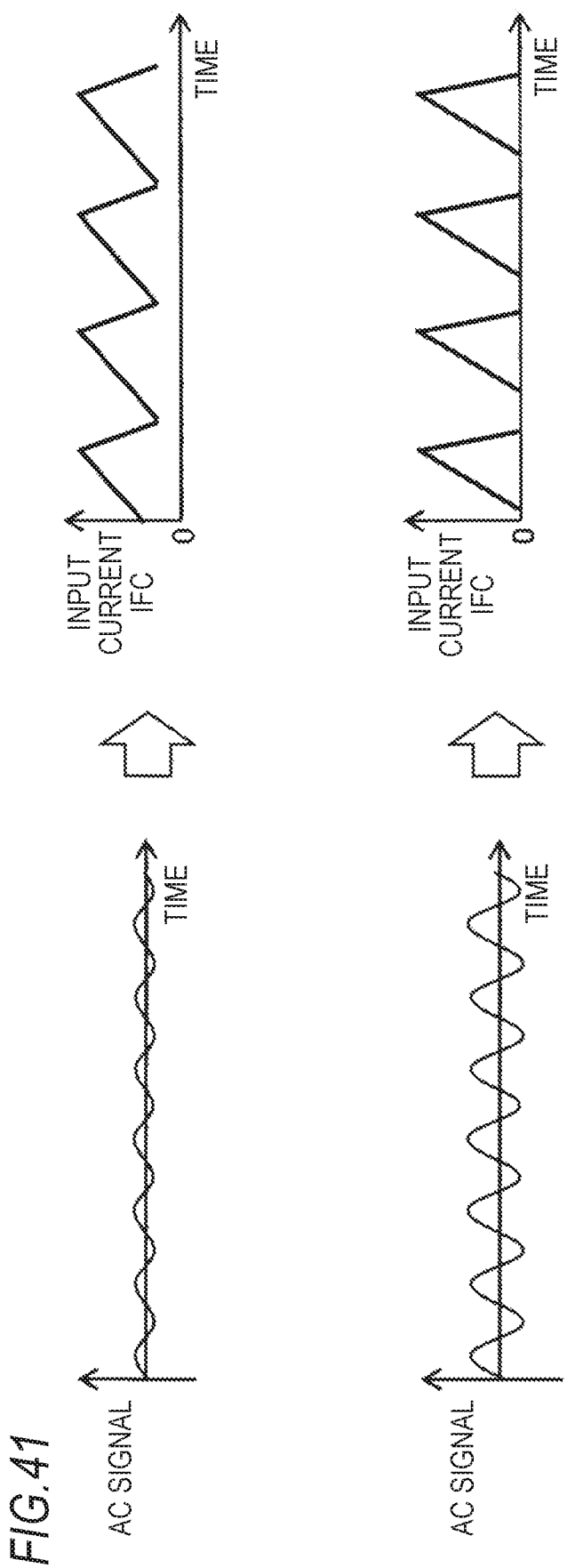
FIG. 41 includes enlarged diagrams illustrating the input current when the value of the input current is close to 0(A), the enlarged diagrams being provided for describing the waveform of the input current IFC that differs depending on the magnitude of the amplitude of an AC signal that is superimposed when the FC-VCU is driven with one phase.

FIG. 40 is a diagram of the eleventh example illustrating changes in the base amplitude of an AC signal over time, the base amplitude corresponding to the number of operating phases of the FC-VCU 103, and changes in the sum of the base amplitudes over time. FIG. 41 includes enlarged diagrams illustrating the input current IFC when the value of the input current IFC is close to 0(A), the enlarged diagrams being provided for describing the waveform of the input current IFC that differs depending on the magnitude of the amplitude of an AC signal that is superimposed when the FC-VCU 103 is driven with one phase. On the left of FIG. 41, two AC signals having the same cycles and different amplitudes are illustrated. The amplitude of the AC signal illustrated in the left upper portion of FIG. 41 is smaller than the amplitude of the AC signal illustrated in the left lower portion of FIG. 41. On the right of FIG. 41, the waveforms of the input currents IFC that respectively include AC components corresponding to the AC signals illustrated on the left of FIG. 41 are illustrated. Note that a DC component of the input current IFC is based on the magnitude of the control signal.

If the amplitude of an AC signal that is superimposed is small, values detected by the current sensor 105 and the voltage sensor 1071 do not include a sufficient AC component, and it is not possible to accurately measure the impedance of the fuel cell 101. Therefore, it is desirable that the amplitude of an AC signal that is superimposed is large to the extent that the performance of the fuel cell 101 is not affected and that the control stability of the fuel cell 101 and the FC-VCU 103 is not compromised. However, the input current IFC in the case where the FC-VCU 103 is driven with one phase is smaller than that in the case where the FC-VCU 103 is driven with multiple phases. If an AC signal having a large amplitude is superimposed on a control signal for the driven phase when the input current IFC is smaller, the observed amplitude of the input current IFC becomes large due to the AC component, and the input current IFC has a value equal to zero over certain periods (zero-crossing) and has a discontinuous waveform, as illustrated in the right lower portion of FIG. 41. The input current IFC having such a discontinuous waveform may make the control of the fuel cell 101 unstable, and therefore, is not desirable. Accordingly, in the eleventh example, in the case of driving the FC-VCU 103 with one phase, the section is divided into two sections, namely, section 1 and section 2, depending on the magnitude of the input current IFC, as illustrated in FIG. 40. Over section 1 in which the input current IFC is smaller, the ECU 113 gradually increases the base amplitude of an AC signal per driven phase as the input current IFC increases to the extent that the waveform of the input current IFC does not become discontinuous. A section over which the value of the input current IFC is equal to or larger than a value at the point at which the base amount of superimposition reaches a threshold thac is set as section 2. In section 2, the amount equal to the threshold thac that is appropriate as the base amount of superimposition can be superimposed while the waveform of the input current IFC is kept continuous. Therefore, the ECU 113 sets the base amount of superimposition to the threshold thac regardless of the magnitude of the input current IFC.

In section 3 that corresponds to the case where the FC-VCU 103 is driven with two phases, the ECU 113 sets the base amount of superimposition to "thac/2" regardless of the magnitude of the input current IFC so that the sum of the amplitudes of AC signals that are superimposed on respective control signals for the two driven phases is equal to the threshold thac described above that is appropriate as the base amount of superimposition. Note that the ECU 113 may set the base amount of superimposition to a value smaller than "thac/2" as the input current IFC increases because the ripple of the input current IFC becomes larger as the input current IFC increases, and AC superimposition is easily performed. In section 4 that corresponds to the case where the FC-VCU 103 is driven with four phases, the ECU 113 sets the base amount of superimposition to zero regardless of the magnitude of the input current IFC. That is, the ECU 113 prohibits the AC signal from being superimposed in the case of driving the FC-VCU 103 with four phases. Note that, in the eleventh example, the ECU 113 prohibits an odd number of phases except for one phase as the number of operating phases of the FC-VCU 103 for the same reason as in the fourth example. Therefore, the AC signal is not superimposed in the case of driving the FC-VCU 103 with three phases.

Figure 42:
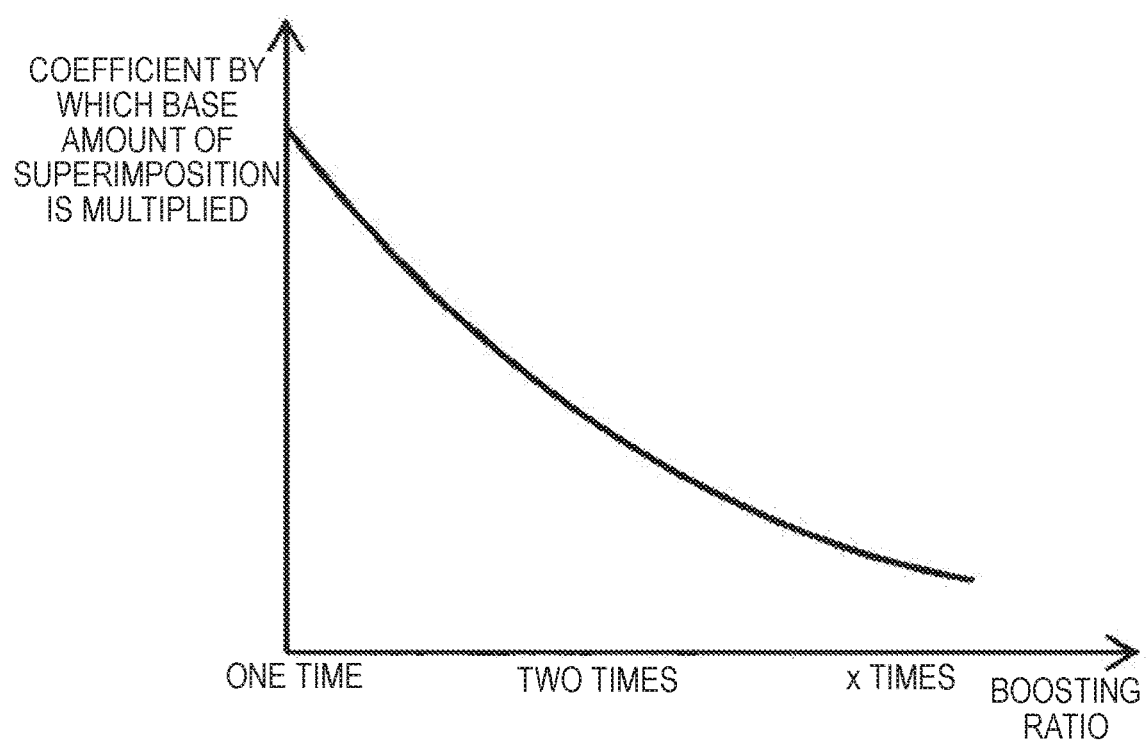
FIG. 42 is a diagram illustrating a relationship between the boosting ratio of the FC-VCU and a coefficient by which the base amount of superimposition is multiplied.

The ECU 113 multiplies the base amount of superimposition by a coefficient that differs depending on the boosting ratio of the FC-VCU 103. FIG. 42 is a diagram illustrating a relationship between the boosting ratio of the FC-VCU 103 and a coefficient by which the base amount of superimposition is multiplied. As illustrated in FIG. 42, the coefficient by which the base amount of superimposition is multiplied decreases as the boosting ratio increases because the ripple of the input current IFC becomes larger as the boosting ratio increases, and AC superimposition is easily performed, as described above. The ECU 113 multiplies the base amount of superimposition derived based on the relationships illustrated in FIG. 40 by the coefficient that corresponds to the boosting ratio of the FC-VCU 103, and outputs switching signals obtained by superimposing AC signals having an amplitude value indicated by the calculated value on control signals for the respective driven phases.

Figure 43:
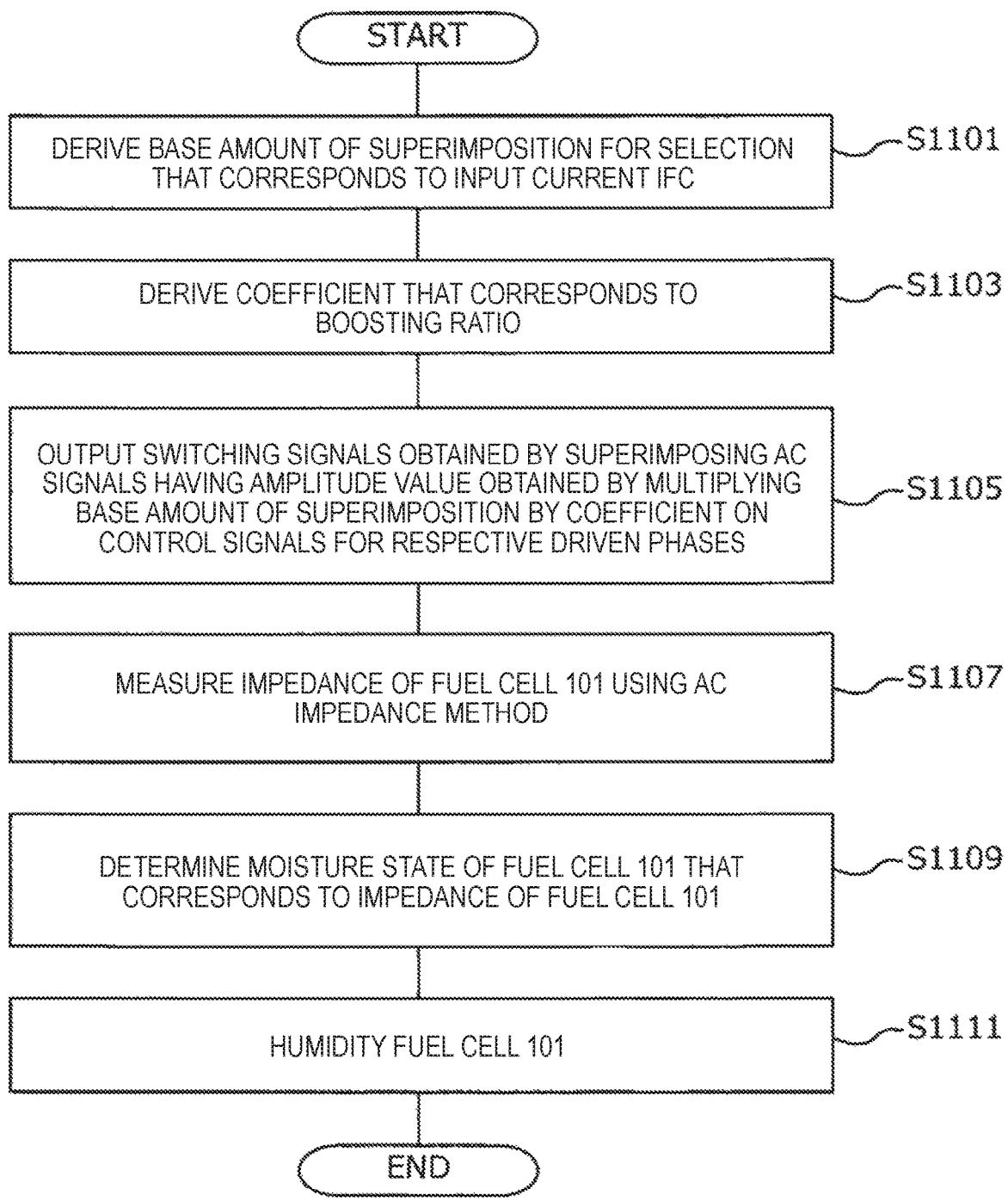
FIG. 43 is a flowchart illustrating an operation performed by the ECU according to the eleventh example when an AC signal is superimposed on a control signal for each driven phase.

FIG. 43 is a flowchart illustrating an operation performed by the ECU 113 according to the eleventh example when an AC signal is superimposed on a control signal for each driven phase. As illustrated in FIG. 43, the ECU 113 derives the base amount of superposition for a section that corresponds to the input current IFC to the FC-VCU 103 (step S1101). Next, the ECU 113 derives a coefficient that corresponds to the boosting ratio of the FC-VCU 103 (step S1103). Subsequently, the ECU 113 outputs switching signals obtained by superimposing AC signals having an amplitude value obtained by multiplying the base amount of superimposition by the coefficient on control signals for the respective driven phases (step S1105). Subsequently, the ECU 113 measures the impedance of the fuel cell 101 by using the AC impedance method described in the ninth example (step S1107). Subsequently, the ECU 113 determines the moisture state of the fuel cell 101 that corresponds to the impedance of the fuel cell 101 (step S1109). Subsequently, the ECU 113 humidifies the fuel cell 101 by an amount corresponding to the moisture state determined in step S1109 (step S1111).

As described above, according to the eleventh example, the amplitude of an AC component included in the switching signals has a value appropriate for each section, and therefore, the impedance of the fuel cell 101 can be measured because of the AC component while the control stability of the FC-VCU 103 is not compromised.

Figure 44:
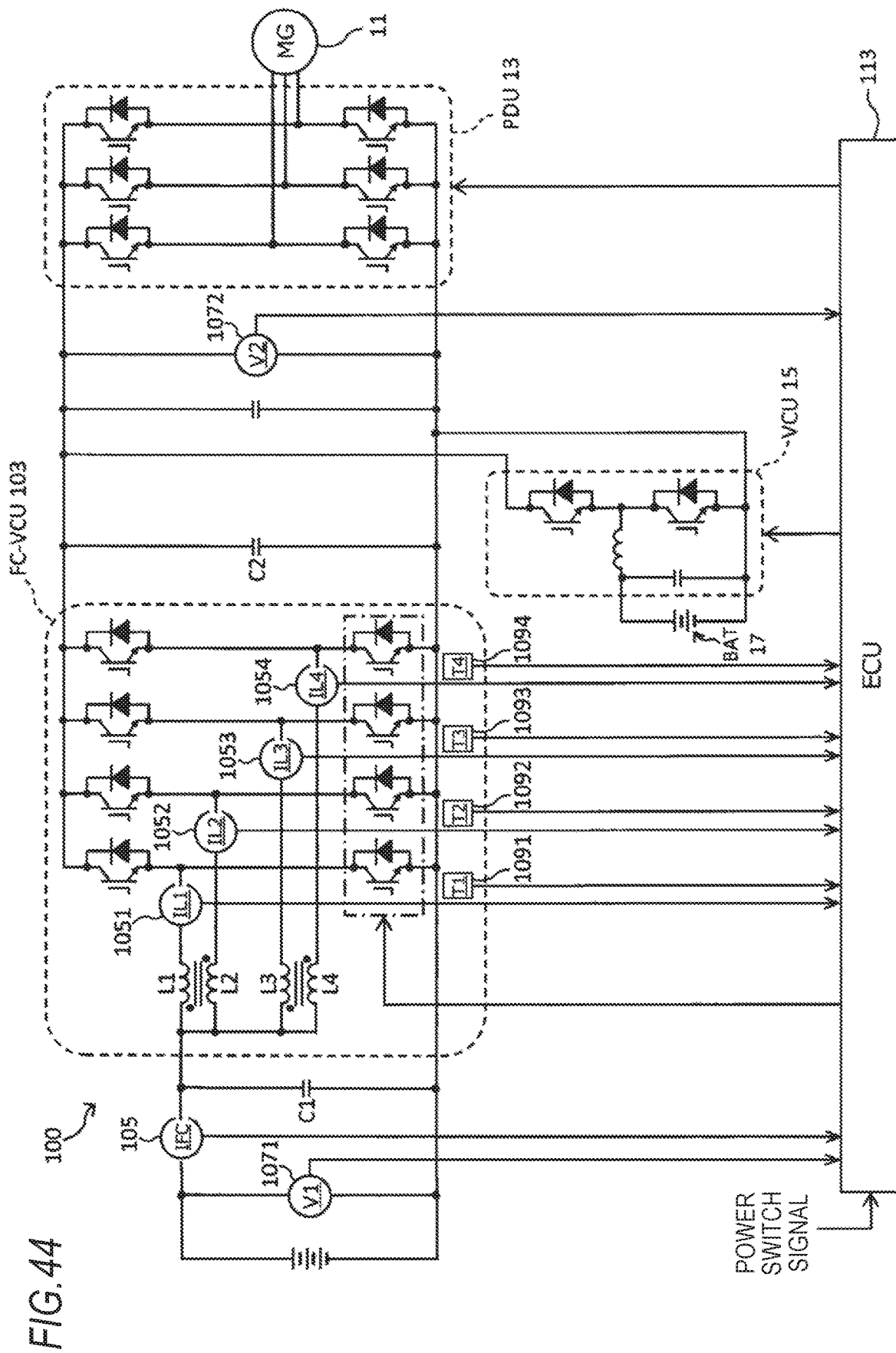
FIG. 44 is a block diagram illustrating an overall configuration of the motor-driven vehicle in which the power supply device according to another embodiment is mounted.

Note that the present disclosure it not limited to the embodiments described above and may be modified or improved, for example, as appropriate. For example, the first to eleventh examples have been described independently of one another; however, two or more of the examples may be combined to configure a power supply device. The motor-driven vehicle described above includes the fuel cell 101 and the battery 17 as energy sources; however, a secondary battery, such as a lithium-ion battery or a nickel-hydrogen battery, having an energy density per unit mass higher than that of the battery 17 may be used instead of the fuel cell 101. In this case, another switching element is provided in parallel to the diode connected in series to the reactor in each conversion unit included in the FC-VCU 103, as illustrated in FIG. 44, and the ECU 113 performs an on/off switch operation on the two switching elements namely, a high-side switching element and a low-side switching element, thereby boosting the voltage of the secondary battery provided instead of the fuel cell 101 and outputting the resulting voltage.

The motor-driven vehicle described above is a single-motor-type electrical vehicle (EV); however, the motor-driven vehicle may be an EV in which a plurality of motors/generator are mounted, or a hybrid electrical vehicle (HEV) or a plug-in hybrid electrical vehicle (PHEV) in which at least one motor/generator and an internal combustion engine are mounted. In the embodiments, the power supply device 100 is mounted in the motor-driven vehicle; however, the power supply device 100 may be provided in an electrical apparatus used for purposes other than transportation. The power supply device 100 is suitable to a power supply capable of outputting a high current, and specifically, is preferably applicable to recent computers that increasingly require high currents.

The VCU 15 according to the embodiments boosts the voltage of the battery 17; however, in a case where the voltage of the fuel cell 101 is lower than the voltage of the battery 17, a VCU that decreases the voltage of the battery 17 is used. Alternatively, a VCU capable of increasing and decreasing the voltage may be used. The FC-VCU 103 is not limited to a boosting (step-up) VCU and may be a step-down or a step-up/step-down VCU.

DESCRIPTION OF REFERENCE NUMERALS AND CHARACTERS 11 motor/generator (MG)
13 PDU
15 VCU
17 battery
100 power supply device
101 fuel cell (FC)
103, 203 FC-VCU
105 current sensor
1051 to 1054 phase current sensor
1071, 1072 voltage sensor
1091 to 1094 temperature sensor
111 power switch
113 ECU
121 feedback control unit
123 AC signal generation unit
125 switching signal generation unit
C1, C2 smoothing capacitor
L1 to L4 reactor
Coa, Cob iron core

The invention claimed is:
1. A power supply device comprising:
a power supply;
a conversion module including a plurality of conversion units configured to perform voltage conversion of power supplied by the power supply, the plurality of conversion units being electrically connected in parallel to each other;
a change unit that changes an operation number, which is a number of the plurality of conversion units performing the voltage conversion; and
a control unit that supplies a control signal having a predetermined duty ratio to each conversion unit of the plurality of conversion units performing the voltage conversion and controls the conversion module, wherein:
when the change unit changes the operation number, the control unit gradually increases from a first duty ratio of the control signal supplied to each conversion unit for starting the voltage conversion to a second duty ratio of the control signal supplied to each conversion unit for continuously performing the voltage conversion, at a predetermined change rate; and
a number-of-phases switch period that is set in a case of a decrease in the operation number is longer than a number-of-phases switch period that is set in a case of an increase in the operation number such that a change rate from the first duty ratio with the decrease in the operation number is smaller than a change rate from the first duty ratio with the increase in the operation number.

2. The power supply device according to claim 1, wherein the second duty ratio is not varied with the change of the operation number.

3. The power supply device according to claim 1, wherein the predetermined change rate from the first duty ratio is based on at least one of an amount of change in a current flowing through each conversion unit for continuously performing the voltage conversion before and after the change in the operation number or an amount of change in a current flowing through each conversion unit for starting the voltage conversion during the change in the operation number.

4. The power supply device according to claim 3, wherein the predetermined change rate from the first duty ratio becomes smaller as the amount of change in the current flowing through each conversion unit for continuously performing the voltage conversion before and after the change in the operation number or the amount of change in the current flowing through the conversion unit for starting the voltage conversion during the change in the operation number becomes larger.

5. The power supply device according to claim 1, wherein the predetermined change rate from the first duty ratio is based on continuity of the operation number before and after the change in the operation number.

6. The power supply device according to claim 5, wherein the predetermined change rate from the first duty ratio is smaller in a case where the change in the operation number is non-consecutive than in a case where the change in the operation number is consecutive.

7. An apparatus including the power supply device according to claim 1.

8. A control method performed by a power supply device, the power supply device including:
a power supply;
a conversion module including a plurality of conversion units configured to perform voltage conversion of power supplied by the power supply, the plurality of conversion units being electrically connected in parallel to each other;
a change unit that changes an operation number, which is a number of the plurality of conversion units performing the voltage conversion; and
a control unit that supplies a control signal having a predetermined duty ratio to each conversion unit of the plurality of conversion units performing the voltage conversion and controls the conversion module, wherein:
when the change unit changes the operation number, the control unit gradually increases from a first duty ratio of the control signal supplied to each conversion unit for starting the voltage conversion to a second duty ratio of the control signal supplied to each conversion unit for continuously performing the voltage conversion, at a predetermined change rate; and
a number-of-phases switch period that is set in a case of a decrease in the operation number is longer than a number-of-phases switch period that is set in a case of an increase in the operation number such that a change rate from the first duty ratio with the decrease in the operation number is smaller than a change rate from the first duty ratio with the increase in the operation number.

9. A power supply device comprising:
a power supply;
a conversion module including a plurality of conversion units configured to perform voltage conversion of power supplied by the power supply, the plurality of conversion units being electrically connected in parallel to each other;
a change unit that changes an operation number, which is a number of the plurality of conversion unit performing the voltage conversion; and
a control unit that supplies a control signal having a predetermined duty ratio to each conversion unit of the plurality of conversion units performing the voltage conversion and controls the conversion module, wherein:
when the change unit changes the operation number, the control unit gradually decreases from a first duty ratio of the control signal supplied to each conversion unit for stopping the voltage conversion to zero, at a predetermined change rate; and
a number-of-phases switch period that is set in a case of a decrease in the operation number is longer than a number-of-phases switch period that is set in a case of an increase in the operation number such that a change rate from the first duty ratio with the decrease in the operation number is smaller than a change rate from the first duty ratio with the increase in the operation number.

* * * * *